United States Patent [19]
Yamakawa et al.

[11] Patent Number: 5,907,851
[45] Date of Patent: May 25, 1999

[54] EDITING NESTED DOCUMENTS BY APPOINTING A PORTION FOR INSERTION WITH AN ALTERNATIVE SUBSTITUTE

[75] Inventors: Tadashi Yamakawa, Yokohama; Masaaki Nagashima, Kawasaki; Akihiro Kohno, Yokohama, all of Japan

[73] Assignee: Canon Kabushiki Kaisha, Tokyo, Japan

[21] Appl. No.: 08/977,394

[22] Filed: Nov. 24, 1997

Related U.S. Application Data

[63] Continuation of application No. 08/360,092, Dec. 20, 1994, abandoned.

[30] Foreign Application Priority Data

Dec. 28, 1993 [JP] Japan ..................................... 5-338188

[51] Int. Cl.⁶ .................................................. G06F 17/24
[52] U.S. Cl. ......................................................... 707/540
[58] Field of Search ........................... 707/500, 505–508, 707/513–515, 540, 531

[56] References Cited

U.S. PATENT DOCUMENTS

| | | | |
|---|---|---|---|
| 4,717,911 | 1/1988 | Matsuura et al. ....................... | 345/112 |
| 5,033,008 | 7/1991 | Barker et al. ........................... | 707/523 |
| 5,113,341 | 5/1992 | Kozol et al. ............................. | 707/531 |
| 5,185,698 | 2/1993 | Hesse et al. ............................. | 707/531 |
| 5,293,473 | 3/1994 | Hesse et al. ............................. | 707/529 |
| 5,307,266 | 4/1994 | Hayashi et al. ......................... | 707/531 |
| 5,361,332 | 11/1994 | Yoshida et al. ........................ | 395/114 |
| 5,384,700 | 1/1995 | Lim et al. ................................ | 707/531 |
| 5,438,657 | 8/1995 | Nakatani ................................. | 707/506 |

FOREIGN PATENT DOCUMENTS

| | | | |
|---|---|---|---|
| 0332557 | 9/1989 | European Pat. Off. ........ | G06F 15/20 |
| 0384184 | 8/1990 | European Pat. Off. ........ | G06F 15/21 |
| 0410062 | 1/1991 | European Pat. Off. ........ | G06F 15/20 |
| 0413653 | 2/1991 | European Pat. Off. ........ | G06F 15/20 |

OTHER PUBLICATIONS

Claff et al., WordPerfect 6.0 Super Book, 1993, pp. 985–992.

*Primary Examiner*—Anton Fetting
*Attorney, Agent, or Firm*—Fitzpatrick, Cella, Harper & Scinto

[57] ABSTRACT

A document editing apparatus for editing a document in which document elements are in a nested structure. A portion appointing device appoints a portion of the document into which a document element is to be inserted, and an alternative element insertion process inserts an alternative element into the appointed portion of the document. An alternative element developing process substitutes an appointed document element for the alternative element, and the appoint document element is stored in a storage device.

21 Claims, 40 Drawing Sheets

FIG. 35
A    fm (ti,au, (snm)), bdy (chp (ct,p) , chp (ct,p))
B    fm (ti,au, (snm)), bdy (chp (ct,sec (st,p) sec, (st,p)))
C    fm (ti,cau, (onm,odv)), bdy (chp (ct,p), chp (ct,p))
FIG. 36
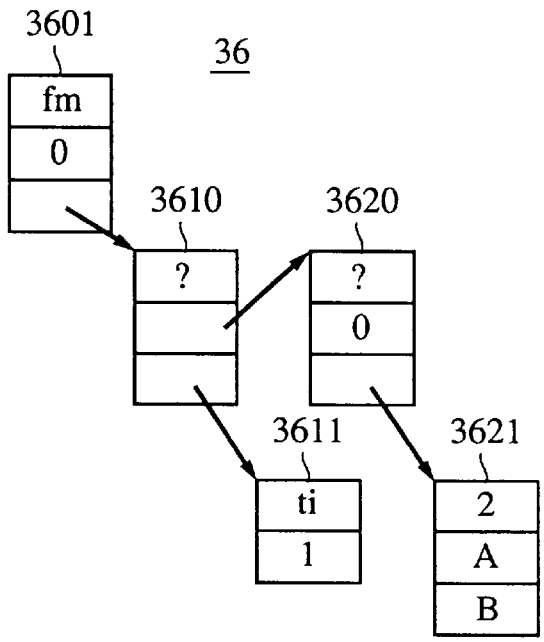
FIG. 37
A    au, (snm)
B    au (fnm,snm)
FIG. 38
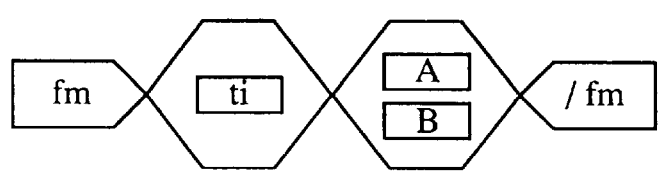

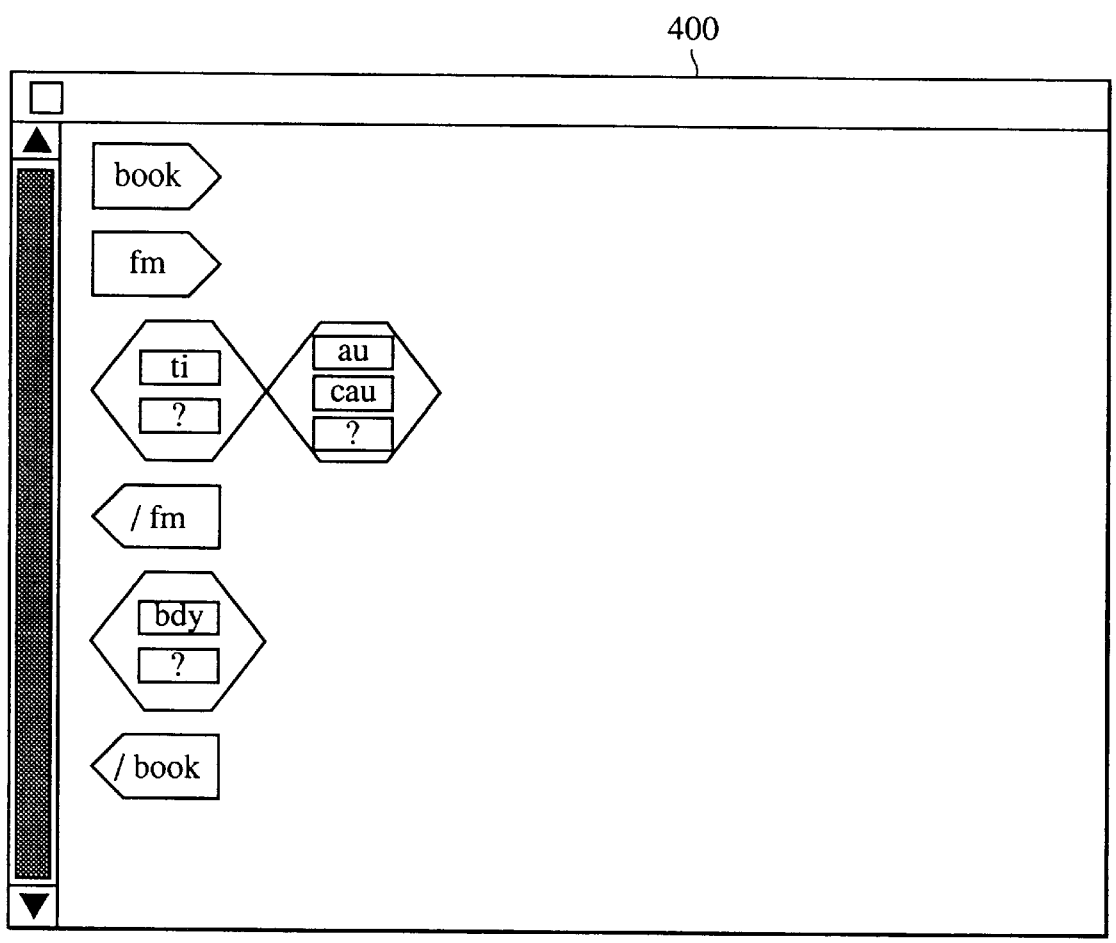
FIG. 64
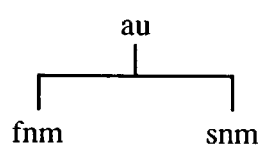

FIG. 67 (PRIOR ART)

```
<!SGML"ISO 8879:1986"
CHARSET
BASESET"ISO 646-1983/CHARSET
Internasional Reference Version (IRV)//ESC 2/5 4/0"
DESCSET    0    9    UNUSED
           9    2    9
          11    2    UNUSED
          13    1    13
          14   18    UNUSED
          32   95    32
         127    1    UNUSED
BASESET"ISO 646-1983/CHARSET
Internasional Reference Version (IRV)//ESC 2/5 4/0"
DESCSET  128   32    UNUSED
         160   95    32
         255    1    UNUSED
CAPACITY PUBLIC"ISO 8879:1986//CAPACITY Reference//EN"
SCOPE    DOCUMENT
SYNTAX PUBLIC"ISO 8879:1986//SYNTAX Reference//EN"
FEATURES
MINIMIZE DATATAG NO OMITTAG  NO RANK    NO    SHORTTAG YES
LINK     SIMPLE  NO IMPLICIT NO EXPLICIT NO
OTHER    CONCUR NO SUBDOC   NO FORMAL YES
APPINFO NONE>
<!DOCTYPE book     [
<!ELEMENT book     (
<!ELEMENT book     (fm, bdy)>
<!ELEMENT fm       (ti, (au | cau)*)>
<!ELEMENT ti       (#PCDATA)>
<!ELEMENT au       (fnm?, snm)>
<!ELEMENT cau      (onm, odv*)>
<!ELEMENT (fnm | snm | onm | odv)
                   (#PCDATA)>
<!ELEMENT bdy      (part+ | chp+)>
<!ELEMENT part     (pt, p*, chp+)>
<!ELEMENT chp      (ct, p*, sec*)>
<!ELEMENT sec      (st, p*)>
<!ELEMENT (pt | ct | st )
                   (#PCDATA)>
<!ELEMENT p        (#PCDATA)>
]>
```

⟨book⟩⟨fm⟩
⟨ti⟩A B C D E F⟨/ti⟩
⟨au⟩⟨snm⟩TADASHI⟨snm⟩⟨/au⟩⟨/fm⟩
⟨bdy⟩
⟨chp⟩⟨ct⟩O P Q R S T⟨/ct⟩
⟨p⟩a b c d e f g h i⟨/p⟩
⟨p⟩j k l mn o p q⟨/p⟩
⟨/chp⟩⟨/bdy⟩⟨/book⟩

⟨book⟩⟨fm⟩
⟨ti⟩A B C D E F⟨/ti⟩
⟨cau⟩⟨onm⟩XYZ camp.⟨snm⟩⟨/au⟩⟨/fm⟩
⟨bdy⟩
⟨chp⟩⟨ct⟩O P Q R S T⟨/ct⟩
⟨p⟩a b c d e f g h i⟨/p⟩
⟨p⟩j k l mn o p q⟨/p⟩
⟨/chp⟩⟨/bdy⟩⟨/book⟩

5,907,851

EDITING NESTED DOCUMENTS BY APPOINTING A PORTION FOR INSERTION WITH AN ALTERNATIVE SUBSTITUTE

This application is a continuation of application Ser. No. 08/360,092 filed Dec. 20, 1994, now abandoned.

BACKGROUND OF THE INVENTION

1. Field of the Invention

The present invention relates to a document editing apparatus for causing a computer to create and edit a document of a type having a structure, and more particularly to an apparatus for creating and editing a structured document that is written in a standard generalized markup language.

2. Related Background Art

Apparatuses for creating and editing a structured document described in the standard generalized markup language (SGML (ISO-8879) has been developed. A structured document editing apparatus of the foregoing type has an arrangement that a document type is previously set and the document adaptable to the document type is made.

FIG. 67 illustrates a case where a document type is written in the standard generalized markup language by a document editing apparatus of the foregoing type. The operation of describing the document type is performed such that the structure of a document is defined as follows.

A document basically comprises a document element of a type "book". Hereinafter a document element of a type "x" is expressed as document element "x". The content of the document element "book" is composed of document element "fm" and document element "bdy" disposed in this order. The document element "fm" contains a leading document element "ti" and zero or more document elements "au" or "cau".

The document element "ti" contains a character string. Descriptions of the other structures of the document elements are omitted.

FIG. 68 illustrates the structure of a document editing apparatus which is capable of editing a structured document of the foregoing type.

Referring to FIG. 68, reference numeral 1 represents a keyboard, 2 represents a pointing device such as a mouse, 3 represents a CPU, 4 represents a CRT, 10 represents a storage unit for storing programs, 20 represents a sub-storage unit for permanently storing programs and data items, and 30 represents a storage unit for storing data. The foregoing units are connected to one another through a bus 9. Note that the storage units 10 and 30 and the sub-storage unit 20 that are used individually may be used as program and data storage units.

FIGS. 69 and 70 illustrate examples where the document adapted to the document type shown in FIG. 67 is described in the standard generalized markup language. The documents shown in FIGS. 69 and 70 are different from each other in terms of the author of the document that is a person expressed by document element "au" and that is a corporation expressed by document element "cau".

When the structured document is edited, a SGML original document 21 processed as a file in the sub-storage unit 20 and described in the standard generalized markup language is read, converted into an internal data format so that the SGML original document 21 is stored in the storage unit 30 as document data 31. The document data 31 is edited and converted into the description format of the standard generalized markup language and written over the SGML original document 21 so that the SGML original document 21 is updated. As an alternative to the conversion into the description format of the standard generalized markup language, a copy of the document data 31 may be stored as stored document data 22 that is a file in the sub-storage unit 20 while maintaining the internal format.

FIG. 71 illustrates an example of a display created on a screen of the conventional structured document editing apparatus immediately before the document element indicating the author is inserted.

Referring to FIG. 71, reference numeral 101 represents an insertion cursor that indicates a position at which a document element is inserted, the cursor movement being enabled by the pointing device 2 or a cursor moving key of the keyboard 1. The event initiated to occur by the pointing device 2 or the cursor moving key results in a document element appointing program 11 being executed so that the position in the document data 31 and that of the cursor on the screen are changed.

The document data is as shown in FIG. 72 at the foregoing moment.

FIG. 72 illustrates the structure of data in the document data 31 shown in FIG. 68. As shown in FIG. 72, the document data 31 is formed in a tree network expressing a nested structure comprising document elements 3101 and 3102 as nodes. A base document element 3101, which is the content of the document, is pointed to by a root pointer 3100 for pointing to the content of a document.

Each document element contains data representing the type of the document element, link data representing the order relationship of the element and content data representing the content of the document element.

The document element 3101, which is an element of the root, has the identifier "book". Its link data indicates no link and content data is pointed to the document element 3102. The reason why no link is present is that the base of the document is composed of only one document element 3101.

The type of the document element 3102 is "fm" and the document element 3102 has link data that points the document element 3103. This expresses a fact that the content of the document element 3101 are composed of the document element "fm" 3102 and the document element "bdy" 3103 which are arranged in this order.

A document element 3105 pointed to as the content of the document element "ti" 3104 is a character string that is distinguished by the type identifier "#". Note that the content directly comprises a character string "ABCDEF". When a document element insertion command is executed by, for example, selecting a menu on the operation screen, a document element insertion program 12 (FIG. 68) is executed.

FIG. 73 is a flow chart of the document element insertion process to be performed by a document editing apparatus of the foregoing type, where (1) to (4) are indicative of the steps of the process.

An assumption is made that the document portion appointment is in a state where a position next to the document element "ti" is appointed as a subject to be processed. That is, a position next to the first element of the content of the document element "fm" is the subject to be processed.

In step (1) document elements that can be included in the appointed document portion are listed as follows: in accordance with the definition of the type of the document element containing the appointed portion as the content, a document element that is permitted to appear in the foregoing portion is determined.

In this example, the type of the document element having, as the content thereof, the appointed portion is "fm". Furthermore, the appointed portion is positioned immediately in the rear of the document element "ti". Therefore, the definition of the document type shown in FIG. 67 results in the probable document element being the document element "au" or the document element "cau". Thus, the foregoing document elements are listed.

In step (2) an insertion enabled document element is displayed on a dialogue window 102 to cause an operator to select one document element. An example of the operation screen at this time is shown in FIG. 74.

FIG. 74 illustrates an example of display for selecting a document element on the document editing apparatus shown in FIG. 68.

When an editor selects a document element and clicks a selection button 103, the operation proceeds to step (3) to insert the selected document element into a portion of the selected document data. If the editor selects the document element "rau", a document element 3106 is created which is then inserted into a position next to the document element 3104. Thus, the structure of the document data is updated as shown in FIG. 75.

FIG. 75 illustrates a process performed by the document editing apparatus shown in FIG. 68 for updating the structure of document data.

The appointment of the document portion is updated immediately after the inserted document element.

Then, the updated document data is shaped and again displayed in step (4). An example of display of the thus-updated document on the operation screen is shown in FIG. 76.

FIG. 76 illustrates an example of a screen of the document editing apparatus after a document element has been selected.

The operation of the document editing apparatus for processing a structured document will now be described.

When the structured document editing apparatus is started and the type of the document to be processed is selected from the menu, for example, the document type "book" is selected, and a display as shown in FIG. 79 is created.

FIG. 79 illustrates an example of the operation screen when the structured document is processed by the document editing apparatus.

Referring to FIG. 79, reference numeral 401 represents a graphic cursor that is controlled by the mouse 2 (FIG. 68). Reference numeral 402 represents an insertion cursor that indicates a present insertion point. The insertion cursor 402 can be moved by using the mouse 2 or the cursor moving key of the keyboard 1.

The event initiated to occur by the mouse 2 or the cursor moving key executes the document element portion appointing program 11 so that the corresponding position in the document data 31 and that of the cursor on the operation screen are updated.

Reference numerals 403 and 404 represent start and end symbols of the document element that correspond to start and end tags of the SGML original document. At this time, the document data 31 is as shown in FIG. 80.

FIG. 80 illustrates the structure of the document data in the document editing apparatus of the foregoing type.

When the insertion cursor 402 is positioned at the position shown in FIG. 79, that is, when the content is included in the empty document element "book", execution of the document element insertion command performed by selecting the menu on the operation screen causes the document element insertion program 12 to be executed. Then, the process shown in the flow chart shown in FIG. 73 is repeated so that processing of the structured document is completed.

When the processed or edited document is saved, the document data 31 is converted into the description format of the standard generalized markup language and the converted data is transmitted to the sub-storage unit 20 as a SGML original document 21.

As an alternative to the conversion into the description format of the standard generalized markup language, data in the internal format is sometimes transmitted to the substorage unit 20 as document data 22 to be stored.

Documents in specific formats can be processed more efficiently on the basis of a template as compared with processing it in a blank state. The template is prepared by previously including fixed documents together with structure information.

When document data is prepared to form the data structure as shown in FIG. 77, a screen as shown in FIG. 78 is displayed when document processing has been started.

When the skeleton of the document is previously displayed, facts that the title of the document is determined to be "ABCDEF" and that the title of the chapter must be described are indicated by the leading symbol 105 and the final symbol 106 of the document element "ct" 3107.

As for the author, the selection permitted such that a person or a corporation can be selectively registered as the author results in that the symbols indicating the document elements cannot be displayed previously. Therefore, use of the template of a document raises a problem that information can be undesirably excluded from entry.

In order to overcome the problem, it might be considered feasible to previously prepare a plurality of development patterns.

However, if the development patterns to be prepared previously are automatically processed from the data that describes the structure in the SGML format shown in FIG. 67, a multiplicity of patterns except the development pattern intended to be processed by a user are processed simultaneously. Thus, an excessive amount of time and a large memory are required, so that the operation cannot be completed efficiently.

SUMMARY OF THE INVENTION

Accordingly, an object of the present invention is to overcome the foregoing problems by providing a document editing apparatus which has an arrangement that a document element is inserted into a corresponding position of a processed structured document data (template document data) before the document element is developed so that deformed template document data is efficiently processed from the processed template document data and is edited.

According to one aspect of the present invention, there is provided a document editing apparatus for editing a document in which document elements are structured in a nested manner, the document editing apparatus comprising: portion appointing means for appointing a portion of the document into which a document element is to be inserted; alternative element insertion means for inserting an alternative element into the portion of the document appointed by the portion appointing means; and alternative element developing means that substitutes the alternative element inserted by the alternative element insertion means with an appointed document element to store the appointed element.

According to another aspect of the present invention, there is provided a document editing apparatus for editing a document in which document elements are structured in a nested manner, the document editing apparatus comprising: selection means for selecting development format information required to process a document; alternative element processing means for processing an alternative document element in accordance with development format information selected by the selection means; and alternative document element developing means that substitutes the appointed alternative element or the document element in the alternative document element processed by the alternative element processing means with a selected document element or an alternative document element to store the substituted element.

According to another aspect of the present invention, there is provided a document editing apparatus for editing a document in which document elements are structured in a nested manner, the document editing apparatus comprising: selection means for selecting all development format information required to process a document; alternative element processing means for processing an alternative document element in accordance with the development format information selected by the selection means; alternative document element developing means that substitutes the appointed alternative element or the document element in the alternative document element processed by the alternative element processing means with a selected document element or an alternative document element to store the element; and pattern appointing means for appointing a development pattern format of a string of the alternative document element stored in the alternative document element developing means, wherein the alternative document element developing means substitutes the appointed alternative document element or the document element in the alternative document element processed by the alternative document element processing means with a selected document element or an alternative document element in accordance with the development pattern format appointed by the pattern appointing means to store the substituted element.

A document editing apparatus according the present invention has an arrangement that a symbol indicating the document element to be stored in the alternative document element is displayed.

A document editing apparatus according the present invention has an arrangement that a selection menu for the document element to be developed on the alternative document element is provided additionally.

Other and further objects, features and advantages of the invention will be appear more fully from the following description.

BRIEF DESCRIPTION OF THE DRAWINGS

FIG. 35 illustrates the structure of a development information set in the document editing apparatus according to the present invention;

FIG. 36 illustrates a state of display of combination of the development information sets in the document editing apparatus according to the present invention;

FIG. 37 illustrates a state of display of combination of the development information sets in the document editing apparatus according to the present invention;

FIG. 38 illustrates a state of display of combination of the development information sets in the document editing apparatus according to the present invention;

FIG. 62 illustrates a state of display of the structure of the document data shown in FIG. 61;

FIG. 64 illustrates an example of a development pattern in the document editing apparatus according to the present invention;

FIG. 67 illustrates an example of a development format described in a standard generalized markup language in a document editing apparatus of the foregoing type;

DETAILED DESCRIPTION OF THE PREFERRED EMBODIMENTS

First Embodiment

Figure 1:
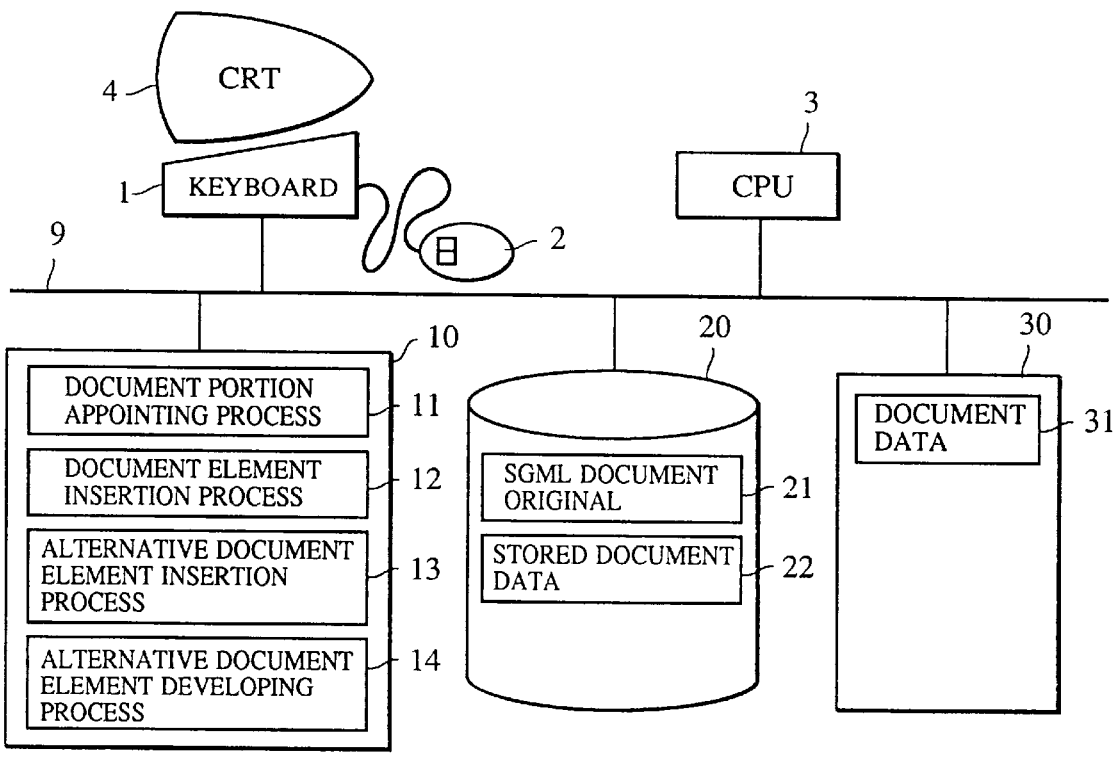
FIG. 1 is a block diagram which illustrates the structure of a document editing apparatus according to a first embodiment of the present invention.

FIG. 1 is a block diagram which illustrates the structure of a first embodiment of a document editing apparatus according to the present invention.

Referring to FIG. 1, a storage unit 10 stores an alternative document element insertion program 13 and an alternative document element development program 14 in addition to the conventional programs.

The thus-constituted document editing apparatus has an arrangement that an alternative document element set by a alternative document element insertion means (the alternative document element insertion program 13) that inserts the alternative document element into a portion instructed by a portion instruction means (a pointing device 2) is replaced with an appointed document element by an alternative document element development means (the alternative document element development program 14) and develops the document element so that an adequate template is processed.

Figure 71:
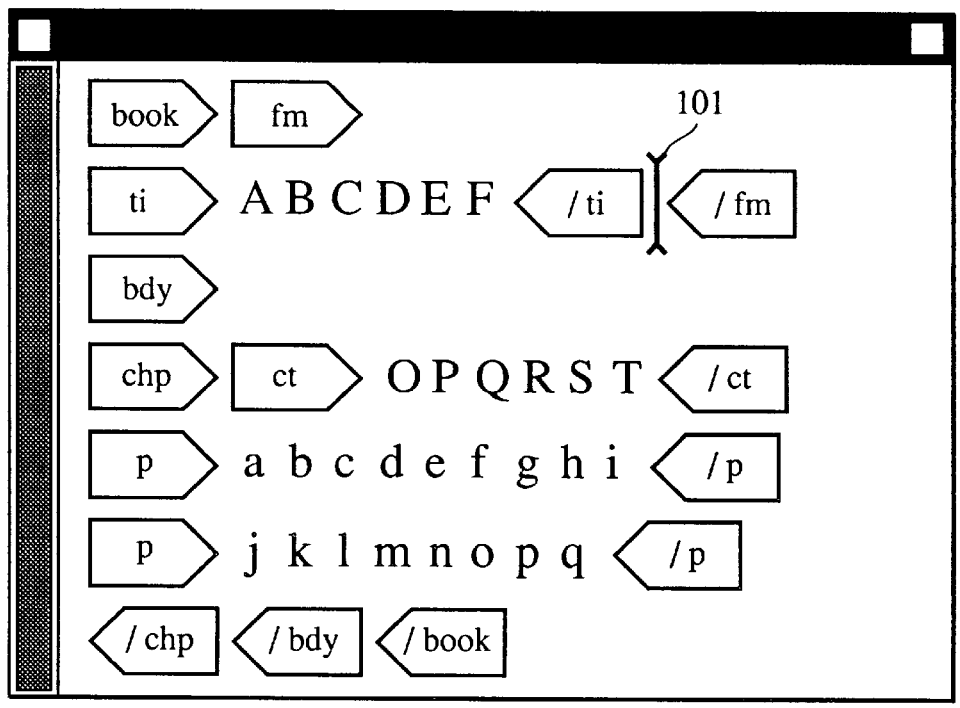
FIG. 71 illustrates an example of an operation screen of conventional structured document editing apparatus;.
Figure 72:
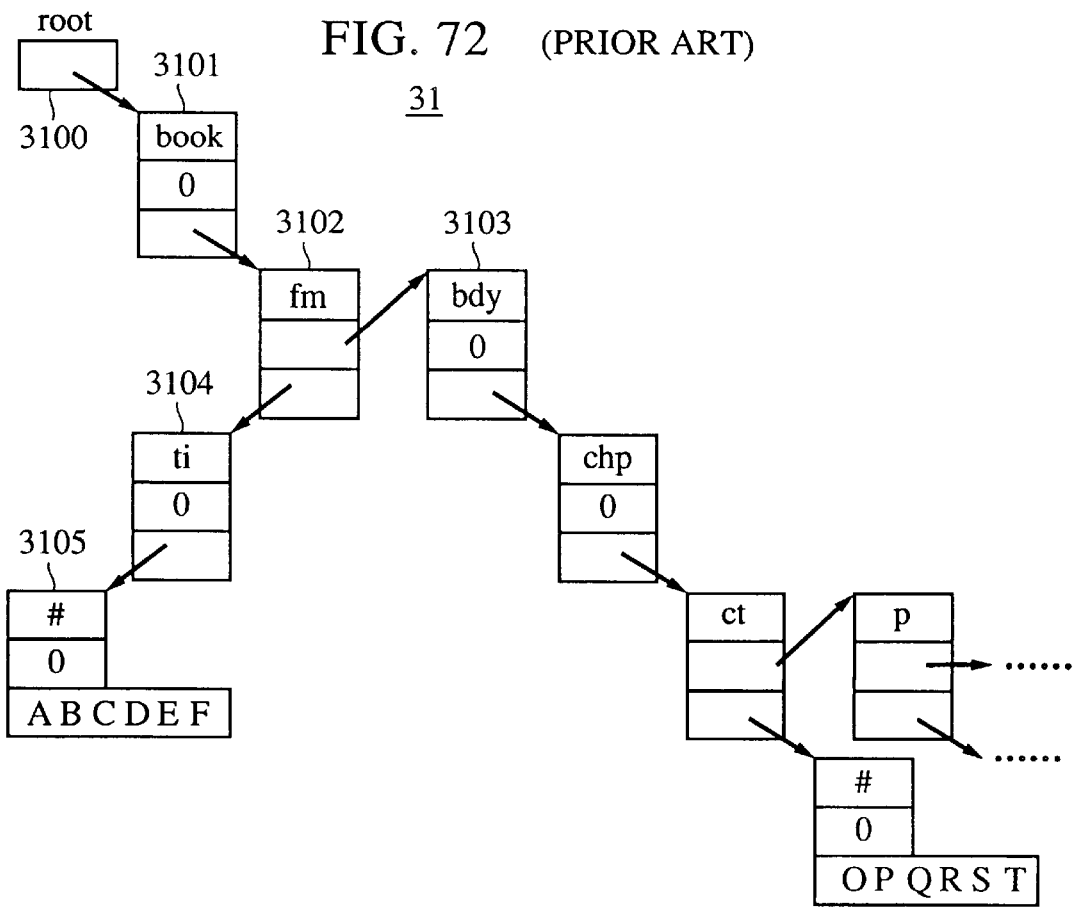
FIG. 72 illustrates the structure of the document data 31 shown in FIG. 68.

An assumption is made that the state of document data is as shown in FIG. 72 and the document portion is appointed such that a position next to the document element "ti" is appointed as the subject to be processed. At this time, an operation screen as shown in FIG. 71 is displayed similarly to that displayed on the conventional structured document editing apparatus.

In this embodiment, an alternative document element operation command is added to the menu so as to be selected, the command addition being performed by using an ordinary window programming.

When the alternative document element operation command is executed by, for example, selection from the menu on the operation screen, the alternative document element insertion program 13 is executed.

Figure 2:
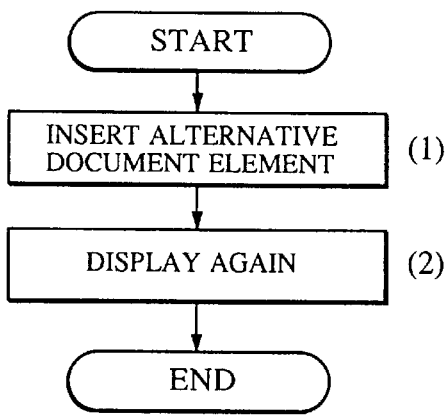
FIG. 2 is a flow chart showing an alternative document element insertion process to be performed by the document editing apparatus according to the present invention.

FIG. 2 is a flow chart of the alternative document element insertion process to be performed by the document editing apparatus according to the present invention. Note that (1) and (2) are indicative of the steps of the process.

In step (1) an alternative document element 3110 is processed and is inserted into a selected document data. Thus, the document data is updated as shown in FIG. 3.

Figure 3:
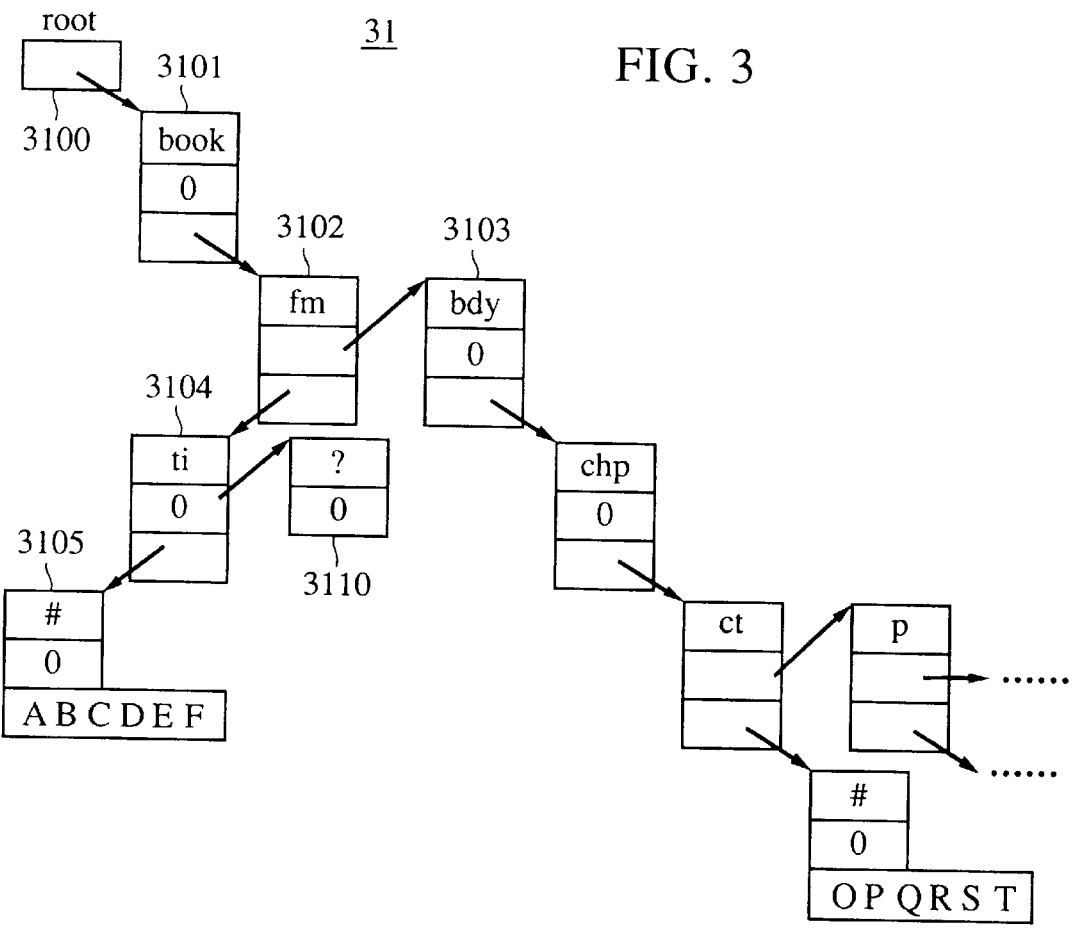
FIG. 3 illustrates a state of updating of document data in the document editing apparatus according to the present invention.
Figure 4:
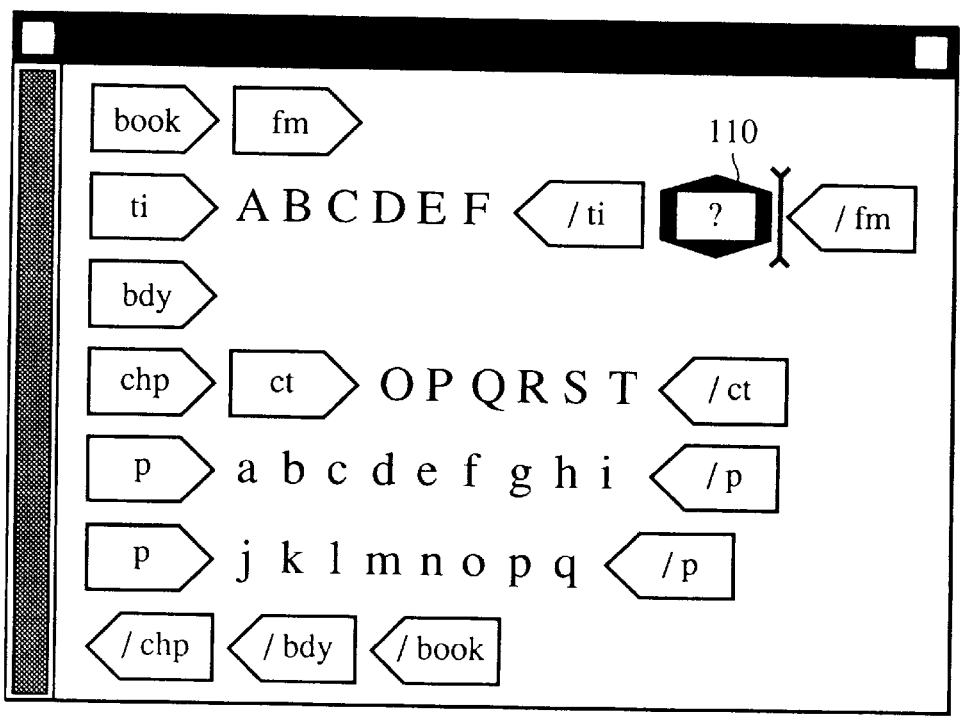
FIG. 4 illustrates an example of an operation screen for updating document data in the document editing apparatus according to the present invention.

FIG. 3 illustrates a state of updating the document data in the document editing apparatus according to the present invention. FIG. 4 illustrates an example of an operation screen for updating the document data in the document editing apparatus according to the present invention.

Note that the realized alternative document element is an element having only identifier "?" and a link region.

In step (2), the updated document data is shaped and again displayed. An example of the updated displayed document on the operation screen is shown in FIG. 4.

A mark 110 is given to the alternative document element 3110 by a method in which the alternative document element is treated as graphic data for example and the graphic is displayed as one character in a sentence.

If the alternative document element is clicked by a pointing device or the like in a state where the document element is temporarily displayed or if the alternative document element has been selected as the subject to be processed before a development command of the alternative document element is executed by the selection from the menu on the operation screen, the alternative document element development program 14 is executed.

Figure 5:
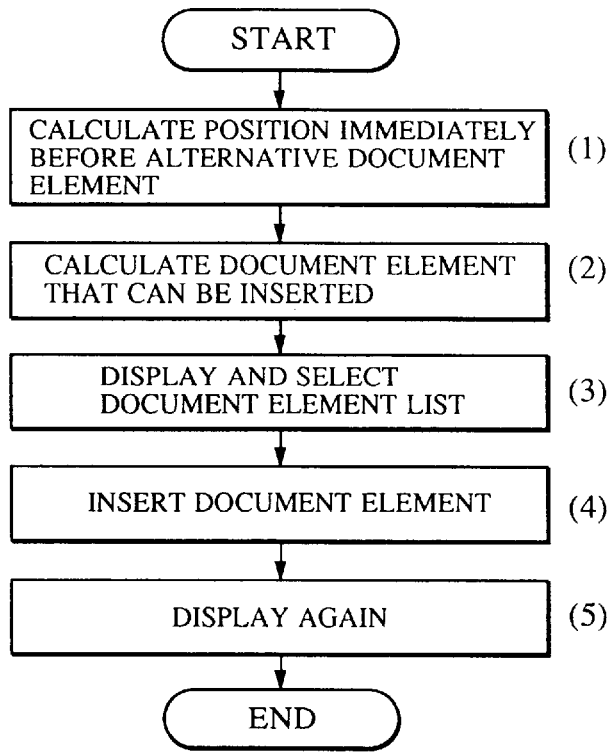
FIG. 5 is a flow chart showing an example of a alternative document element development process to be performed in the document editing apparatus according to the present invention.

FIG. 5 is a flow chart showing an example of the alternative document element development process to be performed by the document editing apparatus according to the present invention. Note that (1) to (5) are indicative of the steps in this process.

In step (1) the position in the document data is calculated by a conventional technology similarly to clicking of a general character or the selection of a subject to be processed in a case where the pointing device for calculating the position immediately in front of the alternative document element required to be developed is used to click the alternative document element on the operation screen or in a case where the alternative document element is selected as the subject to be processed.

In general, the position to be reset due to the execution of a document element portion appointing program 11 is the position immediately before the thus-calculated position of the alternative document element.

Figure 73:
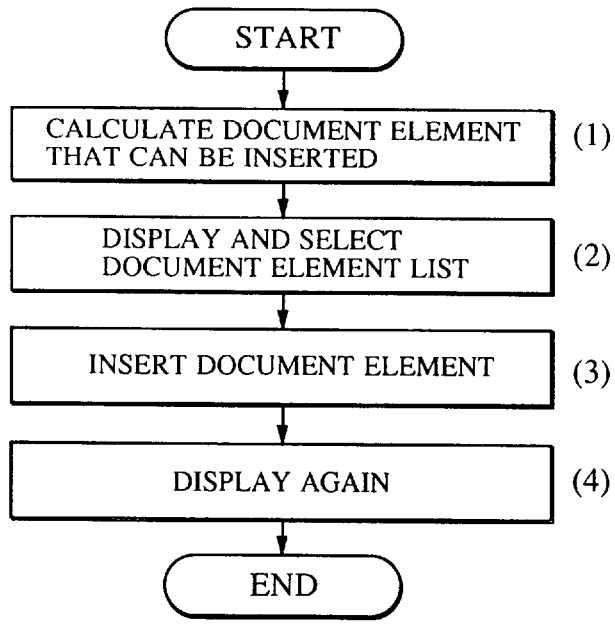
FIG. 73 is a flow chart showing an example of a document element insertion process to be performed by a document editing apparatus of the foregoing type.
Figure 74:
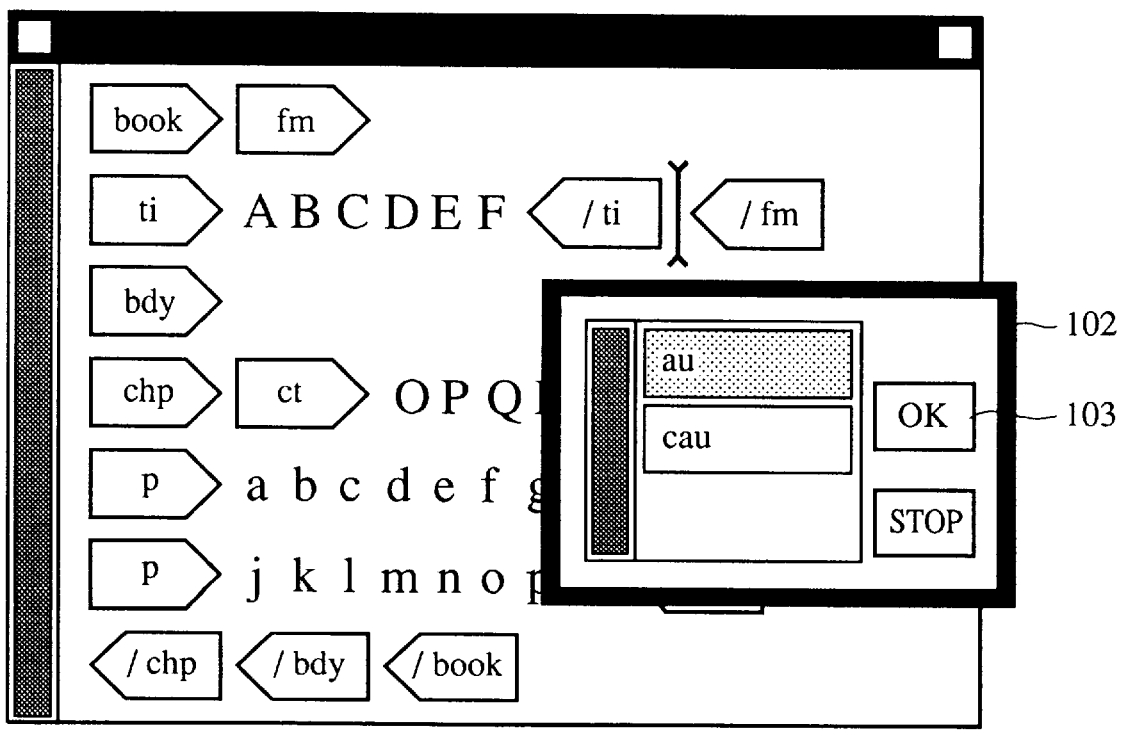
FIG. 74 illustrates an example of an operation screen for selecting a document element in the document editing apparatus shown in FIG. 68.

Then, steps (2) and (3) are performed in this order similarly to steps (1) and (2) of the flow chart of the conventional example shown in FIG. 73.

Figure 6:
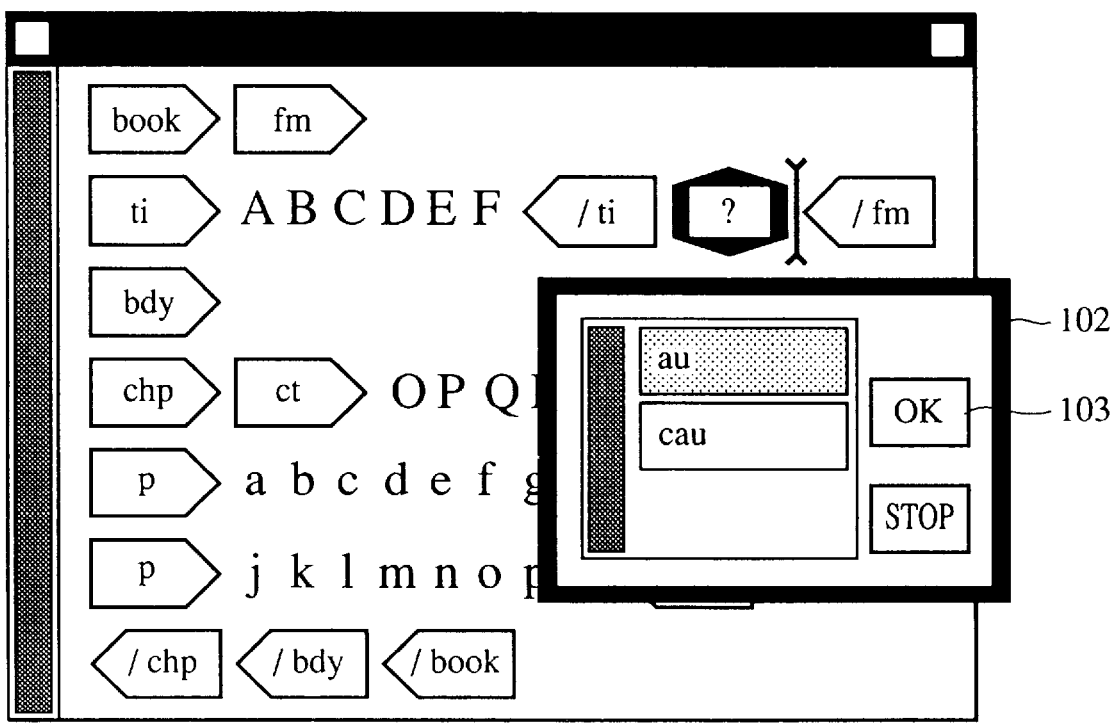
FIG. 6 illustrates an example of an operation screen for inserting the document element in the document editing apparatus according to the present invention.

That is, a dialogue window 102 is displayed on the operation screen as shown in FIG. 6. On the dialogue window 102, document elements that can be inserted are displayed so that one document element is selected by a document editor. When a selection button 103 is clicked, the operation proceeds to step (4).

In step (4) the document element selected in step (2) shown in FIG. 2 is processed with which the alternative document element is replaced.

Figure 75:
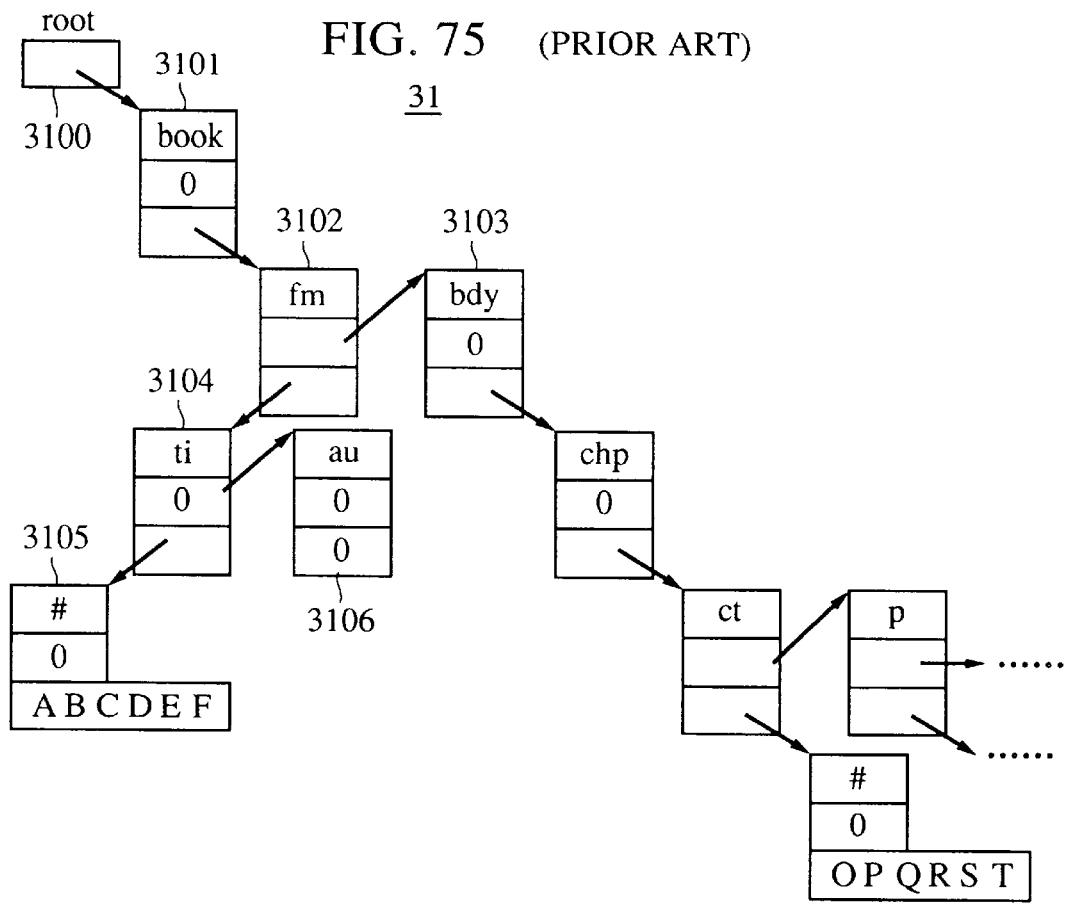
FIG. 75 illustrates a state of updating the structure of document data in the document editing apparatus shown in FIG. 68.

If the document editor has selected document element "au", the document data is updated as shown in FIG. 75 such that the appointment of the document portion is updated immediately to the rear of the replaced document element.

Figure 76:
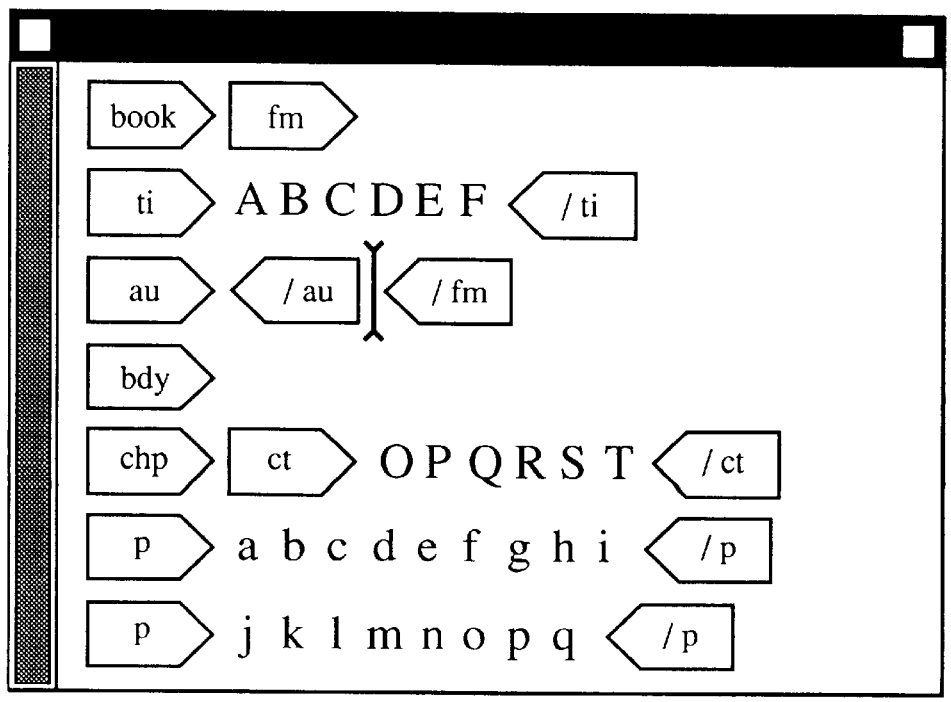
FIG. 76 illustrates an example of an operation screen for selecting the document element in the document editing apparatus shown in FIG. 68.
Figure 77:
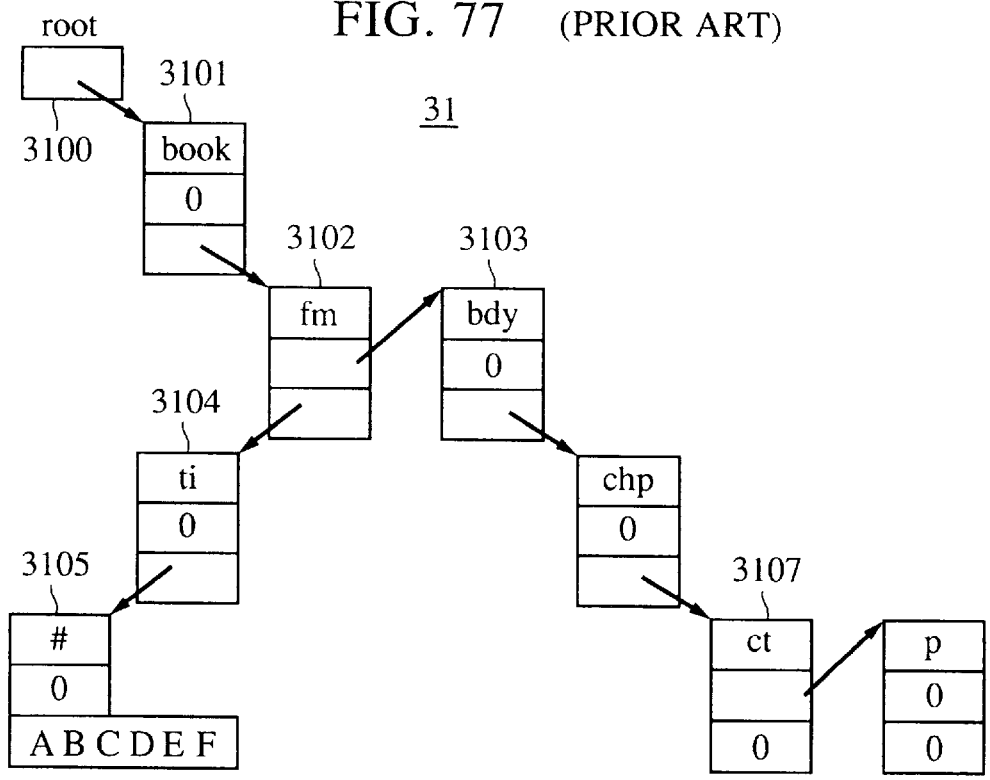
FIG. 77 illustrates the structure of the document data in a document editing apparatus of the foregoing type.
Figure 78:
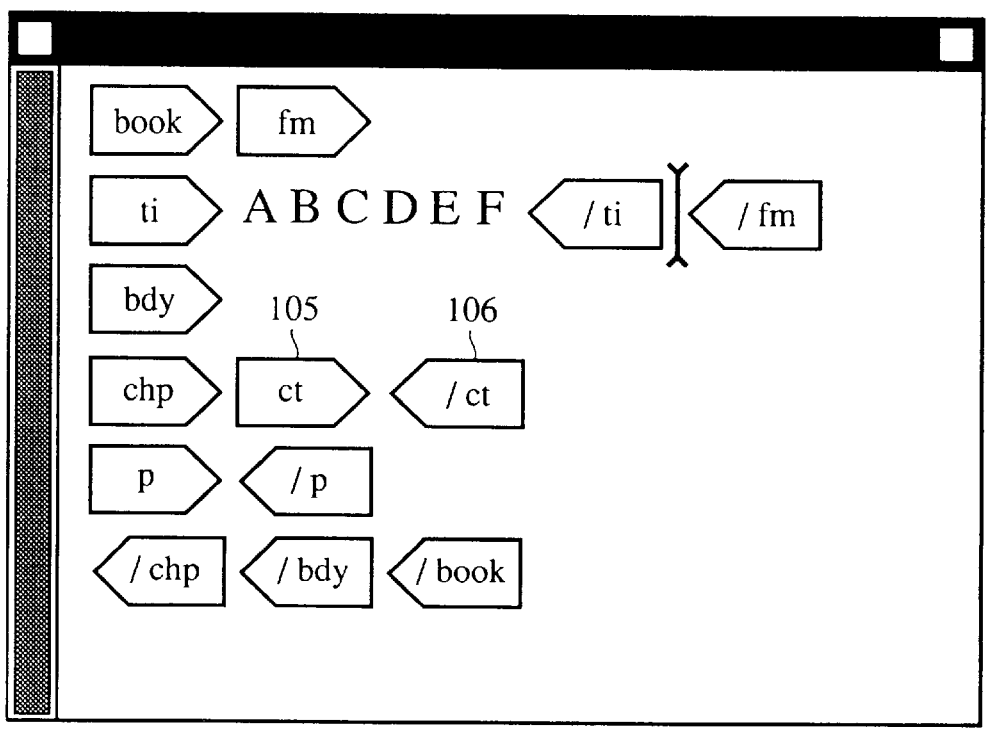
FIG. 78 illustrates an example of an operation screen for editing the document data in a document editing apparatus of the foregoing type.
Figure 79:
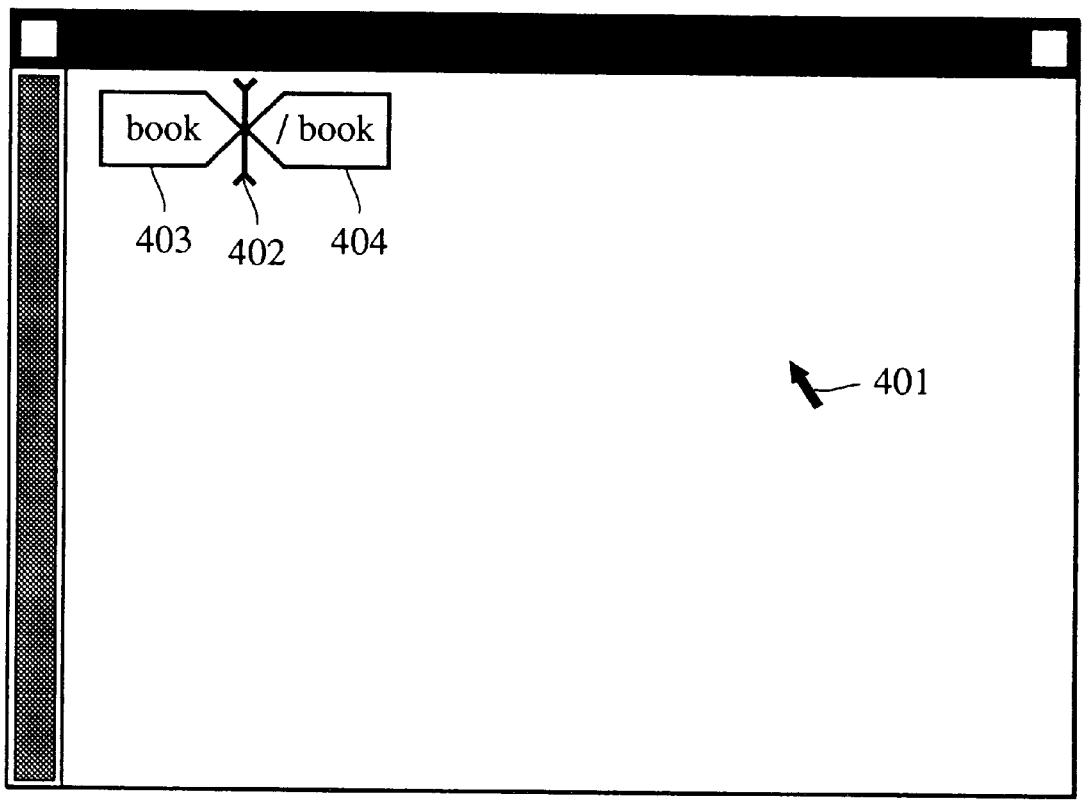
FIG. 79 illustrates an example of an operation screen for processing a structured document in a document editing apparatus of the foregoing type.
Figure 80:
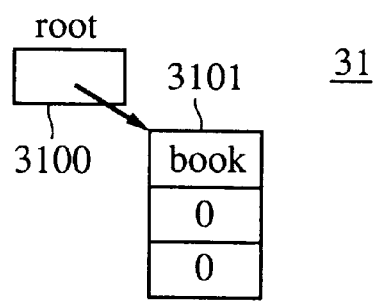
FIG. 80 illustrates the structure of document data in a document editing apparatus of the foregoing type.

In step (5) the updated document data is shaped and displayed again. The updated document is displayed on the operation screen similarly to the conventional structure as shown in FIG. 76.

In step (5) a process similar to step (4) of the flow chart shown in FIG. 73 is performed.

Thus, the alternative document element can be inserted and it can be developed afterwards.

Therefore, the document data in a state where the alternative document element has been inserted is stored as document data 22. The document data 22 to be stored or a copy of this is loaded in a storage unit 30 as document data 31 and a method of restarting the structured document editing operation is employed. Thus, a required portion of the described content can be expressed with an alternative character.

Figure 7:
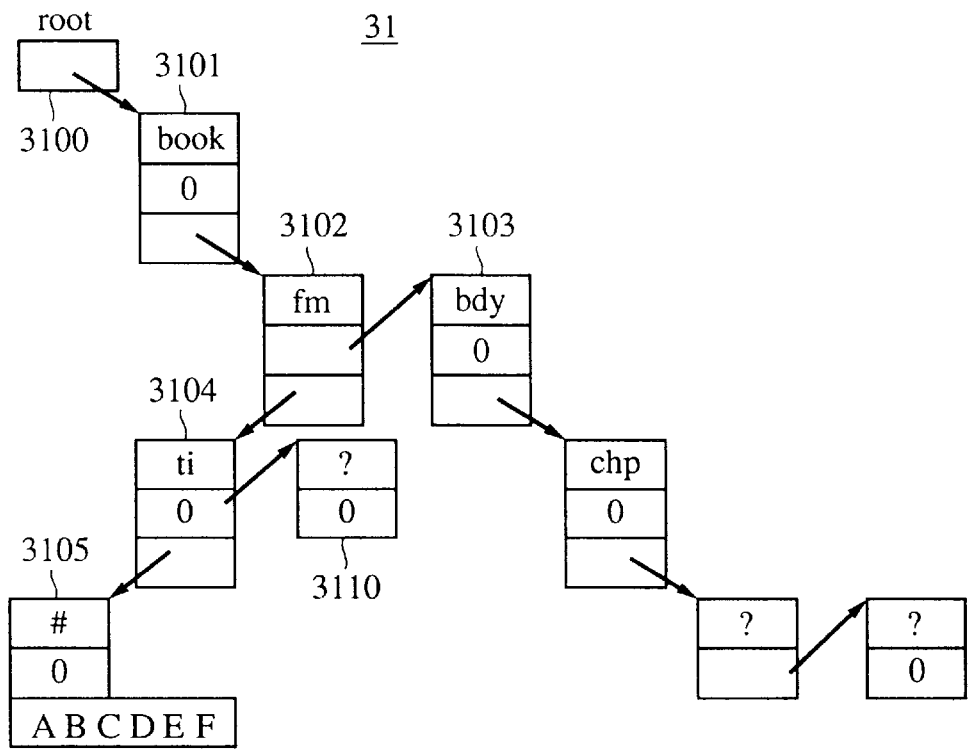
FIG. 7 illustrates original data to be edited in the document editing apparatus according to the present invention.
Figure 8:
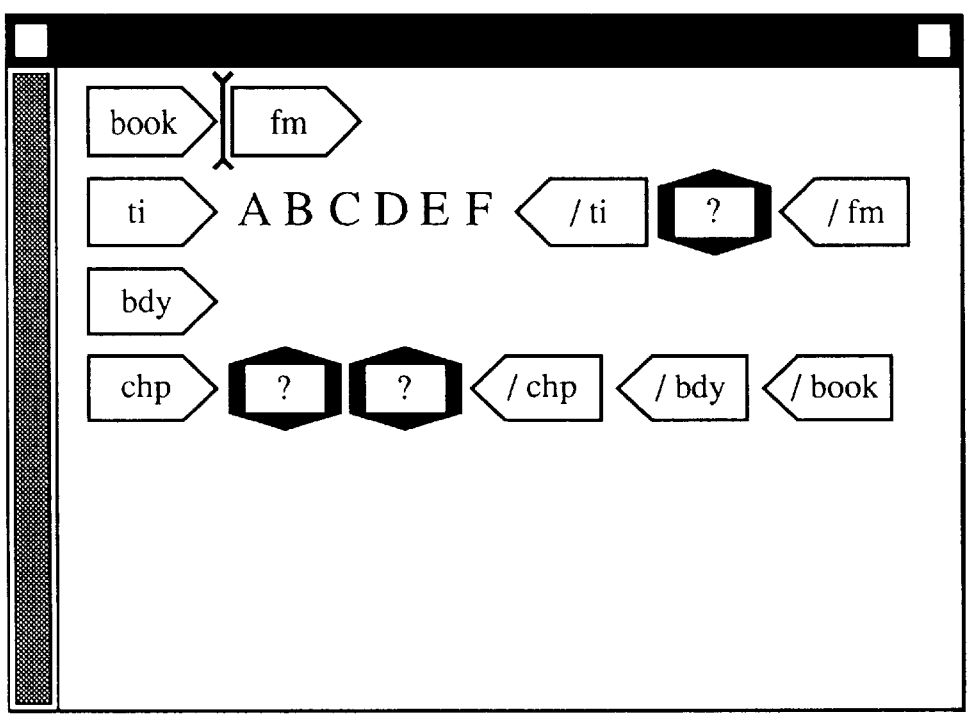
FIG. 8 illustrates an example of an operation screen for controlling original edition data shown in FIG. 7.

FIG. 7 illustrates model edition data for use in the document editing apparatus according to the present invention. FIG. 8 illustrates an example of an operation screen on which the model edition data shown in FIG. 7 is displayed.

If the document edition operation is restarted on the basis of the document data shown in FIG. 7, the document process starts with the screen shown in FIG. 8. That is, facts that the title of the document has been determined and the author and the content of the chapter must be processed are clearly displayed.

In the description above, the operation to be performed has been described in a state the document portion is appointed at a position between elements, the position at which the document element is inserted is maintained and the insertion cursor is displayed at the foregoing position. The present invention can be applied to a case where an arrangement of specific elements, that is, a portion of the document content, is maintained. In this case, the appointed partial range is removed and a state of appointing the document portion is realized while using the foregoing position as the document element insertion position.

First Modification of First Embodiment

In the first embodiment, the insertion of the alternative document element is performed in such a manner that the same alternative document element is inserted into the document data regardless of the position of the alternative document element. This modification is characterized in that an alternative document element in the form corresponding to the document element is inserted.

The basic structure is constituted similarly to the first embodiment except the flow chart for performing the alternative document element insertion program 13 and that for performing the alternative document element development program 14.

A state where the alternative document element insertion command is required by a document editor and the alternative document element insertion program 13 is executed will now be described with reference to a flow chart shown in FIG. 9.

Figure 9:
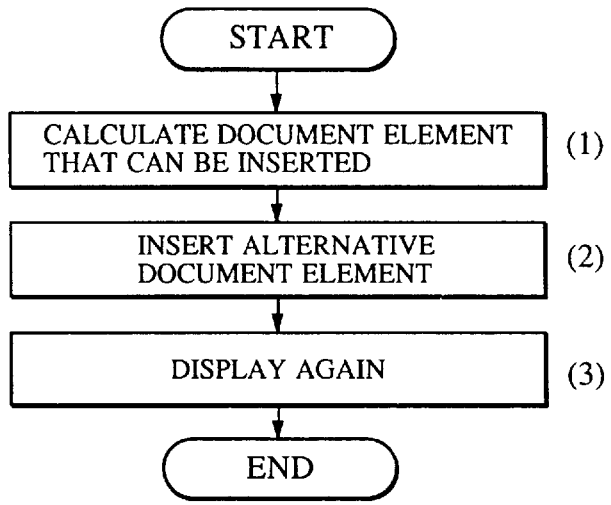
FIG. 9 illustrates an example of the alternative document element insertion process to be performed by the document editing apparatus according to the present invention.

FIG. 9 illustrates an example of an alternative document element insertion process to be performed by the document edition apparatus according to the present invention, where (1) to (3) are indicative of the steps of this process.

In step (1) a process similar to that in step (1) of the flow chart of the conventional structure shown in FIG. 73 is performed in which document elements that can be inserted into the portion are listed.

Then, an alternative document element 3120 is generated to be inserted into the selected document data portion. At this time, as the difference from the first embodiment, the alternative document element 3120 contains, as the content thereof, a document element list 3121 that can be inserted.

The document element list 3121 has the number of items at the leading portion thereof and the items are held at the ensuing positions.

Figure 10:
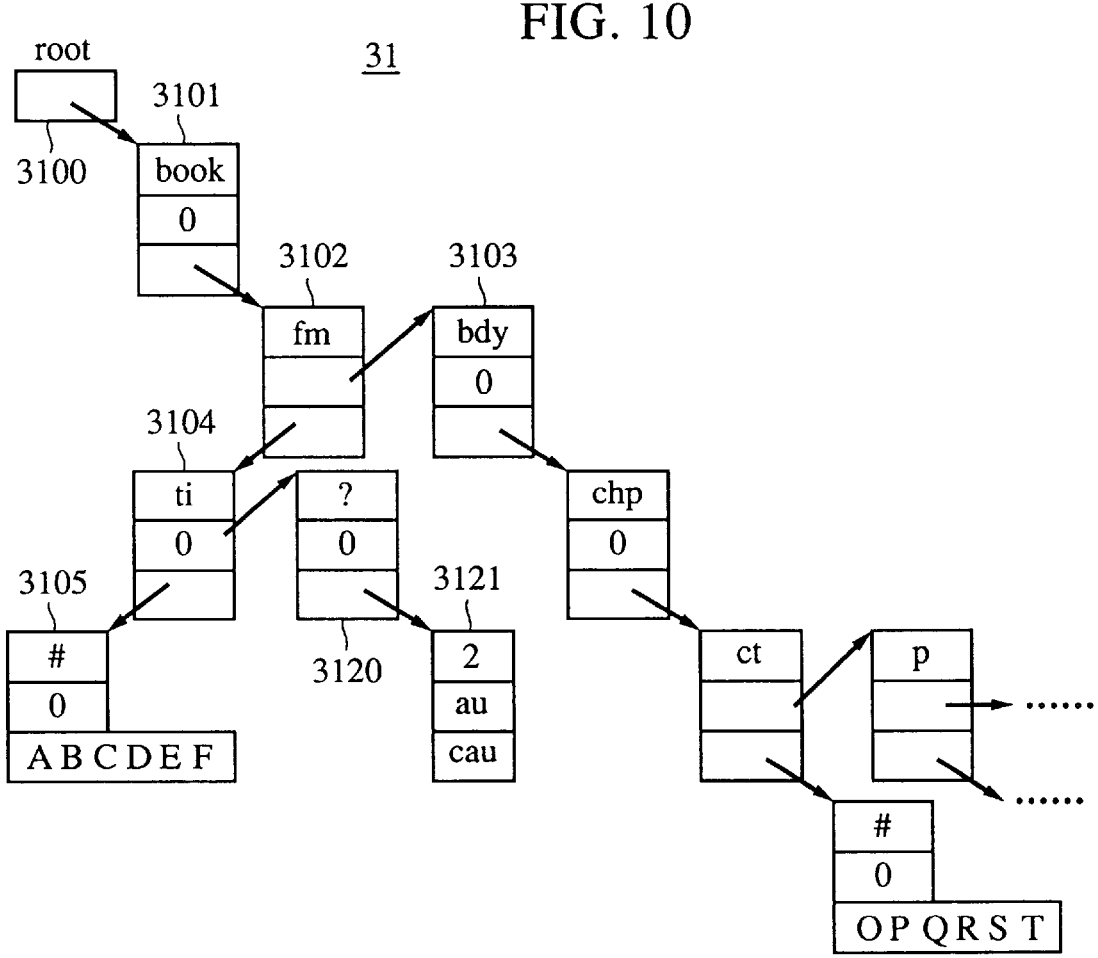
FIG. 10 illustrates the structure of document data in the document editing apparatus according to the present invention.
Figure 11:
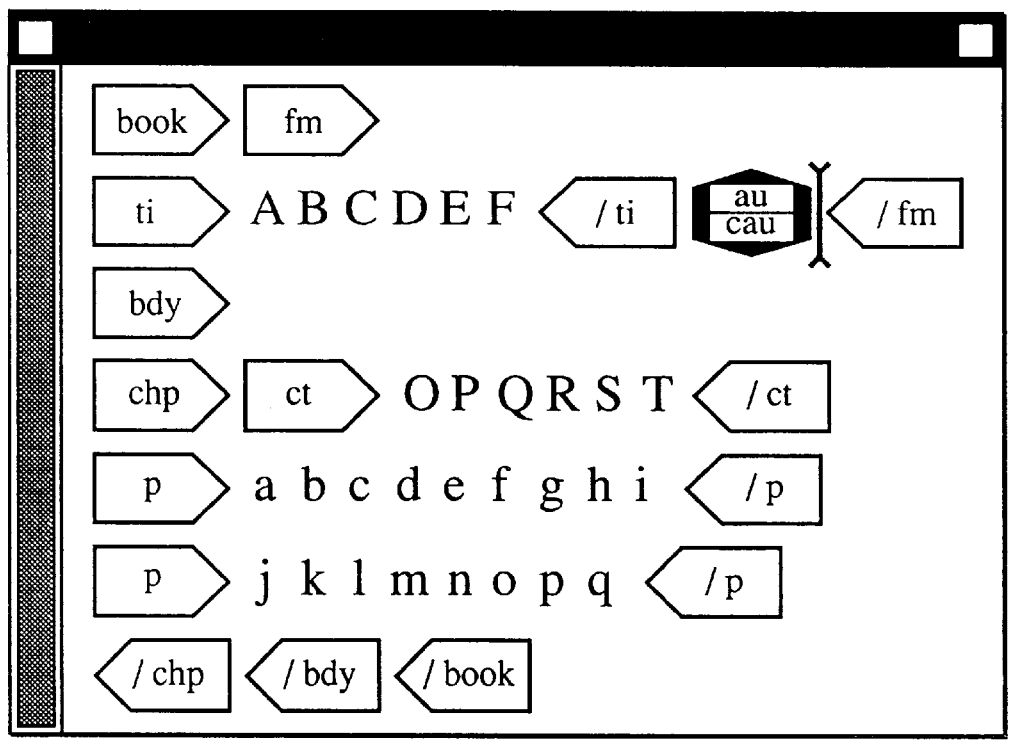
FIG. 11 illustrates an operation screen for inserting alternative document element into the document data shown in FIG. 10.

FIG. 10 illustrates the structure of document data in the document editing apparatus according to the present invention. FIG. 11 illustrates an operation screen for inserting an alternative document into the document data shown in FIG. 10.

Assuming that the document data is in a state as shown in FIG. 72 and the document portion is appointed such that the position next to the document element "ti" is appointed as the subject to be processed, the document data is updated as shown in FIG. 10.

In step (3), the updated document data is shaped and again displayed. The alternative document element is displayed in such a manner that the types of the document elements listed in the document element list 3121 are listed. For example, the alternative document elements are displayed in the form of a pop-up menu as shown in FIG. 11.

If a command to develop the alternative document element is issued, the alternative document element development program 14 is performed.

Figure 12:
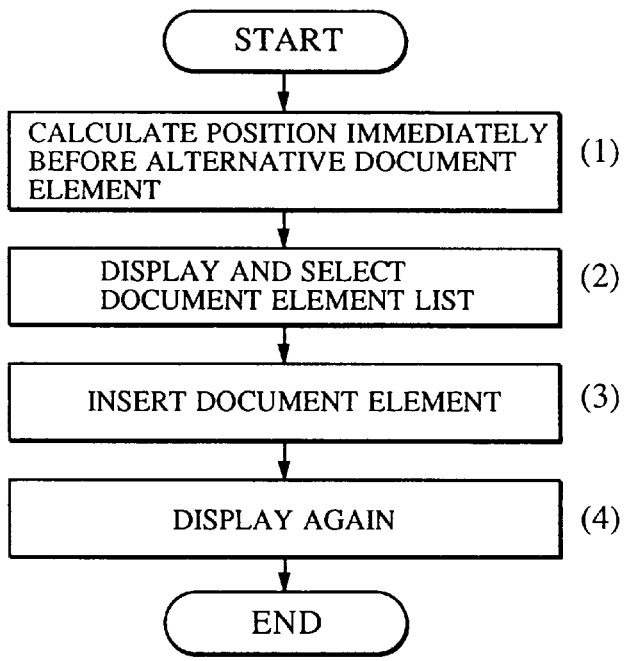
FIG. 12 is a flow chart showing an example of the alternative document element developing process to be performed by the document editing apparatus according to the present invention.

FIG. 12 is a flow chart of an example of the alternative document element development process to be performed by the document editing apparatus according to the present invention, where (1) to (4) are indicative of the steps of the process.

The foregoing flow chart is the same as that of the alternative document element development program 14 according to the first embodiment of the present invention except that step (2) shown in FIG. 5 is omitted. Therefore, its detailed description is omitted.

Briefly, the position at which the alternative document element is developed is calculated in step (1), and the document element list is displayed in step (2) on the basis of the insertion enabled document element list of the alternative document element to wait for the selection made by the document editor. In step (3), the selected document element and the alternative document element are substituted to be displayed in step (4).

As described above, the operation that a portion represented by the alternative document element is replaced with an adequate document element can be performed.

Figure 13:
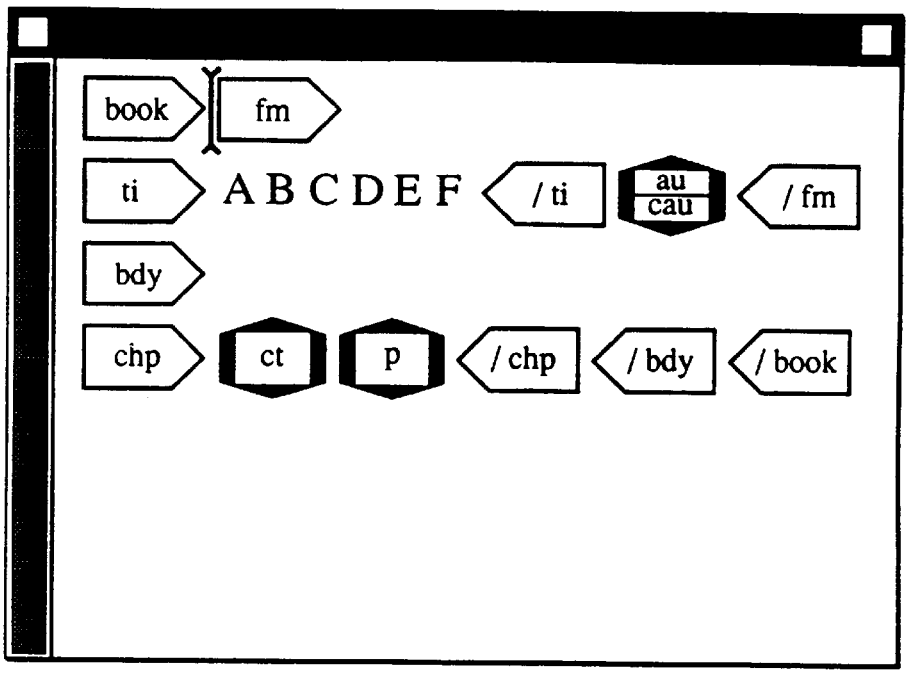
FIG. 13 illustrates an example of an operation screen for substituting an alternative document element in the document editing apparatus according to the present invention.

FIG. 13 illustrates an example of an operation screen for replacing the alternative document element to be performed by the document editing apparatus according to the present invention.

Since the types of the document elements are, in this modification, displayed to be substituted with the alternative document element, a document template having contents to be displayed that are clearly expressed by the alternative document element can be made.

In this embodiment, the insertion enabled document element list is calculated when the alternative document element insertion command is issued; the result of the calculation is added to the alternative document element; and information of this is also used when the alternative document element is developed.

However, another structure may be employed in which the information of the insertion enabled document element is not given to the alternative document element but the same is calculated when the display is performed. In this case, an effect that the quantity of information to be stored can be reduced is obtained.

Second Modification of the First Embodiment

The content of the document elements "ti" and "p" is permitted if it is in the form of a character string. Therefore, the alternative document element is inserted into the portion of the content of the document elements and it is developed, thus resulting in that a dialogue window 102 (FIG. 6) in a state having no element that can be selected in the second embodiment is opened.

The reason for this is that an operation is desired in which the character string, which is one element, is not inserted into the portion but an arbitrary number of characters are inserted into the portion.

Hitherto, in the operation performed by the structured document editing apparatus the character string is not handled as the document element and a character input by using the keyboard 1 is inserted into the position of the insertion cursor.

Therefore, the element such as the document element "ti" that is developed to the content treated as a character in appearance. That is, if a confirmation has been made in a state where no selectable element is present, the insertion cursor is simply placed at the position.

This embodiment has a means for omitting the foregoing wasteful operation.

In a case where the first embodiment is changed to this modification, the alternative document element development program 14 is substituted with another alternative document element development program.

Figure 14:
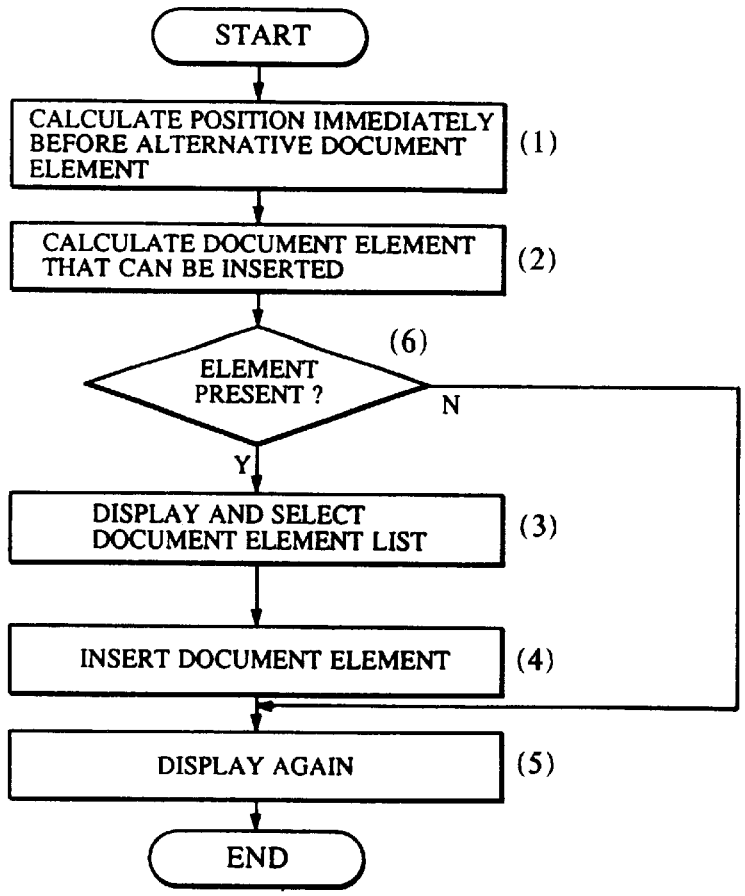
FIG. 14 is a flow chart showing an example of another alternative document element developing process to be performed by the document editing apparatus according to the present invention.

A flow chart of the another alternative document element development program is shown in FIG. 14.

FIG. 14 is a flow chart showing an example of the alternative document element development process according to this modification to be performed by the document editing apparatus according to the present invention, where (1) to (6) are indicative of the steps of this process.

Steps (1) to (6) of the flow chart according to this modification are similar to steps (1) to (5) of the alternative document element development program 14 shown in FIG. 5 except that an arrangement that a discrimination as to whether or not an insertion enabled document element is present is performed in step (6) before steps (3) and (4), and if no insertion enabled document element is present step (3) and (4) is skipped but step (5) is performed.

Therefore, if an insertion enabled document element is present, an operation which is the same as the alternative document element development program 14 is performed. If no insertion enabled document element is present step (5) is performed in a state where no selected document element is present. Since no selected document element is present at this time, no document element is created, the alternative document element is removed and the position is updated to be a position for a new document portion appointment.

Thus, the insertion cursor is placed in the portion, in which only the character string is inserted, by clicking the alternative document element, thus enabling a character to be inserted by key input. As described above, an effect can be obtained in that a wasteful operation can be omitted at the time of processing a document.

The first modification can be changed to this modification by a similar method.

In order to easily select the character string as the content, symbol * may be employed in the document element list on the dialogue window 102 to select the character string. If a character string is selected in the foregoing case, the foregoing case is treated as a state where no selection item is present.

Third Modification of the First Embodiment

In each of the foregoing embodiments, if the insertion cursor is moved to a position next to "bdy", that is, to a final portion of the content of the basic document element "book" before the alternative document element insertion command is performed, an alternative document element is undesirably inserted into the foregoing position although no document element is inserted into the position.

In a case where the first embodiment is changed to this modification, the alternative document element insertion program 13 is substituted with another alternative document element insertion program. The flow of the alternative document element insertion program is shown in FIG. 15.

Figure 15:
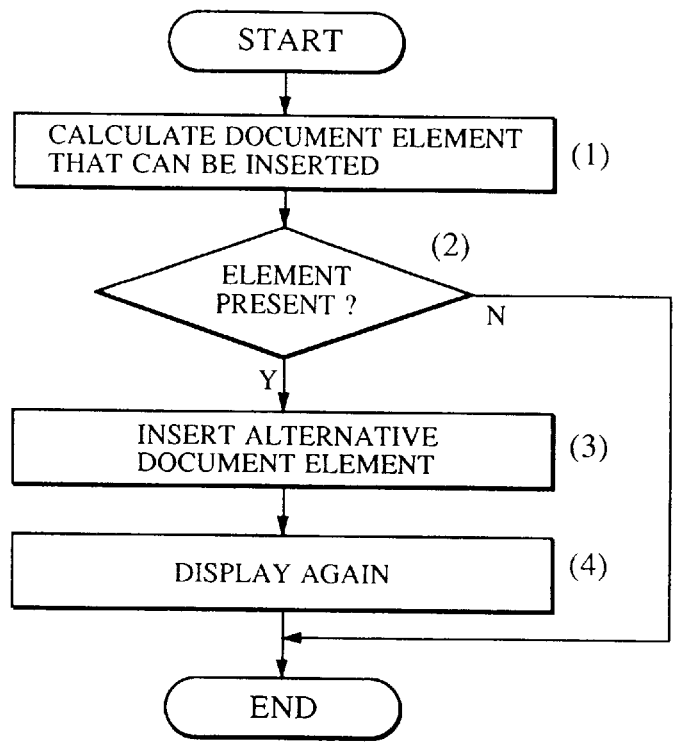
FIG. 15 is a flow chart showing another alternative document element insertion process to be performed by the document editing apparatus according to the present invention.

FIG. 15 is a flow chart of the another alternative document element insertion process according to this modification performed by the document editing apparatus according to the present invention, where (1) to (4) are indicative of the steps of the process.

In step (1) document elements that can be inserted into the position which has been appointed as the document portion are investigated in a manner similar to step (1) of the flow chart of the conventional structure shown in FIG. 73.

In step (2) the operation is branched depending upon whether or not an insertion enabled element is present. If no insertion enabled element is present, this operation is ended. If it is present, steps (3) and (4) are performed in this order.

Steps (3) and (4) are the same as those of the flow chart of the first embodiment shown in FIG. 2 and correspond to steps (1) and (2) of the same. Therefore, descriptions of the foregoing steps are omitted.

Thus, the alternative document element is inserted into only the effective portions. Therefore, an effect can be obtained in that a template having an erroneous alternative document element cannot be made.

Fourth Modification of the First Embodiment

In the first modification of the first embodiment, the types of the document elements that can be developed are displayed on the alternative document element to further clearly express the contents to be described.

This modification is characterized in that the element that is directly developed can be appointed when the alternative document element is developed.

This modification has a structure similar to that of the first embodiment except the flows of the alternative document element insertion program 13 and the alternative document element development program 14. Since this modification is modification of the first modification of the first embodiment, its description is omitted. That is, when insertion of an alternative document element is required, an alternative document element having listed insertion enabled document elements is displayed.

A graphic cursor 104 indicates the position on the screen as controlled by the pointing device 2. The cursor 104 is moved to one of the document elements in the displayed alternative document element list, and is clicked to select a desired alternative document element from the list. Thus, the demand to develop the alternative document element is accepted. An example of the screen at this time is shown in FIG. 16.

Figure 16:
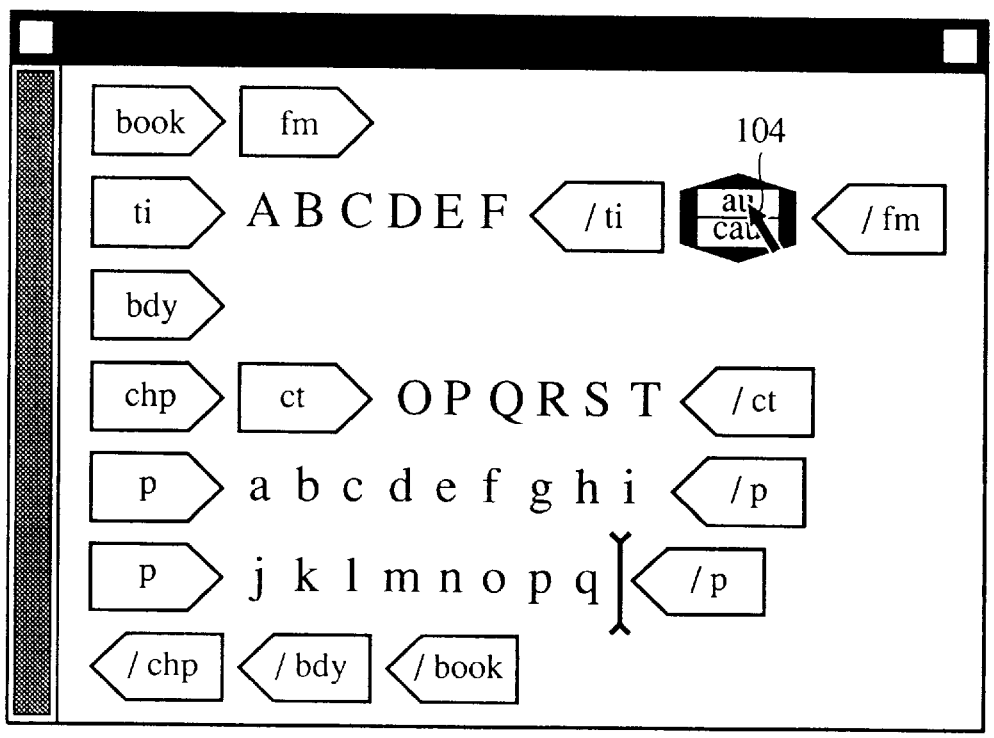
FIG. 16 illustrates an example of an operation screen for developing the alternative document element in the document editing apparatus according to the present invention.

FIG. 16 illustrates an example of the operation screen for the alternative document element development process to be performed by the document editing apparatus according to the present invention.

Figure 17:
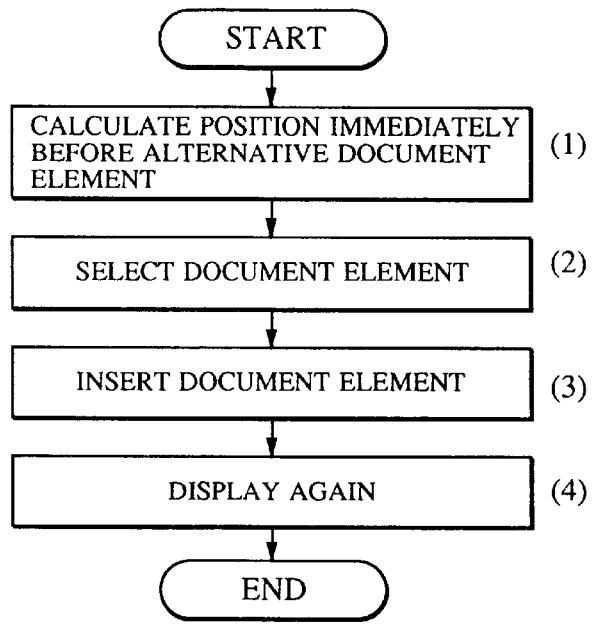
FIG. 17 is a flow chart which illustrates an example of the alternative document element developing process to be performed by the document editing apparatus according to the present invention.

As shown in FIG. 16, when the command to develop the alternative document element is performed, the alternative document element development program shown in FIG. 17 is performed.

FIG. 17 is a flow chart showing an example of the alternative document element development process to be performed by the document editing apparatus according to the present invention, where (1) to (4) are indicative of the steps of this process.

This process is arranged similar to the flow chart of the first modification of the first embodiment shown in FIG. 12.

That is, a similar process is performed and steps (1), (3) and (4) shown in FIG. 17 are the same as steps (1), (3) and (4) shown in FIG. 12. However, as contrasted with the first modification of the first embodiment in which the insertion enabled document elements are listed on the dialogue window, the document element pointed with the position of the clicked graphic cursor 104 is calculated so that the pointed document element is determined to be a subject to be selected.

The foregoing operation can be performed by the conventional processing technology for selecting from a pop-up menu.

The selected document element is substituted with an alternative document element in step (3) and is displayed in step (4).

Thus, the necessity of opening the dialogue window to select a document element at the time of developing the alternative document element can be eliminated and thus an effect can be obtained in that a document can be process in a short time.

An arrangement may be employed in which if a region except the element displayed in the menu is depressed the alternative document element development process according to the first modification is performed. With this arrangement, if a multiplicity of document elements that can be developed is present, a plurality of leading document elements are displayed on the menu and a portion except the menu is clicked in other cases so that the selection can be performed. Furthermore, the shape and/or the color of the alternative document element may be changed depending upon whether or not the document element that can be developed is present in a portion except the menu.

If the order to the document element list added to the alternative document element is changed or a utility capable of deleting a portion of it is prepared, a document template that can be further easily used can be processed because the document element to be entered can be selected or a document element that is used frequently can be placed to the leading portion of the menu.

The utility capable of updating the contents of the specific list can be realized easily by the conventional technology.

Second Embodiment

A second embodiment of the present invention of a document editing apparatus according to the present invention will now be described which introduces an alternative document element in place of a document element, substitutes the document element with the alternative document element, and develops the contents of the document element into a string of document elements or alternative document elements.

Figure 18:
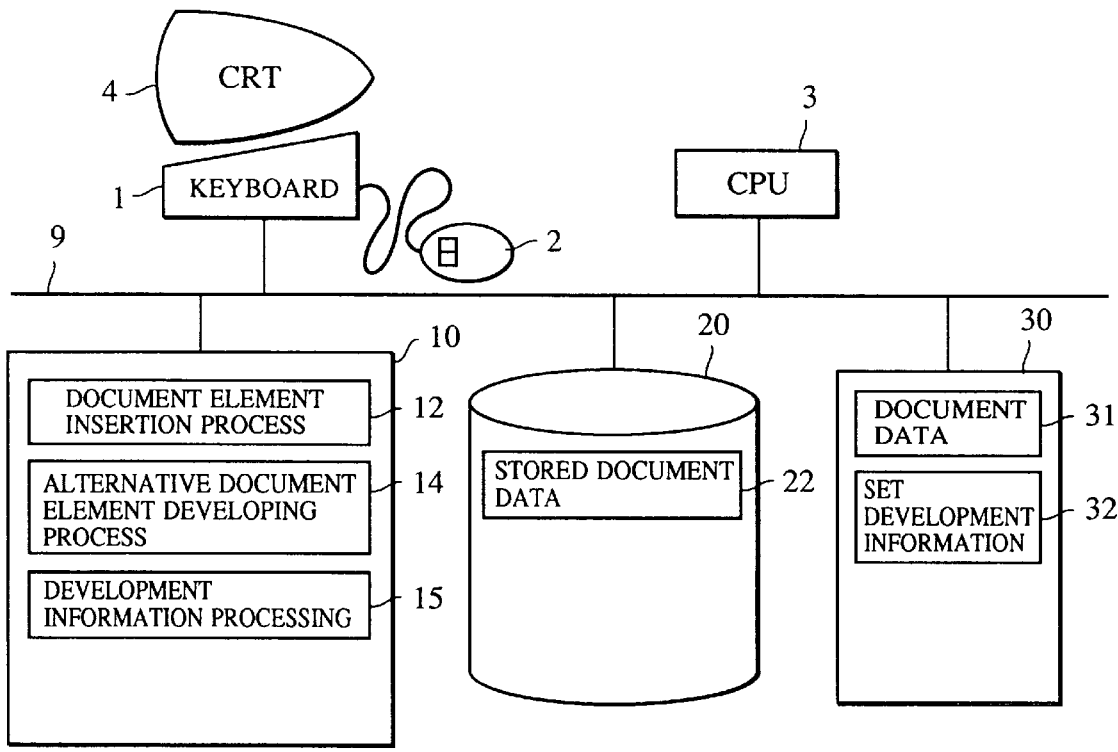
FIG. 18 is a block diagram which illustrates the structure of a second embodiment of the document editing apparatus according to the present invention.

FIG. 18 is a block diagram which illustrates the structure of the document editing apparatus according to a second embodiment of the present invention. The same elements as those shown in FIG. 1 are given the same reference numerals.

The storage unit 10 stores, in addition to the document element insertion program 12, the alternative document element development program 14 and a development information processing program 15. The storage unit 30 stores a development information set 32. In this embodiment, the document element is developed with reference to the development information set 32.

In the document editing apparatus having the foregoing structure, the development information processing means (the development information processing program 15) processes an alternative document element in accordance with development information selected by a selection means (the pointing device 2) for selecting all development format information items stored previously and required to process a document. The appointed alternative document element or the document element in the processed alternative document element is, by the alternative document element development means (the alternative document element development program 14), substituted with the selected document element or the alternative document element so that the document element or the alternative document element to be inserted into a portion in accordance with the document data structure is indicated for the document editor.

First, the development information set 32 will now be described.

The development information set 32 stores the development formats of all document elements required to process a document.

For example, all development formats of the document elements, such as "book", "fm", "ti" and "au", are stored. An example of the storage is shown in FIG. 19.

Figure 19:
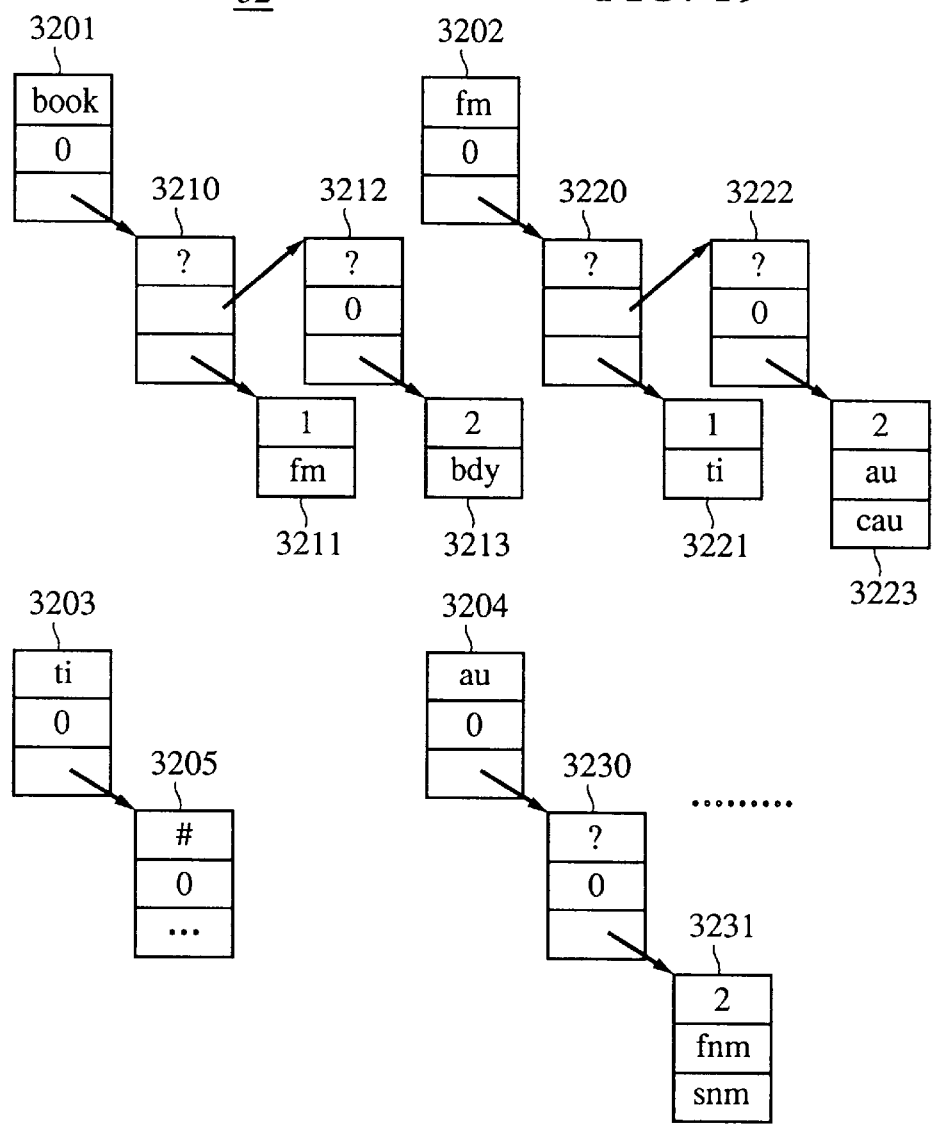
FIG. 19 illustrates the development format of the document element to be stored in a development information set 32 shown in FIG. 18.

FIG. 19 illustrates the development formats of the document elements stored in the development information set 32 shown in FIG. 18.

Referring to FIG. 19, reference numeral 3201, 3202, 3203, 3204 and 3205 represent document element data items and 3210, 3212, 3220, 3222 and 3230 represent alternative document elements.

For example, it can be understood that the content of the document element 3202 "fm" is developed into the alternative document element 3220 having the document element "ti" as the element that can be selected and the alternative document element 3222 having the document element "au" and the document element "cau" as the elements that can be selected, the development being performed in the foregoing order.

The document element data may have the same structure as that of the document element data of the document data 31 of the conventional structure. Also the structure of the alternative document element has the same structure as that of the document element of the conventional structure.

If the name of the document element is "?", the content data has a pointer to point to document element list data in which document elements that can be substituted are registered. The document element list has, in the leading portion thereof, the number of items and, in the ensuing portions thereof, the items.

The development information set 32 of the document type "book" is processed such that all document element that constitute the document type "book" are sequentially subjected to the development information processing program 15 with reference to the definition of the document type shown in FIG. 67. The foregoing process will now be described with reference to a flow chart shown in FIG. 20.

Figure 20:
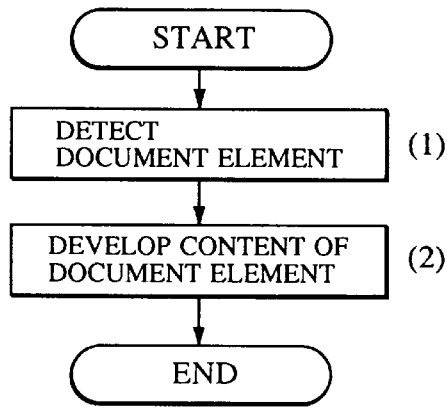
FIG. 20 is a flow chart showing the development information processing operation to be performed by the document editing apparatus according to the present invention.

FIG. 20 is a flow chart of the development information processing operation 15 to be performed by the document editing apparatus according to the present invention, where (1) and (2) are steps of this process.

In step (1) a document element which is the present subject, is detected from FIG. 67.

In step (2) all document element constituting the document element are processed sequentially in the constituting order as the alternative document elements. However, if the document elements to be constituted are a character string, the document elements are not formed into the alternative document elements, but they are formed into document elements of the character string.

For example, the document element "book" has a structure as shown in FIG. 67 that the document element "fm" is placed in the leading portion and the document element "bdy" is positioned next to the document element "document element "fm". Thus, two alternative document elements are processed and development information is processed to start the alternative document element at document element 3201 shown in FIG. 19. Since the document element "ti" contains only a character string, development information starting with the document element 3203 shown in FIG. 19 is made.

A process for processing a document by using the development information set 32 will now be described with reference to a flow chart shown in FIG. 21.

Figure 21:
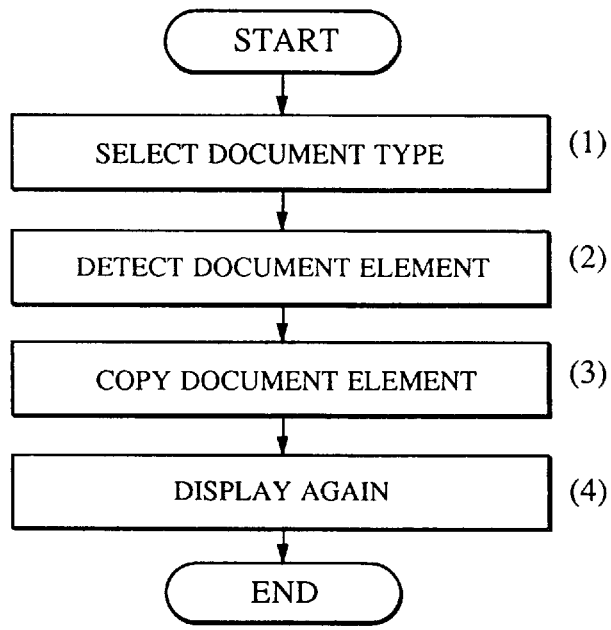
FIG. 21 is a flow chart showing an example of the document processing operation by using the development information set 32 of the document editing apparatus according to the present invention.

FIG. 21 is a flow chart showing an example of a process for processing a document by using the development information set 32 of storage unit 30 in the document editing apparatus according to the present invention, where (1) to (4) are indicative of the steps of the process.

In step (1) the document type intended to be input is selected from the menu. In step (2) a document element having the same name as the document type "book" is detected in the development information set 32. In step (3) a list structure of the document elements and the alternative document elements is processed in accordance with the development format of the document element detected in step (2), the list structure is then stored in the document data 31. If the document type "book" has been input, the document element 3201 is detected from the development information set 32. Since the document element 3201 has the alternative document elements 3210 and 3212, it processes document elements 3101 (FIG. 22) and the alternative document elements 3110 and 3120 and link data and content data are set to form the same structure. By pointing to the document element 3101 through a root 3100, the set data are registered to the document data 31.

If no document element has been detected in step (2), this fact is displayed and the operation is stopped.

In step (4) the document data 31 is shaped and displayed.

The alternative document element is displayed in such a manner that the types of the document elements, the contents data of the alternative document elements of which are described in the pointed document element list are listed on the display. For example, the alternative document elements are displayed in a display form like a pop-up menu.

Figure 22:
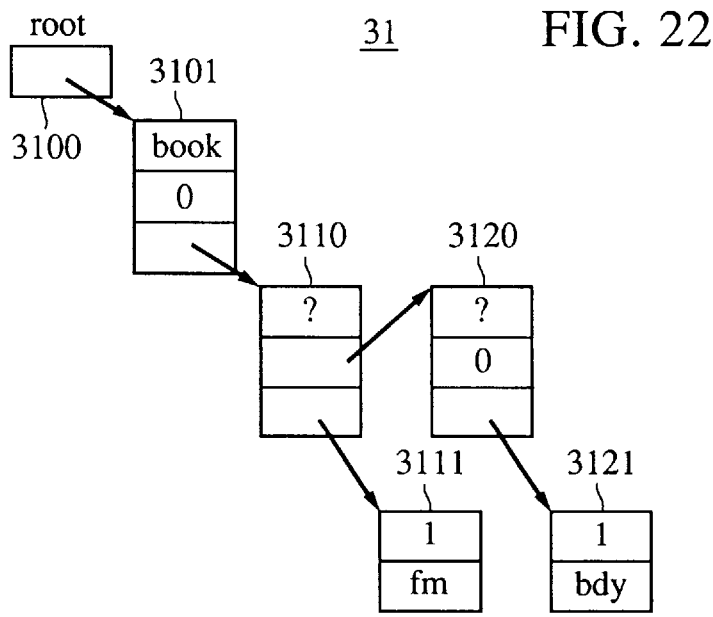
FIG. 22 illustrates the alternative document element displayed on a pop-up menu on the CRT shown in FIG. 18.
Figure 23:
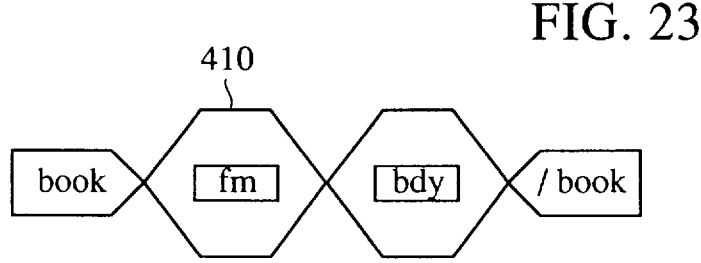
FIG. 23 illustrates the alternative document element displayed on the pop-up menu on the CRT shown in FIG. 18.

The document data 31 and an example of the display when the document type "book" has been selected are shown in FIGS. 22 and 23.

FIGS. 22 and 23 illustrate the structure of the document data and the document data displayed on the CRT 4 shown in FIG. 18.

Referring to FIG. 22, the following document elements of the development information set 32 are stored in the document data 31: the document element 3201 is stored as the document element 3101, the alternative document elements 3210 and 3212 shown in FIG. 19 are stored as the alternative document elements 3110 and 3120, the document element lists 3211 and 3213 are stored as the document lists 3111 and 3121. FIG. 23 graphically illustrates the alternative document element 3110 in the form of a document element 410.

Then, the user performs the operation while selecting the document elements displayed on the alternative document elements. The process will now be described with reference to a flow chart shown in FIG. 24.

Figure 24:
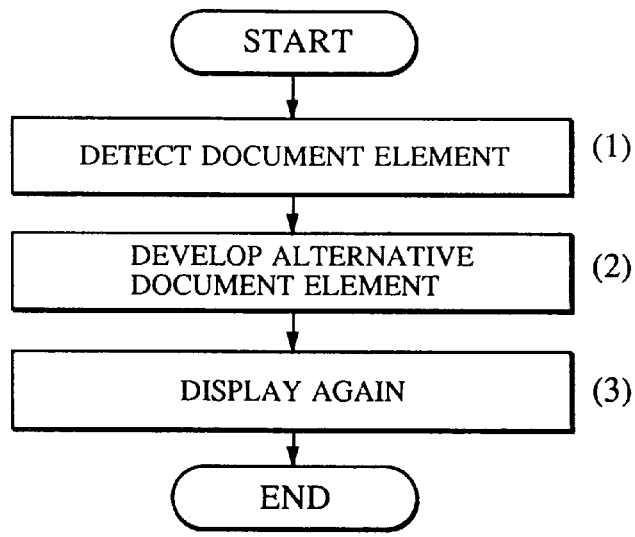
FIG. 24 is a flow chart which illustrates the alternative document element developing process to be performed by the document editing apparatus according to the present invention.

FIG. 24 is a flow chart showing an example of the alternative document element development process to be performed by the document editing apparatus according to the present invention, where (1) to (3) are steps of the process.

In step (1) document elements having the same name as that of the document elements selected by the user are detected in the development information set 32.

In step (2) the alternative document element development program 14 is activated to process the list structure of the document element and the alternative document element in accordance with the development information of the document element which is selected at present so that the alternative document element is replaced with the selected document element. The foregoing operation is the same as step (3) shown in FIG. 21.

However, link data has the value of that of the original alternative document element.

In step (3) the document data 31 is displayed again, which is the same process as step (4) shown in FIG. 21.

Then, document elements are selected from the alternative document elements to continue the foregoing operation so that a structured document having a certain document type is processed.

FIGS. 25 to 29 illustrate a state where the document element development process is performed by the document editing apparatus according to the present invention.

Figure 25:
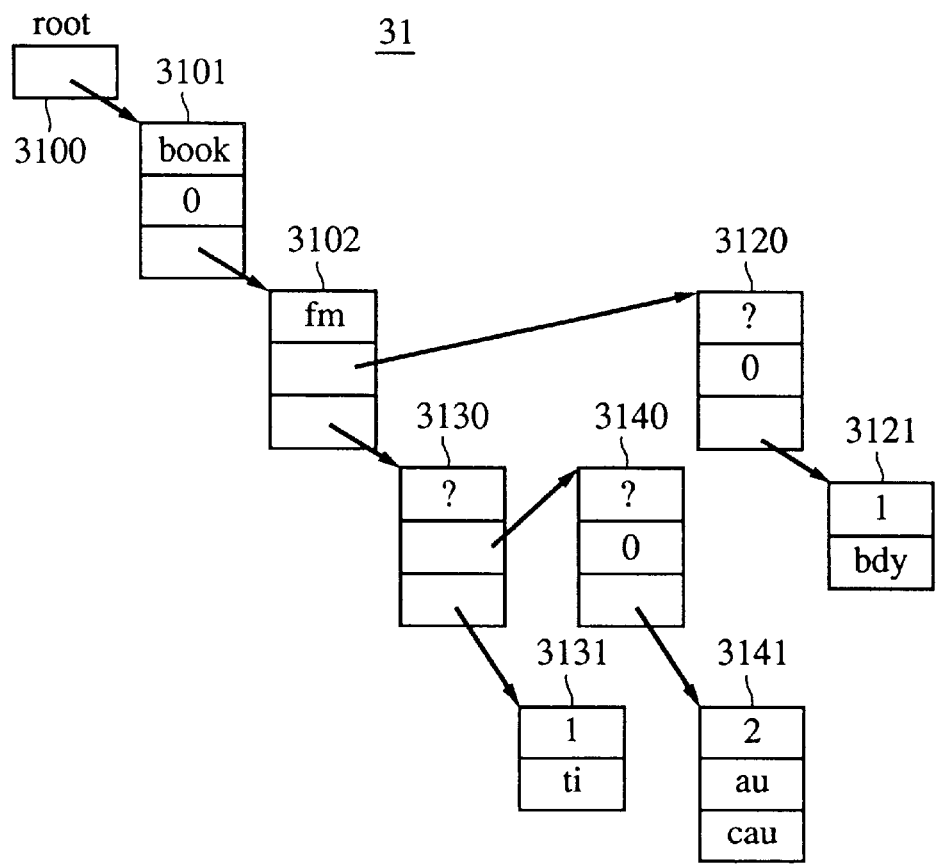
FIG. 25 illustrates a state of the document element developing process to be performed by the document editing apparatus according to the present invention.
Figure 26:
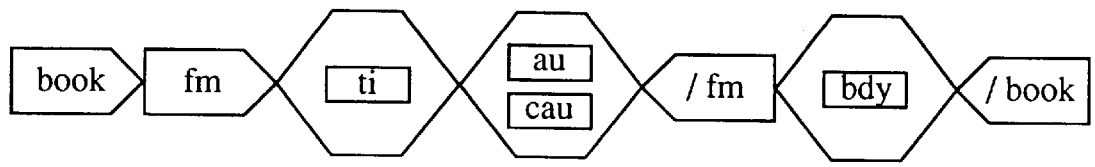
FIG. 26 illustrates a state of the document element developing process to be performed by the document editing apparatus according to the present invention.
Figure 27:
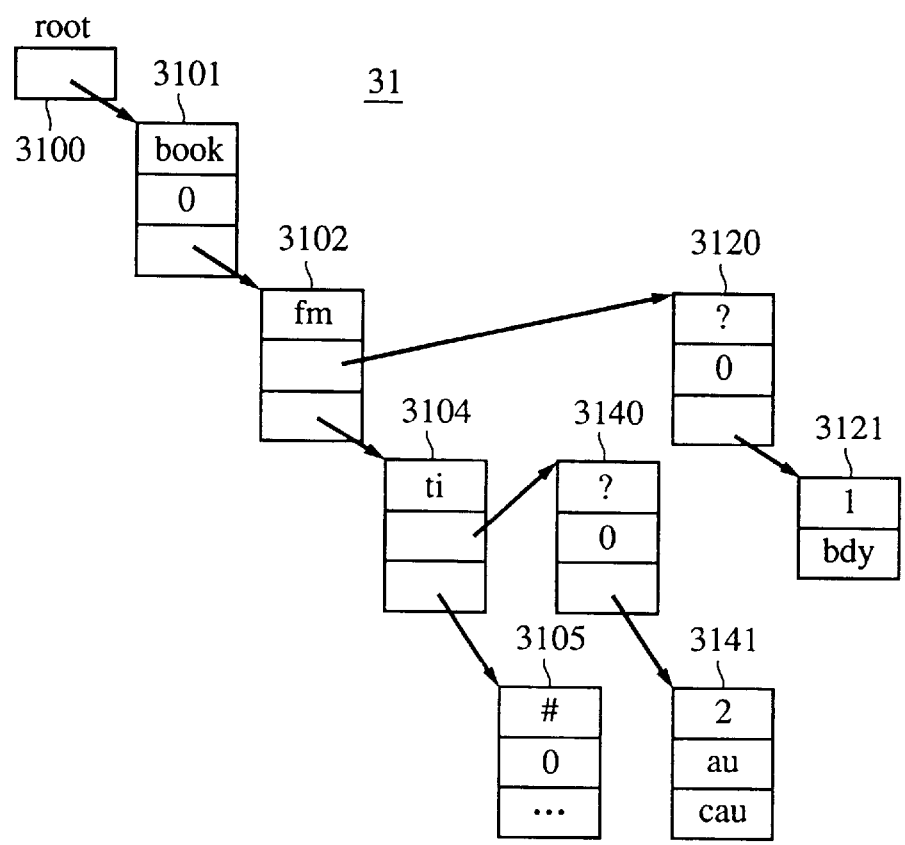
FIG. 27 illustrates a state of the document element developing process to be performed by the document editing apparatus according to the present invention.

The document data 31 and display performed if the document element "fm" is developed are shown in FIGS. 25 and 26. The document data and display performed if the document element "ti" is developed are shown in FIGS. 27 and 28.

The document element 3104 is obtained by developing the alternative document element 3130. However, the link data points to the alternative document element 3140 that has been pointed to by the original alternative document element 3130. The document element 3105 indicates a character string similar to the conventional structure.

Figure 28:
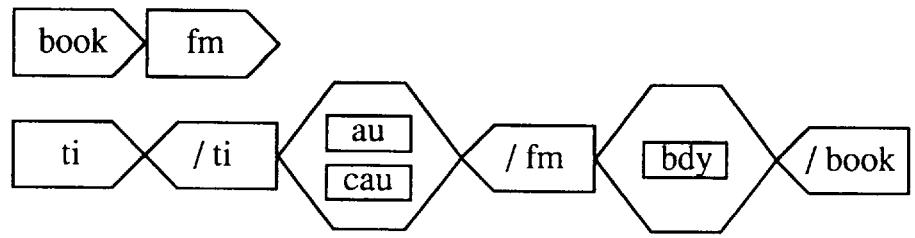
FIG. 28 illustrates a state of the document element developing process to be performed by the document editing apparatus according to the present invention.
Figure 29:
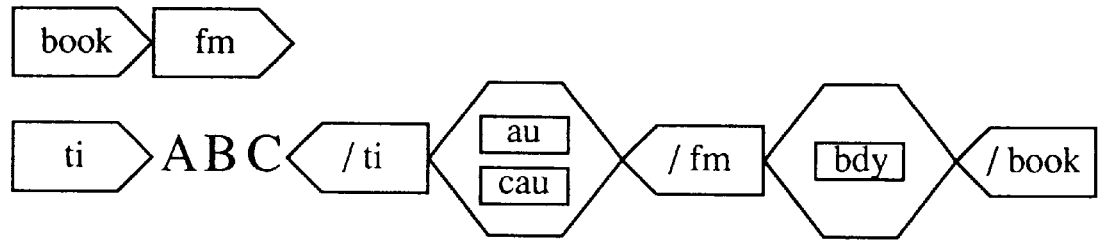
FIG. 29 illustrates a state of the document element developing process to be performed by the document editing apparatus according to the present invention.

Since the content of the document element "ti" is a character string in the foregoing case, no description is made between the start symbol and the end symbol of the document element "ti" as shown in FIG. 28. However, a character string or a symbol such as "ABC" or "#" may be inserted as shown in FIG. 29 to inform the user the portion in which the character string will be inserted. At this time, the user substitutes the character string or the symbol with the desired character string.

Although the foregoing structure has the arrangement that the selectable document element menu is placed on the alternative document element, the structure is not limited to this. For example, a structure as shown in FIG. 30 may be employed in which the alternative document elements are displayed in the form of buttons which are clicked to display the menu of the document elements that can be selected.

Figure 30:
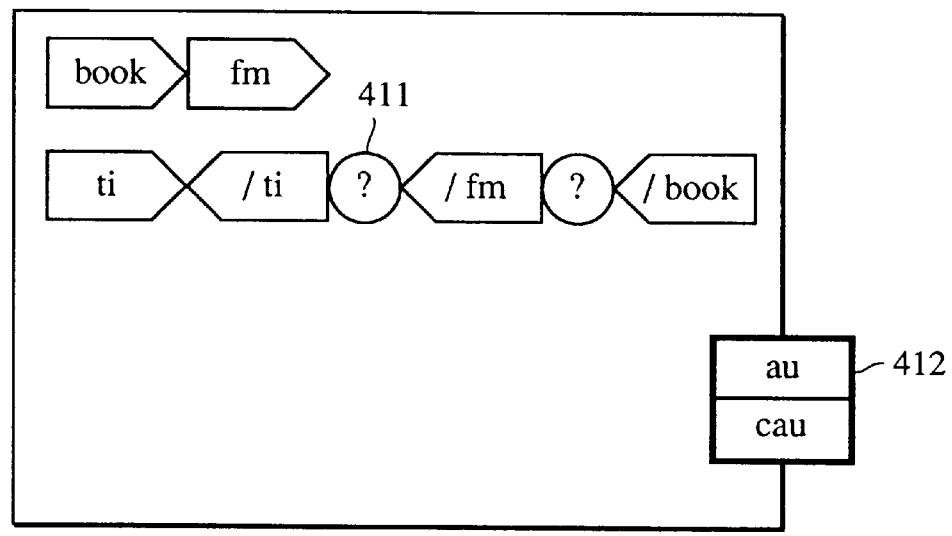
FIG. 30 illustrates a state of the document element developing process to be performed by the document editing apparatus according to the present invention.

FIG. 30 illustrates an example of display of the state of the document element development process performed by the document editing apparatus according to the present invention.

Referring to FIG. 30, reference numeral 411 represents an alternative document element that is clicked to display a selectable document element menu 412. The foregoing function can be realized by the conventional window programming technology. The conventional method may, of course, be employed in which the dialogue window is displayed which has the selectable document element menu shown therein.

The document editor clicks the alternative document element in place of selecting a document element from the menu on the alternative document element to select the document element from the displayed menu. The other operations are the same.

When the foregoing process is completed, an end button in the menu is prepared for example that is depressed at the time Of the completion.

By storing the document data 31 in the sub-storage unit 20 as the document data 22 to be stored, the next operation is performed continuous from the completion position.

First Modification of the Second Embodiment

As contrasted with the second embodiment in which the alternative document elements are developed sequentially, this modification has an arrangement that, if only one document element is present in the document element list pointed by the alternative document element, that is, if only one selectable document element is present, also its alternative document element is automatically developed.

The system is structured similarly to that according to the second embodiment except the process of the alternative document element development program 14.

Therefore, this modification is different from the second embodiment in the process of the alternative document element development program 14, that is, the process in step (3) of the second embodiment shown in FIG. 21 or the process in step (2) shown in FIG. 24.

In this embodiment, in a case where an alternative document element is present as the content of a certain document element when the alternative document element is developed to the document element, whether or not the number of the document elements that can be used in place of the alternative document element is one is examined. If it is one, the alternative document element is further developed. If it is not one, the alternative document element is stored.

Since the foregoing process is recursively performed until an alternative document element having a character string document element or two or more document elements that can be substituted appears, the nested structure is subjected to a recursive development of the alternative document element. Therefore, a structured document can be processed and/or edited efficiently for a document editor.

Second Modification of the Second Embodiment

In this embodiment, description will be made hereinafter about a case where a development information set is processed in such a manner that, if one document element that can be selected is present its alternative document element is developed.

Figure 31:
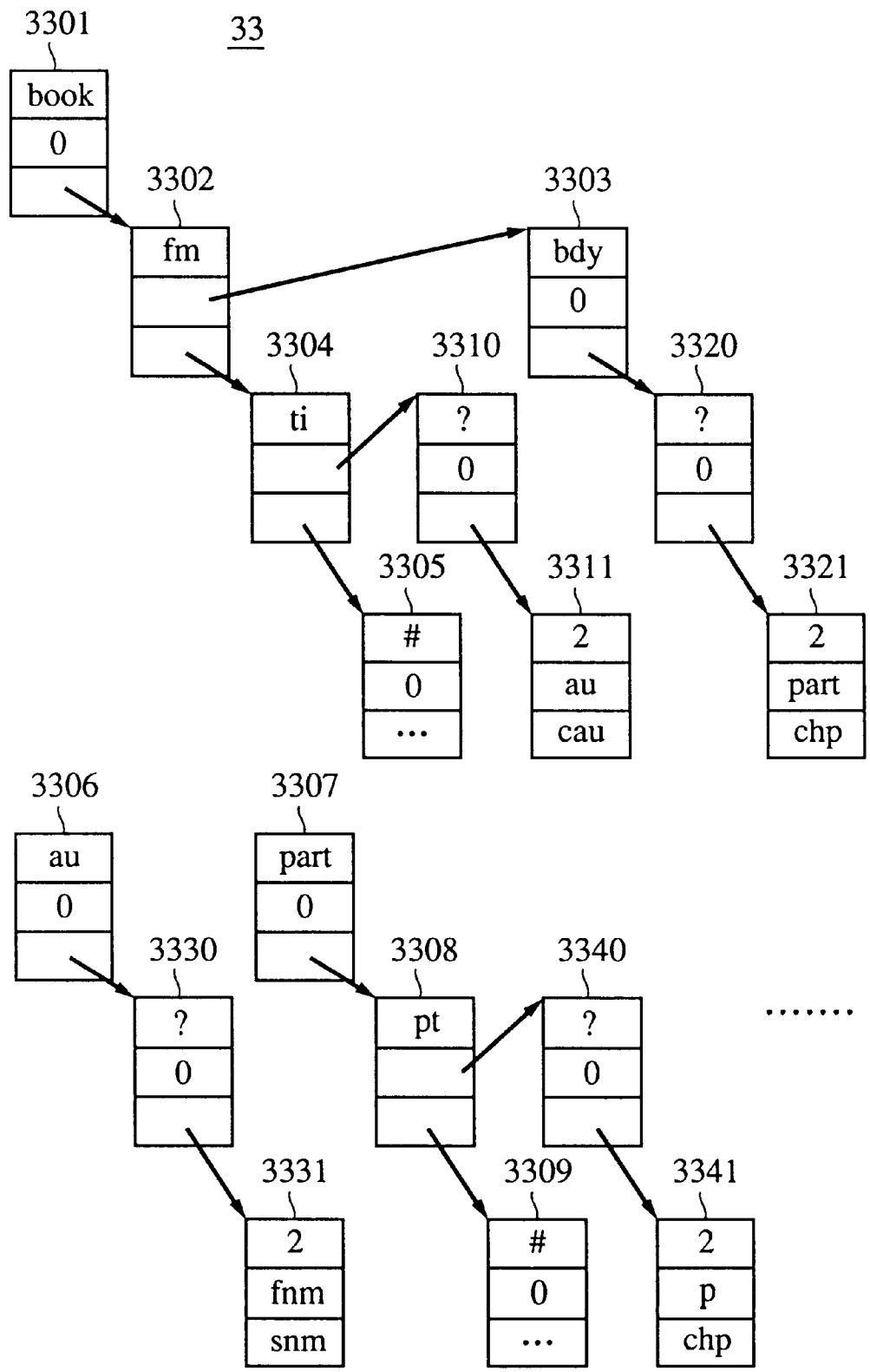
FIG. 31 illustrates the structure of a development information set in the document editing apparatus according to the present invention.

That is, a development information set 33 as shown in FIG. 31 is processed in place of the development information set 32 according to the foregoing embodiment shown in FIG. 19.

FIG. 31 illustrates the structure of the development information set 33 to be processed by the document editing apparatus according to the present invention.

The system has the same structure as that of the second embodiment except the development information processing program 15 that is formed into another form in this embodiment.

The process of the development information processing program according to this embodiment is the same as the development information processing program 15 according to the second embodiment except that an alternative document element having one selectable document element is subjected to the alternative document element development process according to the first modification of the second embodiment.

In this embodiment the necessity of processing the development information for all document elements can be eliminated but the development information is required for only the document element that can be selected by the document editor.

For example, the necessity of processing the development information for the document element "fm" can be omitted in this modification. As a result of the process, the development information set 33 as shown in FIG. 31 is processed. By using the development information set 33, the document editor is able to process and/or edit a document. The process at this time is required to be performed similarly to the second embodiment.

Also this modification enables the same effect obtainable from the first modification of the second embodiment to be obtained. Since the alternative document element is developed when the development information set is processed, the following process of editing the document can be performed by simply reading the result of the development. Therefore, it is very effective to process and/or edit a multiplicity of complicated documents.

As described above, all document elements described in the defined document type are not required to register their development format. Thus, an advantage can be realized in that only the document elements that are selected by the editor are required to be registered.

Therefore, the memory capacity can be used efficiently and the time required to retrieve the document elements can be shortened significantly.

Third Modification of the Second Embodiment

In this modification, alternative document elements having a plurality of document elements that can be selected are previously developed so as to be selected by the editor so that a document is processed.

Figure 32:
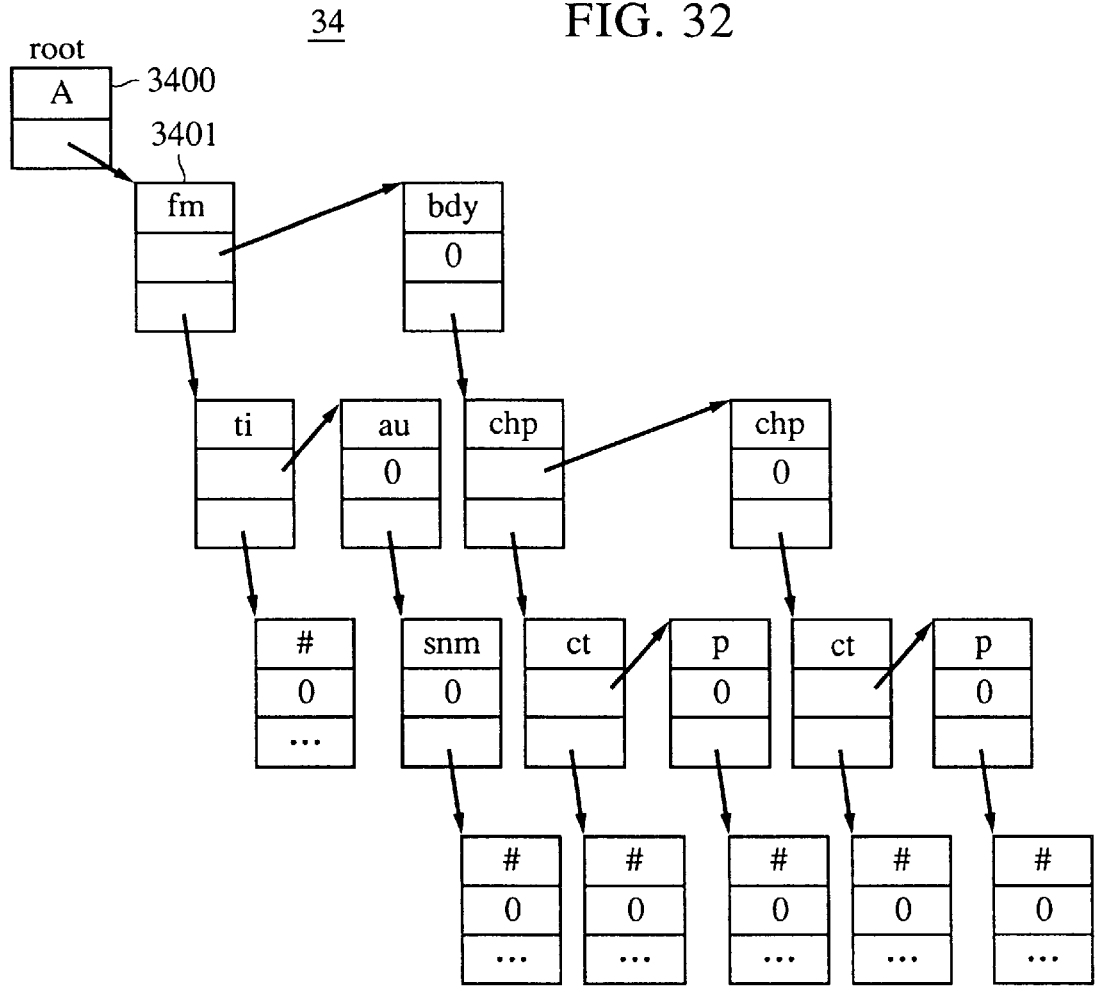
FIG. 32 illustrates the structure of a development information set in the document editing apparatus according to the present invention.

The system according to this modification has a structure which is the same as that according to the second embodiment except that the storage unit 30 stores document data 31 and a development information set 34 arranged as shown in FIG. 32.

The process according to this modification will now be described. Assume that the document element which is "book" is processed and that three types of development patterns (patterns A, B and C) are previously determined for the document element "book". Although a multiplicity of development patterns, which are more than the three types, are actually present in the document element "book", a case where the editor intends to process a document "book" by any of the three development patterns corresponds to the foregoing case.

Initially, the operation for processing the development information set 34 will now be described. The foregoing process can be completed by the process according to the second embodiment shown in FIG. 24.

However, a null string is contained in the content of the character string document element. Then, a development pattern name is given to the processed development information. The content of the document element "book" is developed, and a portion of an example of the development information set 34 at this time is shown in FIG. 32.

A node 3400 of the development pattern element stores the development pattern name and the pointer for pointing to the document element 3401. Also those for the development patterns B and C are processed.

The operation for processing a document by using the development information set 34 will now be described.

Figure 33:
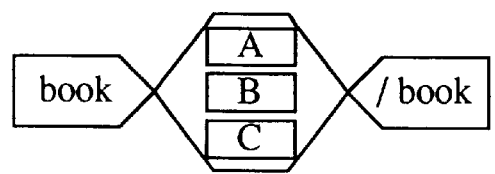
FIG. 33 illustrates the structure of a development information set in the document editing apparatus according to the present invention.

The procedure is the same as that shown in FIG. 21 according to the second embodiment except that the document elements that can be selected are not displayed on the alternative document element but the development pattern names are displayed as shown in FIG. 33; and the editor selects the pattern name by using the mouse 2.

Figure 34:
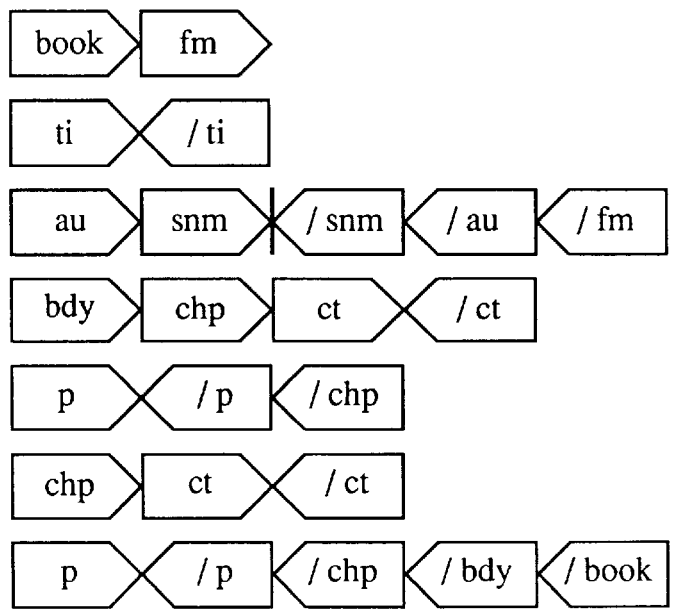
FIG. 34 illustrates the structure of a development information set in the document editing apparatus according to the present invention.

FIG. 33 illustrates display of the development pattern name on the document editing apparatus according to the present invention. FIG. 34 illustrates an example of display of the development pattern on the basis of the development pattern name shown in FIG. 33.

FIG. 34 illustrates an example of the display when the development pattern A shown in FIG. 33 has been selected.

Then, the editor is required to insert characters into desired positions.

This embodiment provides an effect that the document administrator is able to limit the development formats to several formats as desired.

Fourth Modification of the Second Embodiment

This modification is a modification of the third modification of the second embodiment.

Although the third modification of the second embodiment uses the development information set arranged as shown in FIG. 32, the structure is not limited to this. For example, a development information set 35 arranged as shown in FIG. 35 may be employed.

FIG. 35 illustrates an example of the development information set in the document editing apparatus according to the present invention.

As shown in FIG. 35, a selected pattern name is detected in the development information set 35 and the document is developed in accordance with the development format described in the development information set 35. In the development information set 35, a fact that the pattern A develops the alternative document element as follows is described.

The alternative document element is developed to the document element "fm" and the document element "bdy" and the content of the document element "fm" is developed into the document element "ti" and the document element "document element "au". The content of the document element "bdy" is developed into two document elements "chp", and the content of each document element "chp" is developed into document element "ct" and document element "p".

Referring to FIG. 35, expressions in parentheses show nestings of the document elements. The development information set provides an effect that the document manager is able to process a document by using a usual editor.

The development information set shown in FIG. 32 and the development information set shown in FIG. 35 may be combined with each other. In a case where the document element "fm" is defined in the development information set 36 as shown in FIG. 36, display as shown in FIG. 38 is performed.

FIGS. 36 to 38 illustrate a state of combination of the development information sets in the document editing apparatus according to the present invention.

Referring to FIG. 36, the document element list 3621 pointed to by the alternative document element 3620 registers the development pattern name in place of the document element name. When the editor selects A, the document element having name "A" is detected from the development information set 36. If it has been detected, development is performed in accordance with the development format described in the development information set 36. If it has not been detected, detection in the development information set 37 shown in FIG. 38 is performed, development is performed in accordance with the format described in the development information set 37.

If detection in the development information set 37 has been detected and it has not been detected, detection in the development information set 36 may, of course, be performed.

Although the structure has been described in which the development information set is used to develop the alternative document element, the development information may previously be included in the alternative document element development program.

For example, the sub-routine or the program may be switched by using the pattern name as an argument to develop the alternative document element. In this case, the necessity of processing the development information set can be eliminated.

As an alternative to this, a plurality of the document type definitions shown in FIG. 67 may be prepared to switch and develop the document type definitions with the pattern name. FIG. 67 illustrates a case where a plurality of portions that can be selected by the editor are present, that is, a plurality of portions of the alternative document elements having a plurality of document elements are present. In this case, the foregoing portions are required to be eliminated and the document type definitions are processed by the number of the document elements that can be selected so as to be selected from the same.

Third Embodiment

Description will be made about an embodiment of a document editing apparatus comprising: an alternative document element development means that introduces an alternative document element to serve as an alternative to a document element, substitutes the alternative document element with the original document element and develops it into a document element or alternative document element string; and a development format input means which permits a user to define and input the format of the developed document element or the alternative document element, wherein only required development patterns are previously prepared.

Figure 39:
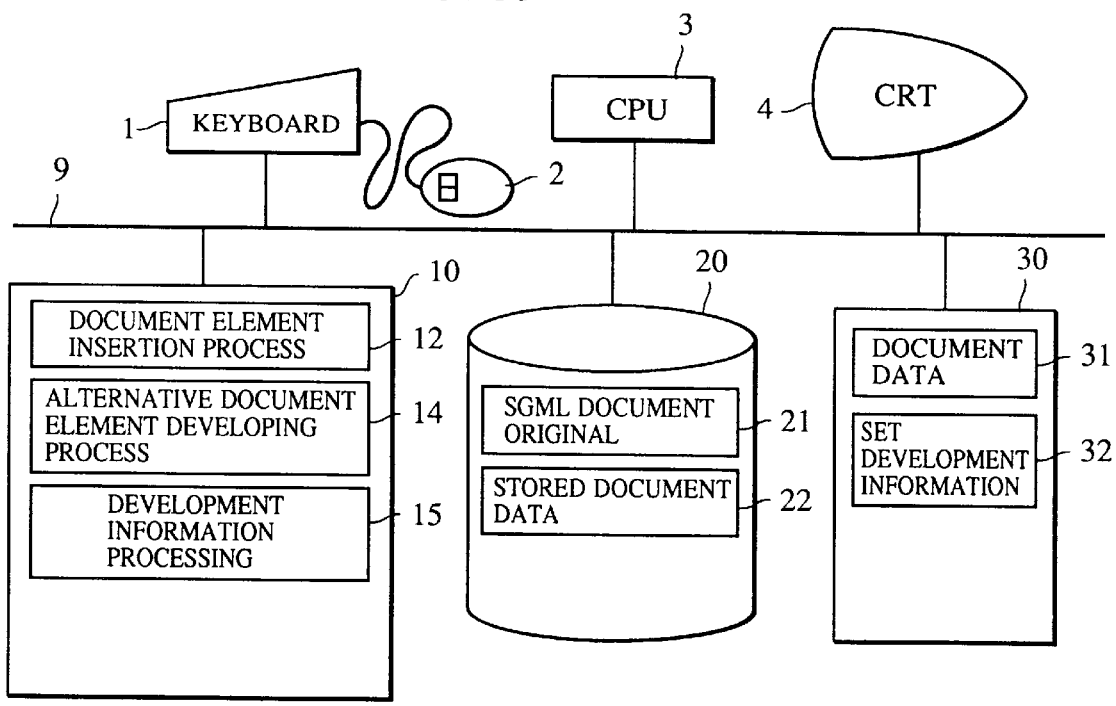
FIG. 39 is a block diagram which illustrates the structure of a third embodiment of the document editing apparatus according to the present invention.
Figures 68, 69, 70:
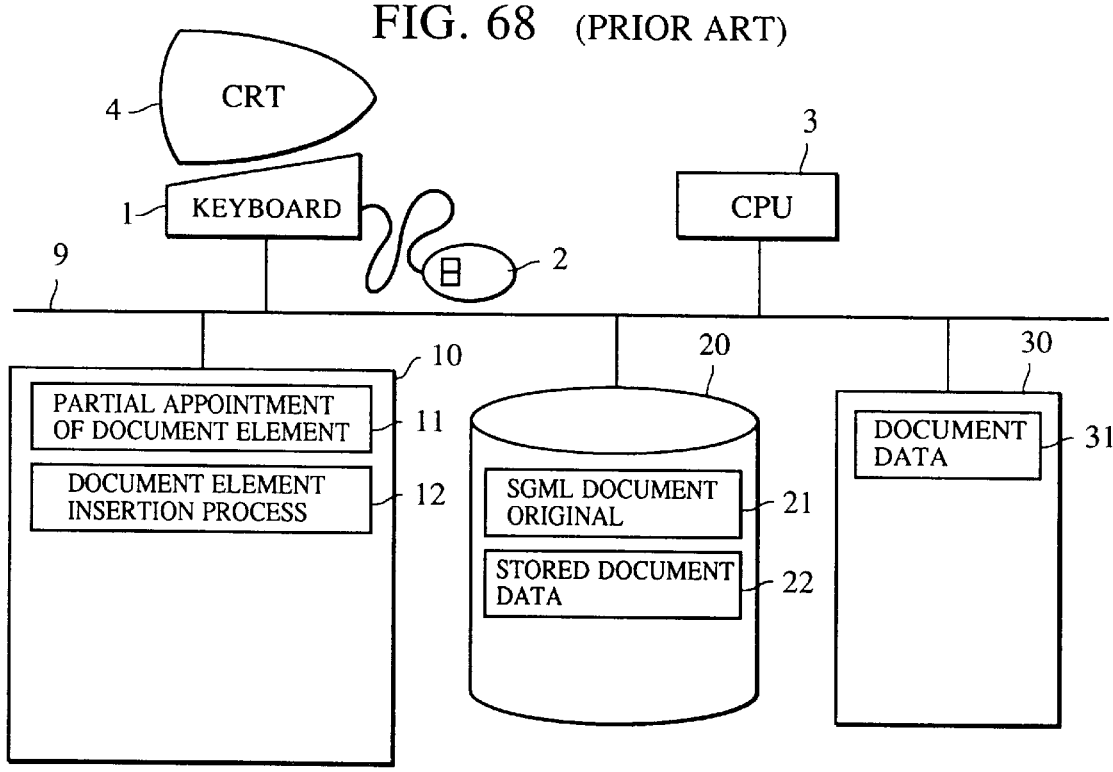
FIG. 68 illustrates the structure of a document editing apparatus which is capable of editing a structured document of the foregoing type.
FIG. 69 illustrates an example of a document adapted to the document type shown in FIG. 67 and described in the standard generalized markup language.
FIG. 70 illustrates an example of a document adapted to the document type shown in FIG. 67 and described in the standard generalized markup language.

FIG. 39 is a block diagram which illustrates the structure of a third embodiment of the document editing apparatus according to the present invention, where the same elements as those shown in FIGS. 18 and 68 are given the same reference numerals.

The storage unit 10 stores, in addition to the document element insertion program 12 shown in FIG. 68, stores the alternative document element development program 14, and the development information processing program 15. The storage unit 30 stores a development information set 38.

In the thus-structured document editing apparatus, an alternative document element processing means (the development information processing program 15) processes the alternative document element in accordance with development format information selected by a selection means (the pointing device 2) for selecting all development format information required to process a previously stored document. The appointed alternative document element or the document element in the processed alternative document element is substituted with a document element or an alternative document element selected by an alternative document element developing means (the alternative document element development program 14) so that document data is developed. In this case, the alternative document element development means substitutes, with the selected document element or the alternative document element, the appointed alternative document element or the document element in the alternative document element processed by the alternative document element processing means in accordance with the development pattern format (the pattern is registered as the development information set 32 in the storage unit 30) so that the development to document data is performed. The number of the development patterns for the document element or the alternative document element to be developed is decreased so that document data is efficiently edited.

The operation for processing a document according to this embodiment will now be described.

The following two examples of the development pattern of the document element "book" will now be described.

Figure 40:
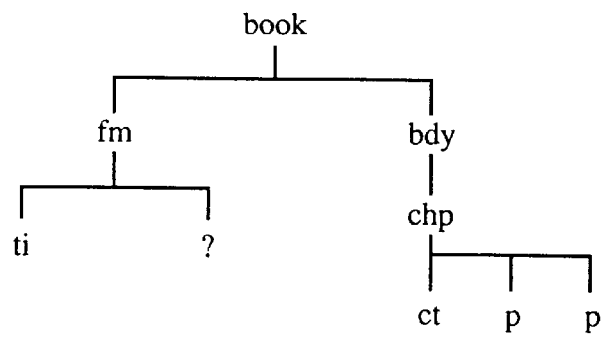
FIG. 40 illustrates the structure of a development pattern of the document element in the document editing apparatus according to the present invention.
Figure 41:
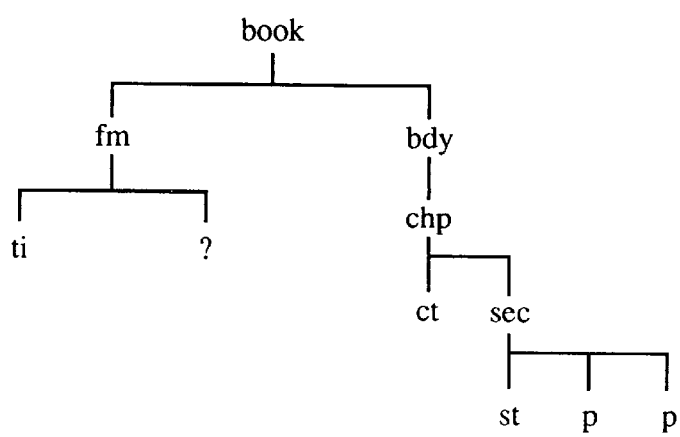
FIG. 41 illustrates the structure of a development pattern of the document element in the document editing apparatus according to the present invention.

The structure of two patterns A and B are shown in FIGS. 40 and 41, respectively.

FIGS. 40 to 43 illustrate the structure of the development patterns of the document elements in the document editing apparatus according to the present invention.

Although the document element "book" has a multiplicity of development patterns which is more than the two types, a case where a document manager intends to process a document of the document type "book" in accordance with either of the two patterns corresponds to the foregoing case.

Referring to the drawings, "?" represents an alternative document element that is a portion in which a plurality of document elements or development patterns that can be inserted are present. The foregoing portion is a portion permitted for a person who processes a document within the document structure defined in FIG. 67. In this embodiment, the alternative document element "?" can be further developed into two development patterns. The two development patterns are shown in FIGS. 42 and 43.

Figures 42, 43, 45:
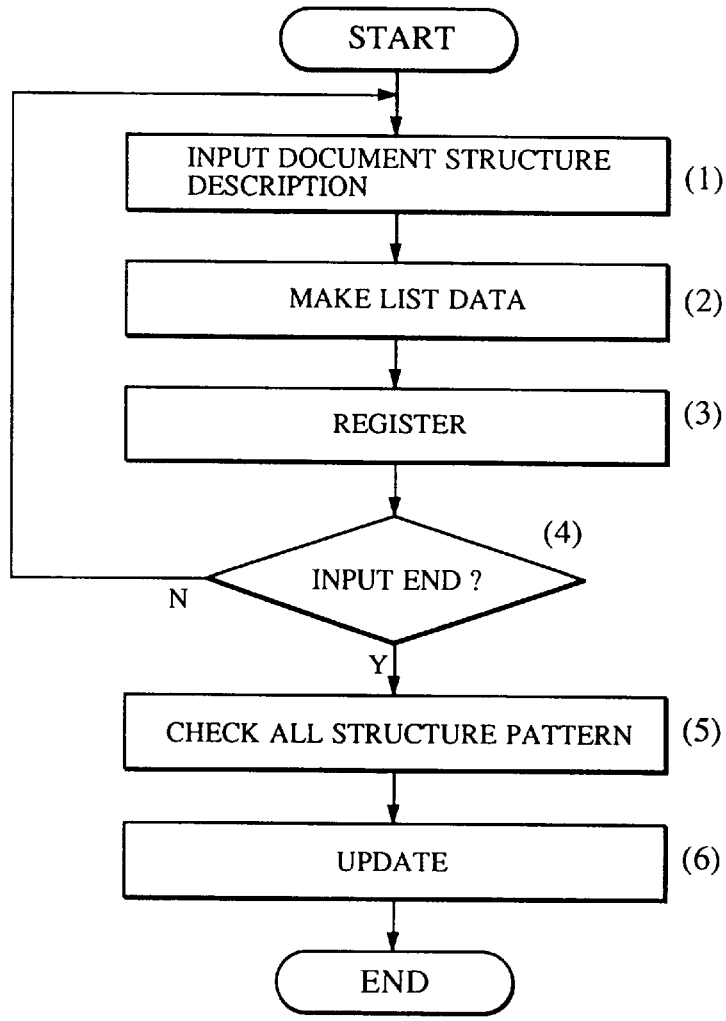
FIG. 42 illustrates the structure of a development pattern of the document element in the document editing apparatus according to the present invention.
FIG. 43 illustrates the structure of a development pattern of the document element in the document editing apparatus according to the present invention.
FIG. 45 illustrates an example of an operation for processing the development information set in the document editing apparatus according to the present invention.
Figure 44:
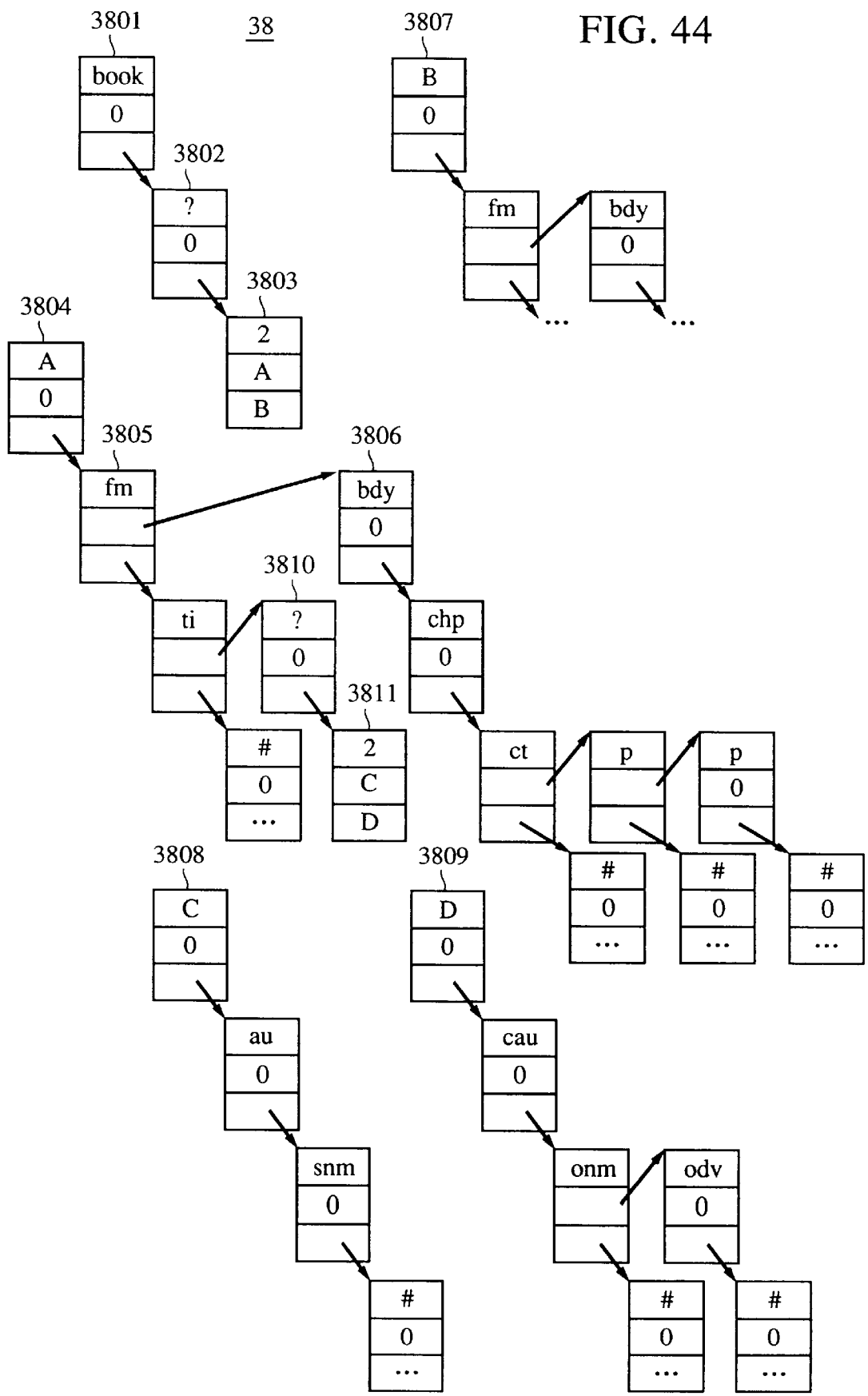
FIG. 44 illustrates the development information set 32 shown in FIG. 43.

FIG. 44 illustrates the structure of the development information set 38 shown in FIG. 43.

Referring to FIG. 44, reference numerals 3801, 3805 and 3806 represent document elements, 3802 and 3810 represents alternative document elements, 3803 represents a development pattern list, and 3804, 3807, 3808 and 3809 represent development pattern elements. The structure of each document element may be the same as the document data 31 according to the conventional structure.

Also the structure of the alternative document element is the same as the document element according to the conventional structure. Document data having the document element name "?" has a pointer for pointing to the development pattern list.

The development pattern list comprise the number of items in the leading portion thereof and a development pattern name disposed in the ensuing portion.

The development information set 38 stores the development formats of specific document elements or development format in a specific pattern in the tree structure.

Referring to FIG. 44, the document element "book" 3801 points the alternative document element 3802. In accordance with the development pattern list 3803 that is pointed to by the alternative document element 3802, it can be understood that the document element 3801 has development patterns A and B.

The element 3804 of the development pattern A points to the document element "fm" 3805, and the link data of the document element "fm" points the document element "bdy" 3806. Therefore, the development to the foregoing document elements is sequentially performed in this order. Furthermore, also the document elements 3805 and 3806 are further developed.

Also the element 3807 having the development pattern B, the element 3808 having the development pattern C and the element 3809 having the development pattern D are similarly processed.

The document manager process only the desired development pattern by using the development information processing program 15 and registers it in the development information set 38. The operation for processing the development information set 38 will now be described with reference to a flow chart shown in FIG. 45.

FIG. 45 illustrates an example of the operation for processing the development information set to be performed by the document editing apparatus according to the present invention, where (1) to (6) are indicative of the steps of the process.

In step (1) a character string having the document structure described therein is input. The document structure is described in such a manner that the structure of the document element "book" is described as "book (? [A B])".

The document element names or the alternative document element names constituting the document element "book" are, in the constituting order or sectioned by a space, described in parenthesized portion in the rear of the document element name "book".

Since the document element "book" is composed of one alternative document element, one "?" which is the name indicating the alternative document element is described. In the parenthesized portion in the rear of the name "?", the development pattern name that can be substituted with the alternative document element is described as being a section with a space.

Therefore, "book (? [A B])" of the document element "book" is composed of only one alternative document element and its alternative document element is developed into either of the patterns A and B. Similarly, the development patterns A, B, C and D respectively are described as "A (fm (ti (#) ? [C D]) bdy (chp (ct (#) p (#) p (#))))", "B (fm (ti (#) ? [C D]) bdy (chp (ct (#) sec (st (#) p (#) p (#)))))", "C (au (snm (#)))", and "D (cau (onm (#) odv (#)))". In the parenthesized portion immediately in the rear of the document element name or the development pattern name, development to its document element "bdy" in the foregoing order. Furthermore, the portion ensuing the document element "fm" is developed to the document element "ti" and the alternative document element in this order.

Furthermore, a fact can be understood that the alternative document element is developed in accordance with the development pattern C or the development pattern D. Also the other document elements are developed similarly (omitted from description).

In step (2) list data resembling the development information set 38 is processed from the character string input in step (1). The foregoing operation can be performed by a method comprising the steps of analyzing the syntax of the input character string, processing a document element or a pattern element in accordance with the result of the analysis, and setting its content data and link data.

In step (3) the list data processed in step (2) is registered to the development information set 38.

In step (4) whether or not the development patterns required for the document manager have been input is discriminated. If an affirmative discrimination is made in step (4), the flow proceeds to step (5).

If a negative discrimination has been made in step (4), the flow returns to step (1) in which the development patterns B, C and D are subjected to a similar process.

In step (5) the structures of all combinations of the registered development patterns are checked. Since two development patterns C and D are present with respect to the development patterns A and B in this embodiment, four development patterns are present.

Then, whether or not the foregoing development patterns conform to the document structure defined in FIG. 67 is checked such that document data of only the structures of the four types of the development patterns that do not include the text are temporarily processed, and the structure of the document data is checked by using a present parser.

In step (6) the structures that do not conform to FIG. 67 in step (5) are deleted from the development information set 38 so that the development information set 38 is updated.

Figure 46:
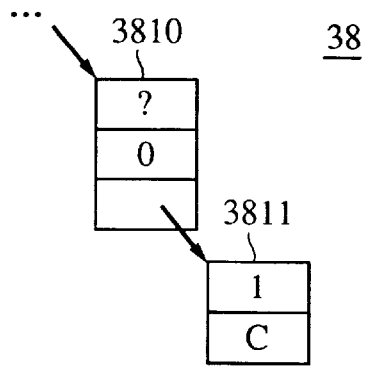
FIG. 46 illustrates a state of updating the development pattern list shown in FIG. 44.
Figure 47:
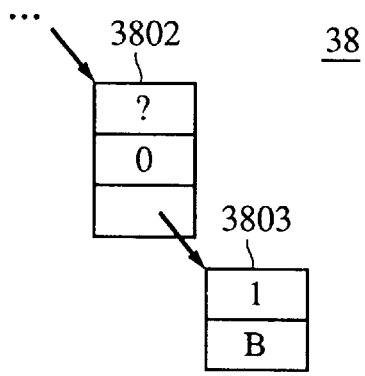
FIG. 47 illustrates a state of updating the development pattern list shown in FIG. 44.

FIGS. 46 and 47 illustrate states where the development pattern list shown in FIG. 44 is updated.

If the structure of the combination of the development pattern A and the development pattern D is invalid, the development pattern D is deleted from the development pattern list 3811 pointed to by the alternative document element 3810 shown in FIG. 44 so that the items are decreased by one. The development pattern 3811 resulting due to this is shown in FIG. 46.

If both combinations of the development pattern A and the development pattern C and that of the development pattern A and the development pattern D are invalid, it can be understood at this time that the development cannot be performed in accordance with the development pattern A. Therefore, the development pattern A may be deleted from the development pattern list 3803 pointed to by the alternative document element 3802 shown in FIG. 44. At this time, the development pattern list 3803 is formed as shown in FIG. 47. Thus, the document manager reduces and sets the development patterns within the range of the document structure definition shown in FIG. 67.

The operation for processing a document will now be described with reference to a flow chart shown in FIG. 48.

Figure 48:
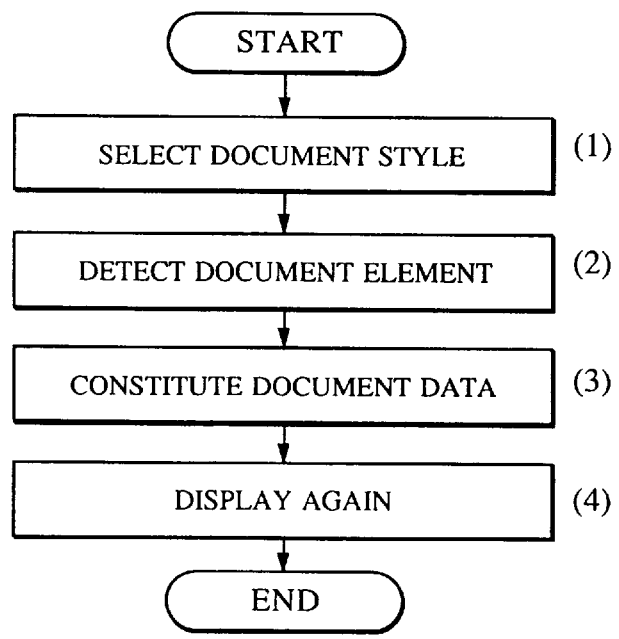
FIG. 48 is a flow chart showing a document processing operation to be performed by the document editing apparatus according to the present invention.

FIG. 48 is a flow chart showing an example of the operation for processing a document to be performed by the document editing apparatus according to the present invention, where (1) to (4) are steps of the process.

In this case, structured document data for the document type "book" is processed.

In step (1) a document type is input or selected from the menu. In step (2) the document element having the same name as the document type is detected in the development information set 38. If the document element cannot be detected in step (2), this fact is displayed and the operation is interrupted.

In step (3) a document element and an alternative document element are processed in accordance with the development format of the document element detected in step (2) so as to constitute document data. The document data is stored in the document data 31.

In step (4) the document data 31 is shaped and displayed again.

The alternative document element is displayed such that the development pattern names described in the development pattern list pointed to by the content data of the alternative document element are listed. For example, the alternative document elements are displayed as in a pop-up menu.

Figure 49:
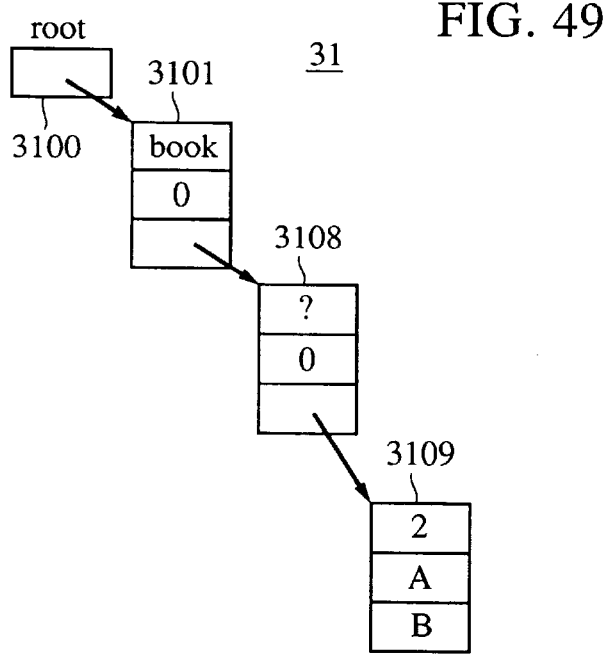
FIG. 49 illustrates a state of display of the alternative document element in the document editing apparatus according to the present invention.
Figure 50:
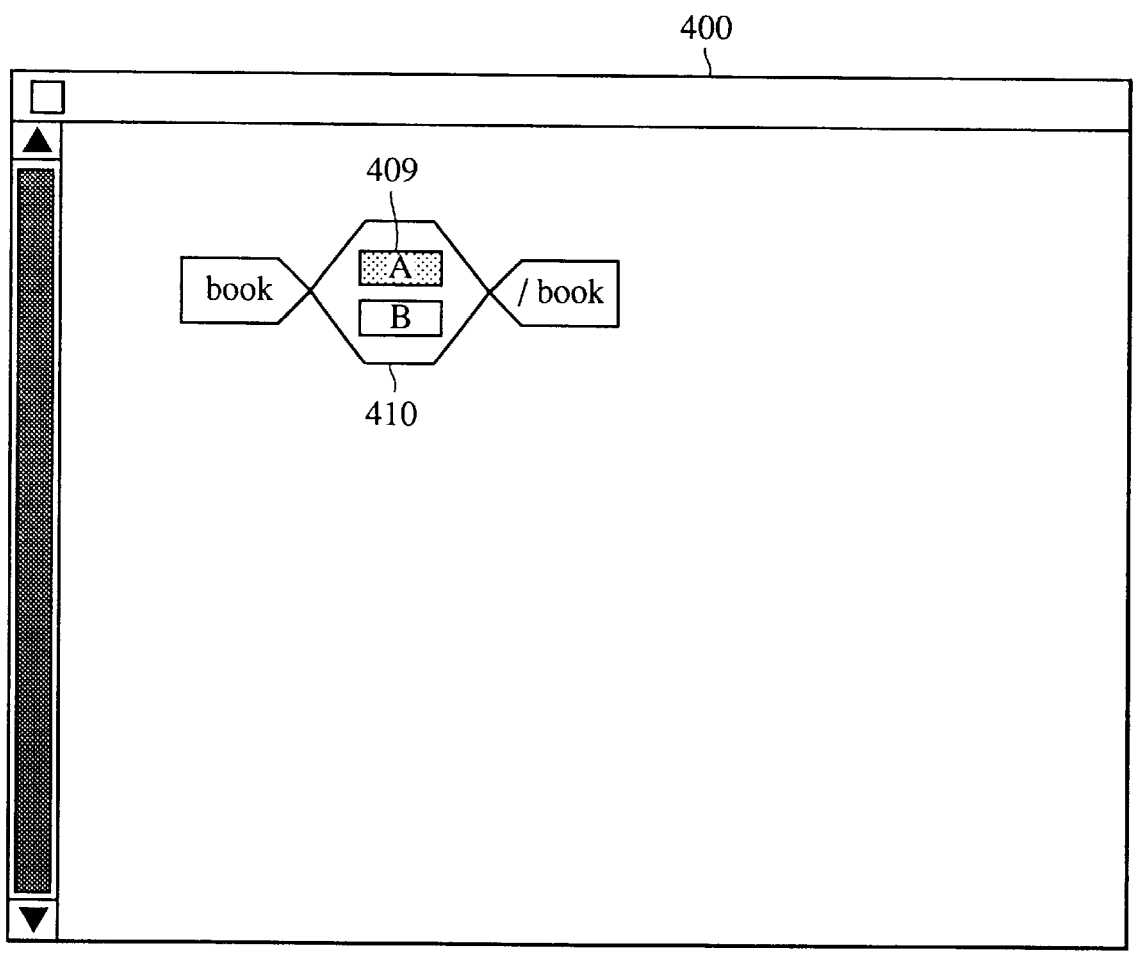
FIG. 50 illustrates a state of display of the alternative document element in the document editing apparatus according to the present invention.

The document data 31 when the document type "book" is selected and displayed in this case are shown in FIGS. 49 and 50.

FIGS. 49 and 50 illustrate display of the document data and the alternative document element on the document editing apparatus according to the present invention.

Referring to FIG. 50, reference numeral 410 represents the document element, 409 represents a push button group embedded in the alternative document element 410 on each of which the development pattern name is displayed. The document data 31 stores the document element 3801 of the development information set 38 in place of the document element 3101.

Then, the user performs the process while selecting the development pattern displayed on the alternative document element. The process will now be described with reference to a flow chart shown in FIG. 51.

Figure 51:
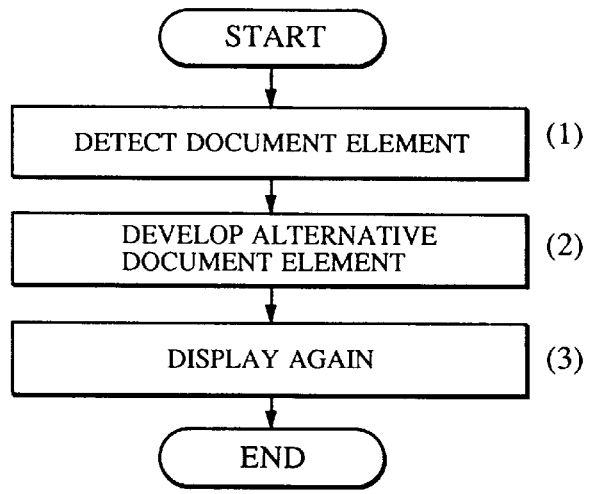
FIG. 51 is a flow chart showing an example of a development pattern selection process of the alternative document element in the document editing apparatus according to the present invention.

FIG. 51 is a flow chart showing an example of a process for selecting a development pattern of an alternative document element to be performed by the document editing apparatus according to the present invention, where (1) to (3) are indicative of the steps of the process.

In step (1) the document element having the same name as the development pattern selected by the user is detected. If the development pattern element is not detected in step (1), this fact is displayed and the operation is interrupted.

In step (2) the alternative document element development program 14 is activated to process the document element and the alternative document element in accordance with the development information of the development pattern selected at present so that the list structure is constituted from the document element and the alternative document element and the original alternative document element is replaced. However, the link data having the value of that of the original alternative document element is used. In step (3) the document data 31 is displayed again. The foregoing process is the same as the process which is performed in step (4) shown in FIG. 48.

Figure 52:
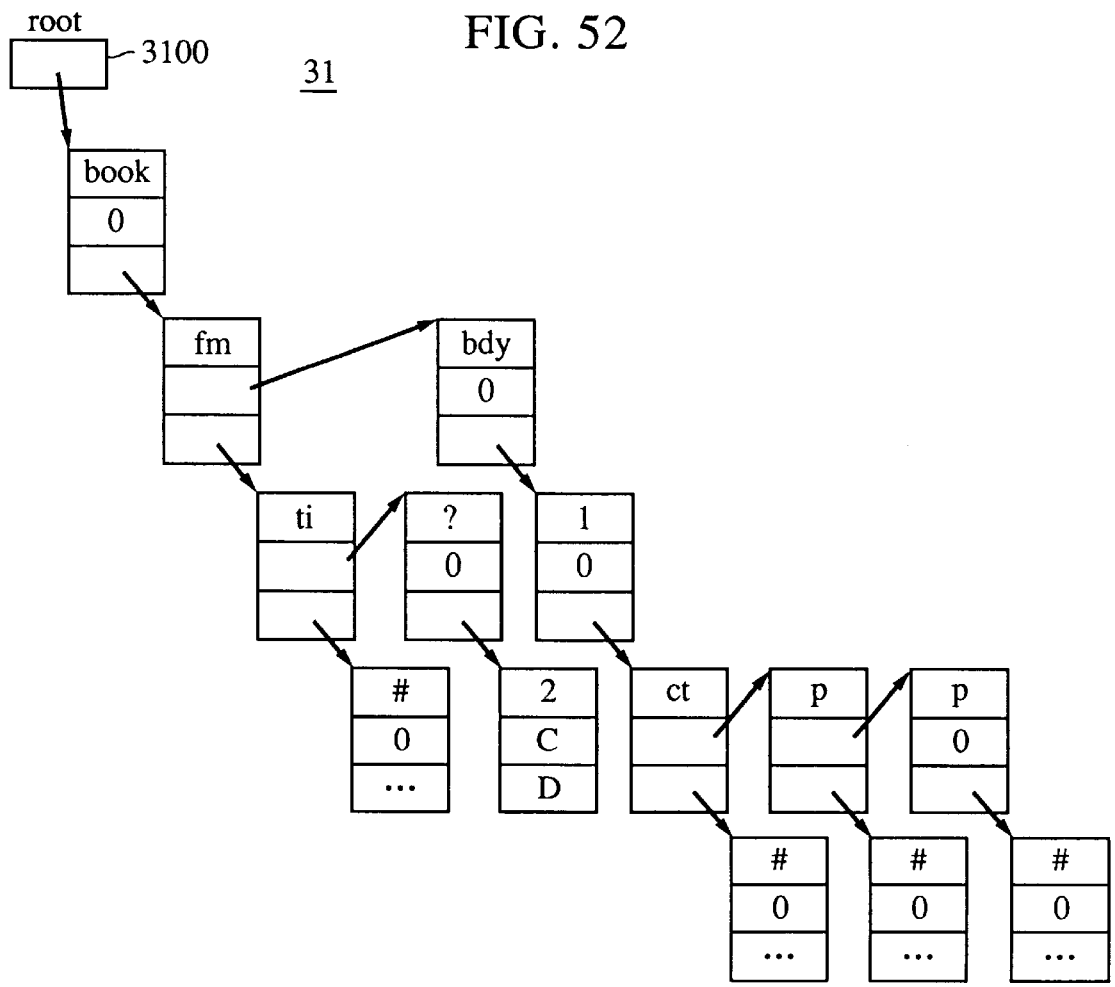
FIG. 52 illustrates a state of display of the document data in accordance with a first selection development pattern in the document editing apparatus according to the present invention.
Figure 53:
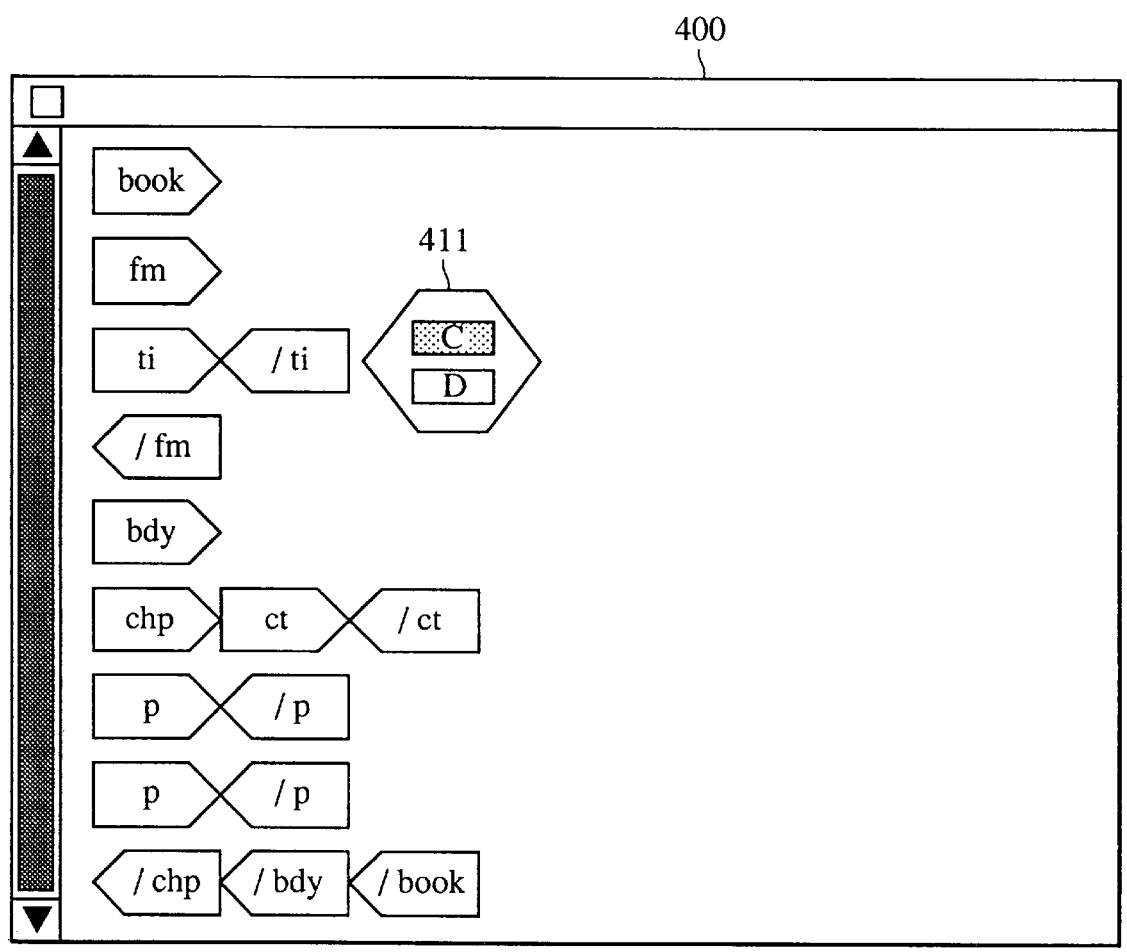
FIG. 53 illustrates a state of display of the document data in accordance with a first selection development pattern in the document editing apparatus according to the present invention.

FIGS. 52 and 53 illustrate a state where document data is displayed in accordance with a first selected development pattern in the document editing apparatus according to the present invention. This case corresponds to the display of the document data 31 when the document type "book" is developed in accordance with the development pattern A. Referring to FIG. 53, reference numeral 411 represents an alternative document element which is subjected to a similar repetitive process until no alternative document element is present in the displayed document.

Figure 54:
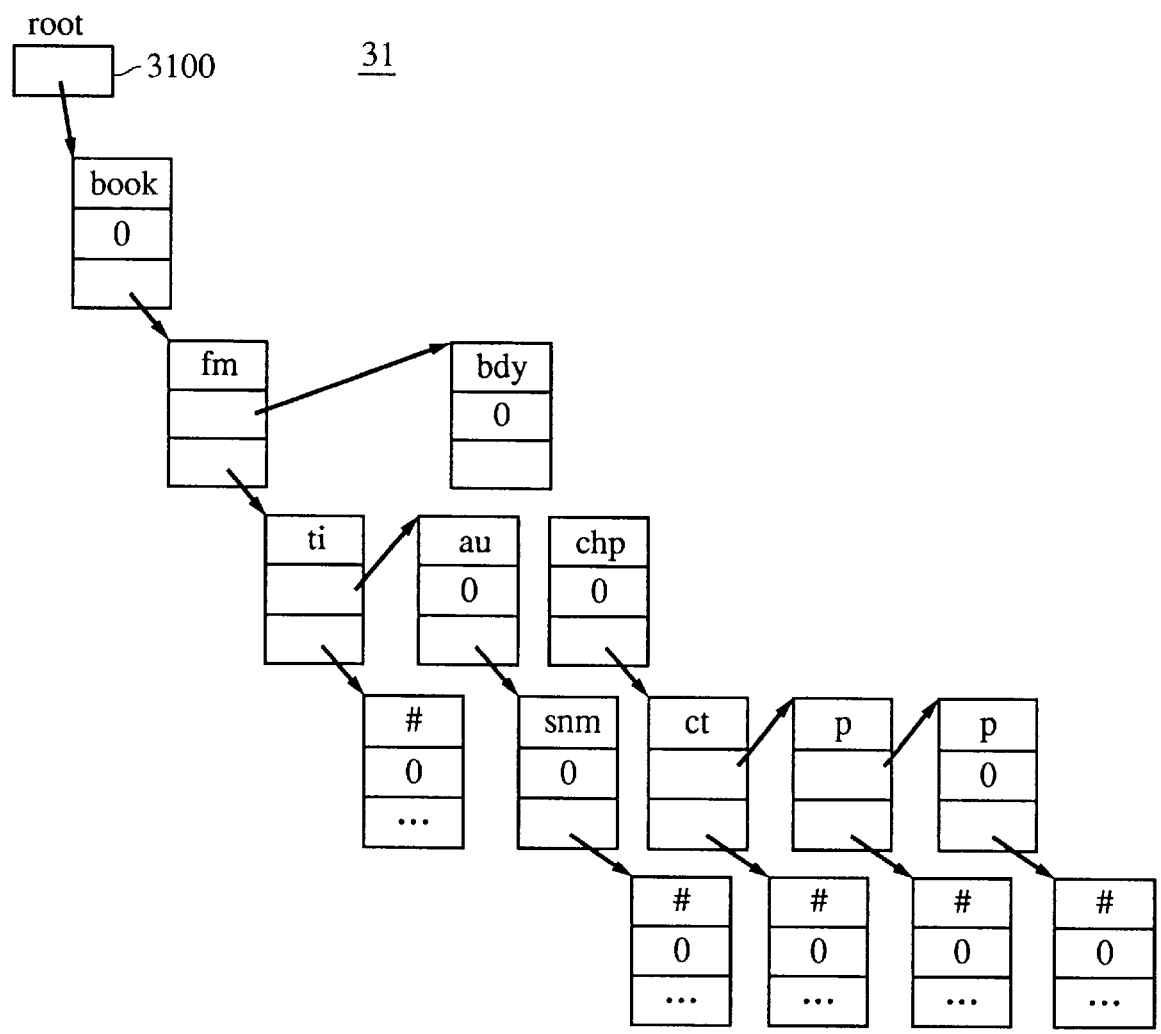
FIG. 54 illustrates a state of display of the document data in accordance with a second first selection development pattern in the document editing apparatus according to the present invention.
Figure 55:
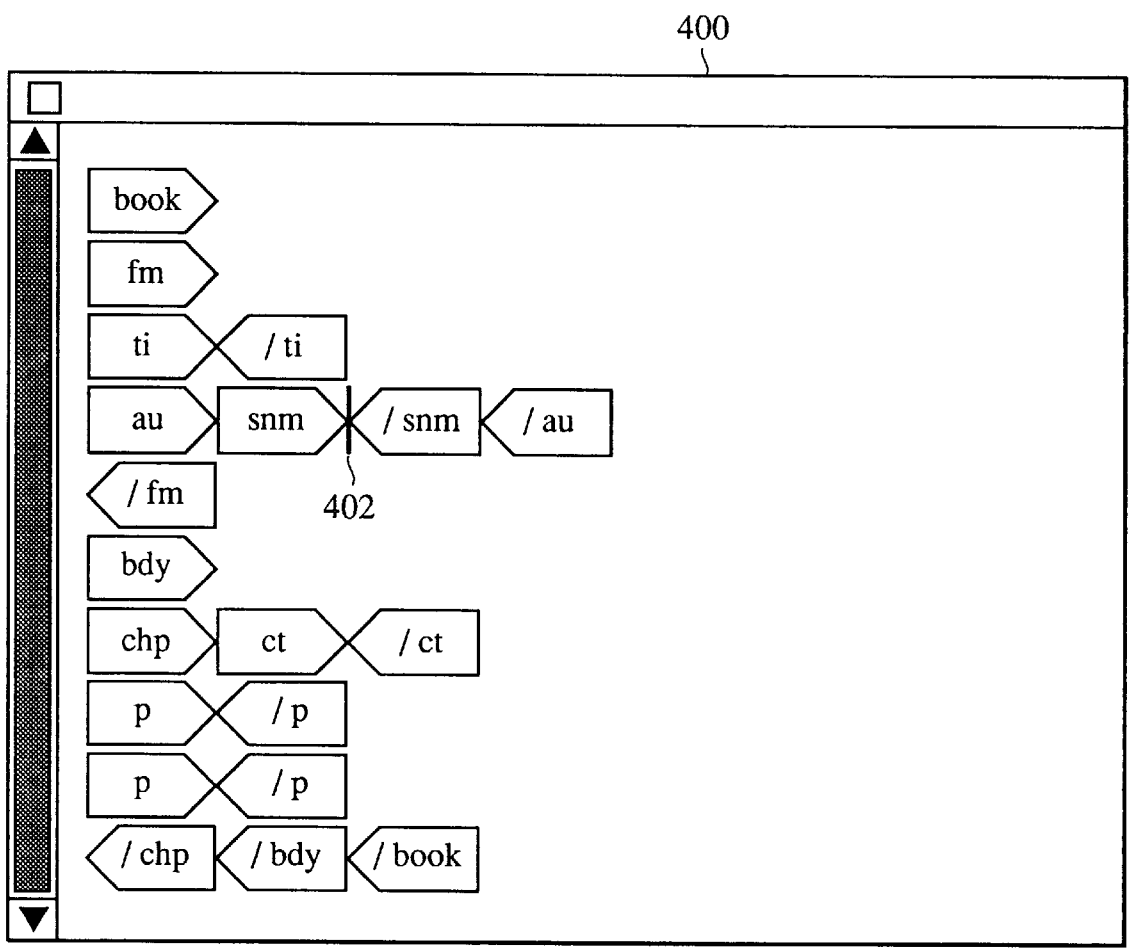
FIG. 55 illustrates a state of display of the document data in accordance with the second selection development pattern in the document editing apparatus according to the present invention.

FIGS. 54 and 55 illustrate document data processed in accordance with a second selection development pattern and display on the document editing apparatus according to the present invention. This case corresponds to the display of the document data 31 when the state shown in FIG. 52 is developed in accordance with the development pattern C. Then, the user inserts character strings to required portions so that a document is completed.

If, for example, the development pattern A is limited to the combination with the development pattern C, input to be performed in step (1) of the flow chart shown in FIG. 45 such that A (fm (ti (#) ? [C D]) bdy (chp (ct (#) p (#) p (#))))" is not performed but input of A (fm (ti (#) au (snm (#))) bdy (chp (ct (#) p (#) p (#))))" is required.

In general, the development patterns is tens of patterns and if their development patterns are combined a great number is present.

The foregoing operation that the person who processes information set decreases the development patterns to several patterns is very effective in the foregoing case.

If a multiplicity of patterns C, D, E, F, . . . , that can be developed are present, all patterns are undesirably registered in a case where automatic processing from the structure shown in FIG. 67 is performed. By inputting A (fm (ti (#) ? [C D]) bdy (chp (ct (#) p (#) p (#))))", the combinations with the development pattern A can be limited to only two development patterns C and D.

First Modification of the Third Embodiment

In this embodiment a person processes the development information set 38 while actually developing an alternative document element.

The system of this modification has the same structure as that of the third embodiment. However, a basic development information processing program 17 is added into the storage unit 10 and a basic development information set 39 is added into the storage unit 30. Since the process for performing the development information processing program 15 is different, it is called a development information processing program 16 (not shown) in this modification.

This modification will now be described in which the development patterns A, B, C and D according to the third embodiment are used as the examples of the development patterns.

The basic development information set 39 is a sub-development information set for processing the development information set 38. Its structure is shown in FIG. 56.

Figure 56:
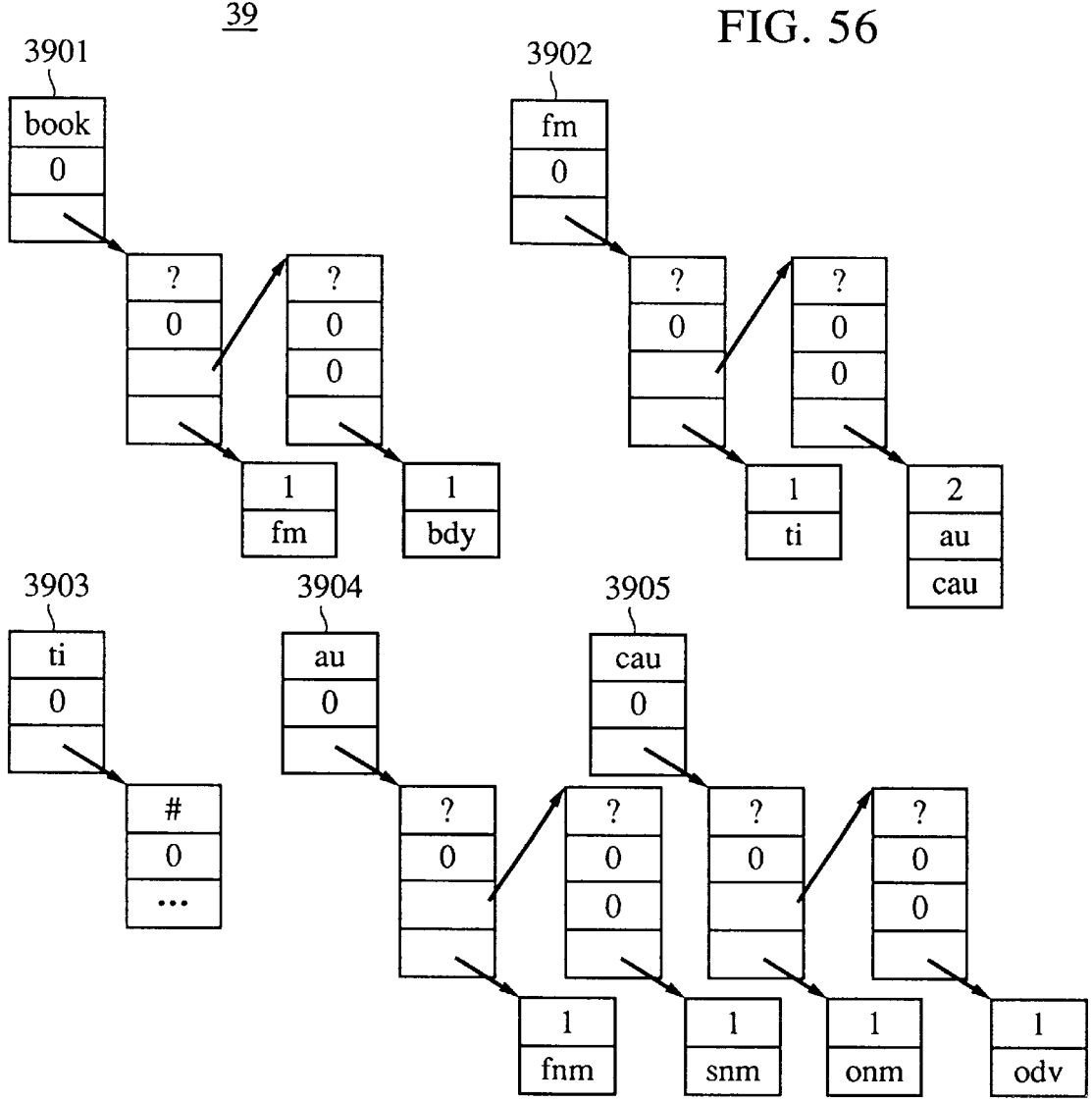
FIG. 56 illustrates the structure of a basic development information set in the document editing apparatus according to the present invention.

FIG. 56 illustrates the structure of the basic development information set 39 for use in the document editing apparatus according to the present invention. Note that the structures of the document element and the development pattern list are the same as those according to the third embodiment shown in FIG. 44. The alternative document element has a flag disposed next to the document element name. The flag is used to identify whether or not the alternative document element is maintained in the development information set 38.

As shown in FIG. 56, the basic development information set 39 stores the development formats of all document elements required to process the document. For example, the development formats of all document elements, such as the document elements "book", "fm" and "au" required for the document type "book" are stored.

The operation for processing the basic development information set 39 will now be described.

The basic development information set 39 of the document element "book" is performed in such a manner that all-document elements that constitute the document type "book" are sequentially subjected to the basic development information processing program 17 with reference to the document type definition shown in FIG. 67. The foregoing process will now be described with reference to a flow chart shown in FIG. 57.

Figure 57:
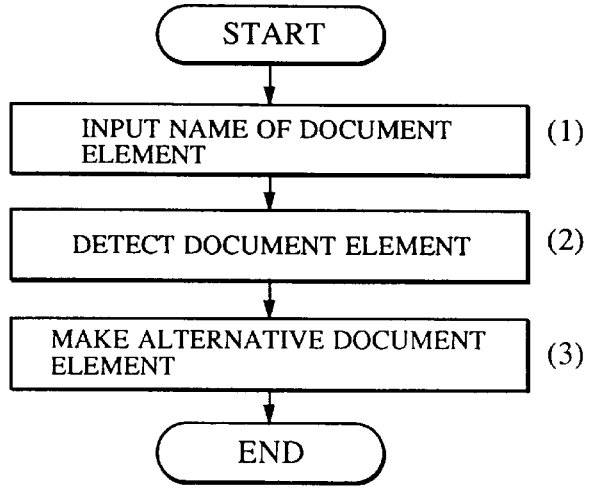
FIG. 57 is a flow chart showing an example of the basic development information processing operation to be performed by the document editing apparatus according to the present invention.

FIG. 57 is a flow chart showing an example of the basic development information processing operation to be performed by the document editing apparatus according to the present invention, where (1) to (3) are indicative of the steps of the process.

In step (1) the document element name is input such that a dialogue window is displayed when this process starts and the document element name is input in the dialogue window.

In step (2) the input document element is searched according to FIG. 67. In step (3) all document elements that constitute the document element are processed as the alternative document elements. The value of the flag at this time is made to be zero.

If the document element to be constituted is in the form of a character string, the character string document element is used in place of the alternative document element. It can be understood from FIG. 67 that, for example, the document element "book" is composed such that the document element "fm" is placed in the leading portion and the document element "bdy" is placed in a following portion.

Thus, the two alternative document elements are processed and development information starting with the document element 3901 shown in FIG. 56 is processed. Since the document element "ti" contains only a character string, development information starting with the document element 3903 shown in FIG. 56 is processed.

The operation for processing the development information set 38 by using the basic development information set 39 will now be described with reference to a flow chart shown in FIG. 58. The foregoing operation is a process of the development information processing program 14.

Figure 58:
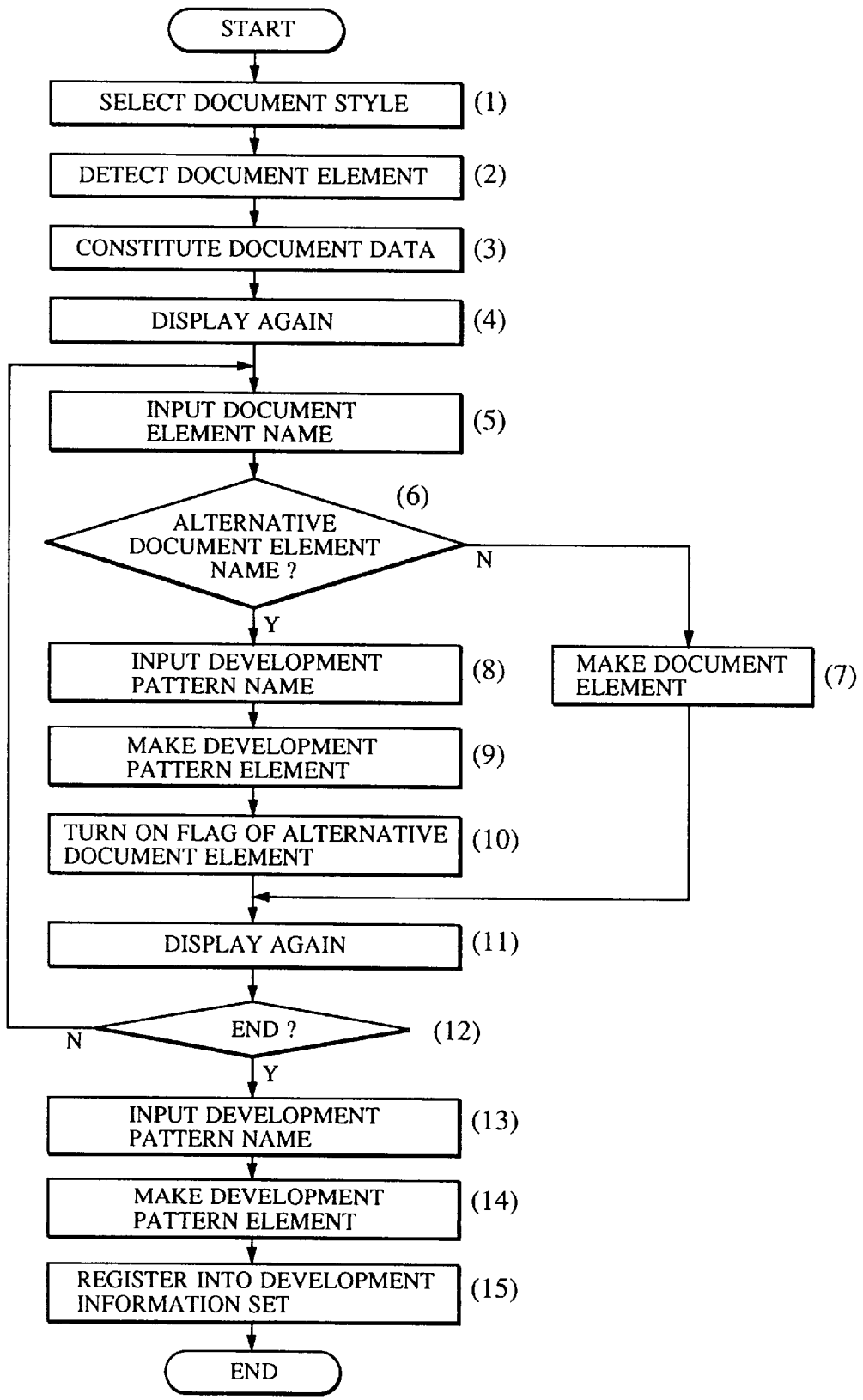
FIG. 58 is a flow chart showing an example of the basic development information processing operation to be performed by the document editing apparatus according to the present invention.

FIG. 58 is a flow chart showing the operation for processing development information to be performed in the document editing apparatus according to the present invention, where (1) to (15) are indicative of the steps of the process.

In step (1) the name of the subject document type is input. In step (2) the document element having the same name as the input document type name is detected in the basic development information set 39. If no document element is detected in step (2), this fact is displayed and the operation is interrupted.

In step (3) the document element and the alternative document element are processed in accordance with the development format of the document element detected in step (2) so that the document data 31 is constituted.

In step (4) the document data 31 is shaped and displayed again. The document element name is displayed on the document element in place of the development pattern name. Also the button 412 for registering the alternative document element into the development information set 38 is displayed on the alternative document element. The structure of the document data 31 and an example of display performed at the foregoing time are shown in FIGS. 59 and 60.

Figure 59:
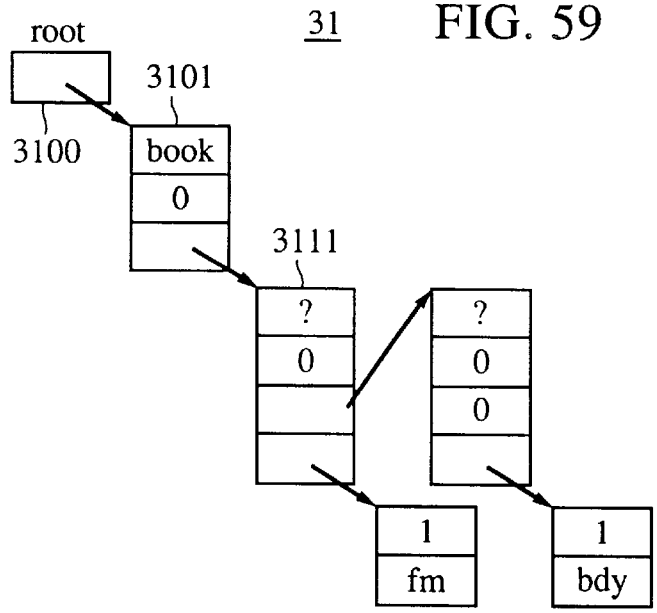
FIG. 59 illustrates the structure of document data in the document editing apparatus according to the present invention.
Figure 60:
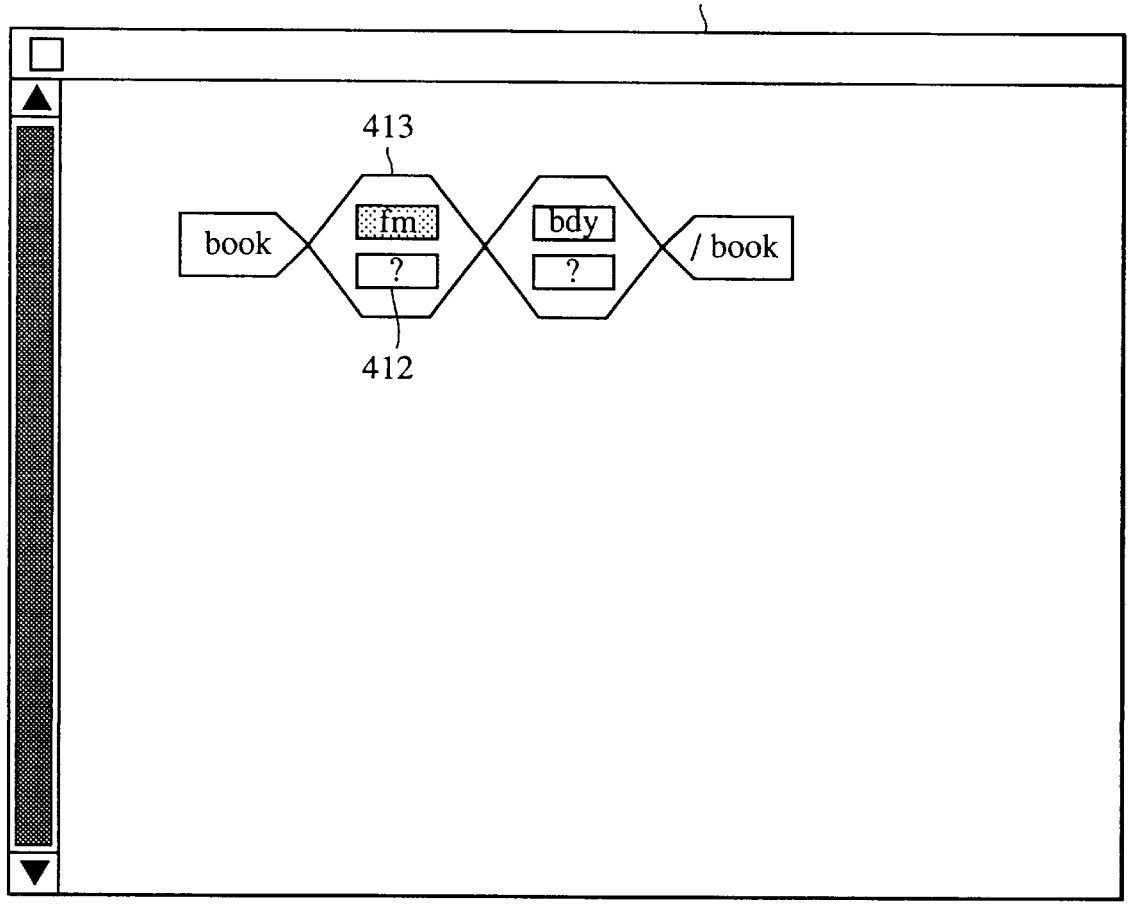
FIG. 60 illustrates a state of display of the structure of the document data shown in FIG. 59.

FIG. 59 illustrates the document data in the document editing apparatus according to the present invention. FIG. 60 illustrates display of the document data shown in FIG. 59.

In step (5) a person who processes the development information set selects the document element name on the alternative document element in the document displayed in step (4) by using the mouse.

In step (6) whether or not the input document element name is the alternative document element name is discriminated. If it is the alternative document element name, the flow proceeds to step (8). If it is not the alternative document element name, the flow proceeds to step (7).

In step (7) the document element of the document element name input in step (5) is processed on the basis of the basic development information set 39 to replace the original alternative document element with this.

Figure 61:
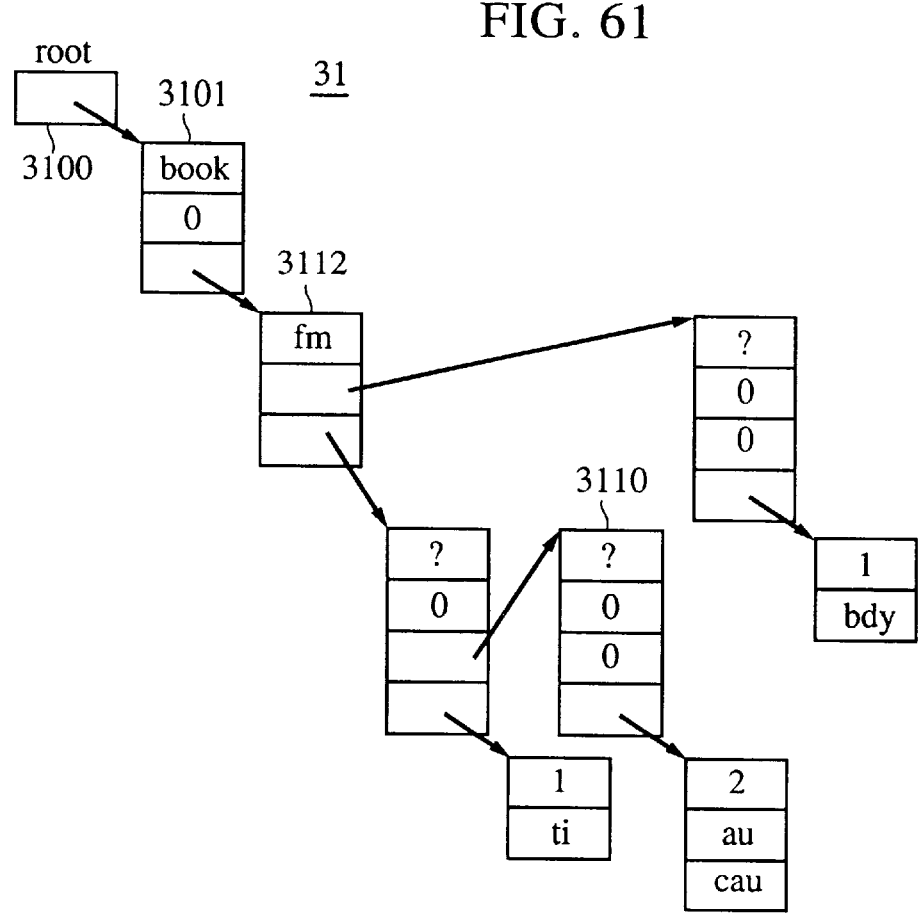
FIG. 61 illustrates the structure of document data in the document editing apparatus according to the present invention.

The document data 31 and an example of display when the alternative document element 3111 shown in FIG. 59 is replaced with the document element 3112 are shown in FIGS. 61 and 62.

FIG. 61 illustrates the structure of the document data in the document editing apparatus according to the present invention. FIG. 62 illustrates display of the structure of the document data shown in FIG. 61.

In step (11) display is again performed, and whether or not the alternative document element having the flag the value of which is zero is present in the document data 31, that is, whether or not the development has been completed, is discriminated in step (12). If a discrimination has been made in step (12) that the development is not completed, the flow returns to step (5) in which another alternative document element having the flag the value of which is zero is subjected to the same process.

If a discrimination has been made in step (6) that the name of the alternative document element has been input, one or more required document elements are selected from the document element which can be selected in step (8) and their development pattern names are input.

Figure 63:
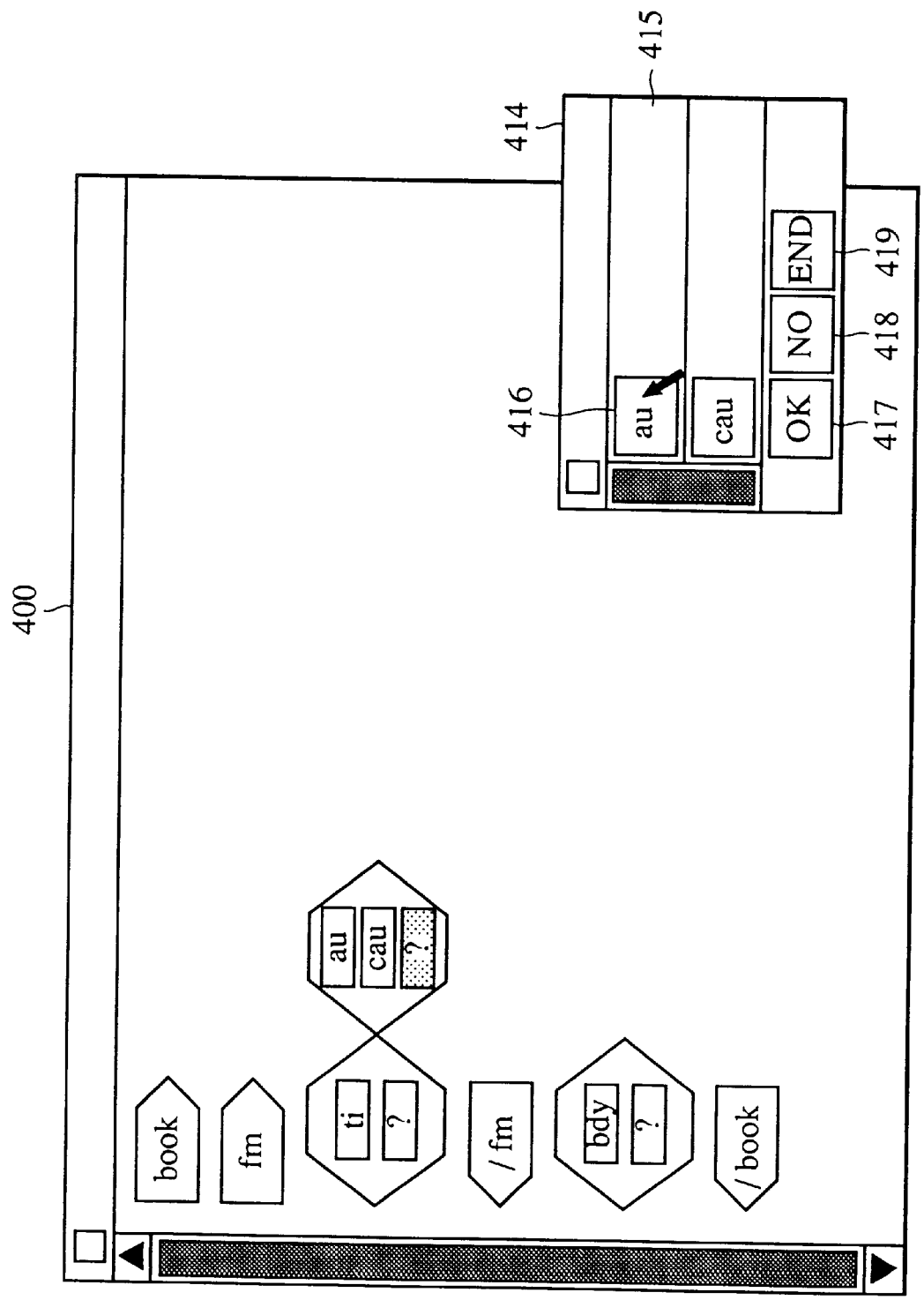
FIG. 63 illustrates an example of a dialogue window when a development information is processed in the document editing apparatus according to the present invention.

At this time, a dialogue window 414, for example, as shown in FIG. 63, is displayed on the CRT 4 and required document element button is clicked.

FIG. 63 illustrates an example of the dialogue window for use when the development information is processed in the document editing apparatus according to the present invention.

As shown in FIG. 63, if limiting of the development patterns C and D to the development pattern C is intended, the button 416 indicating the document element "au" in the dialogue window 414 is clicked to input the development pattern name "C" into the region 415. Then, an OK button 417 and an END button 419 are clicked. When the two patterns are registered, the button displaying the document element "au" is clicked, the development pattern name "C" is input, and the OK button 417 are clicked. Then, a button indicating the document element "cau" is clicked, the development pattern name "D" is input, the OK button 417 is clicked and the END button 419 is clicked.

If the development pattern as shown in FIG. 64 is present as the development pattern E and it is intended to be registered, the button displaying the document element "au" is again clicked to input the development pattern name "E" and the OK button 417 is clicked before the END button 419 is clicked. When a NO button 418 is clicked, the dialogue window 414 disappears and the flow returns to step (5) in which input of the document element name is waited for. If the END button 419 is clicked, the flow proceeds to step (9).

In step (9) a development pattern element that has pointed to the corresponding document elements by the number of the input development pattern names is processed and it is registered in the development information set 38. A development pattern element in which the development patterns C and D is processed and it is registered in the development information set 38. The structure of the development information set 38 when the development patterns C and D have been registered is shown in FIG. 65.

Figure 65:
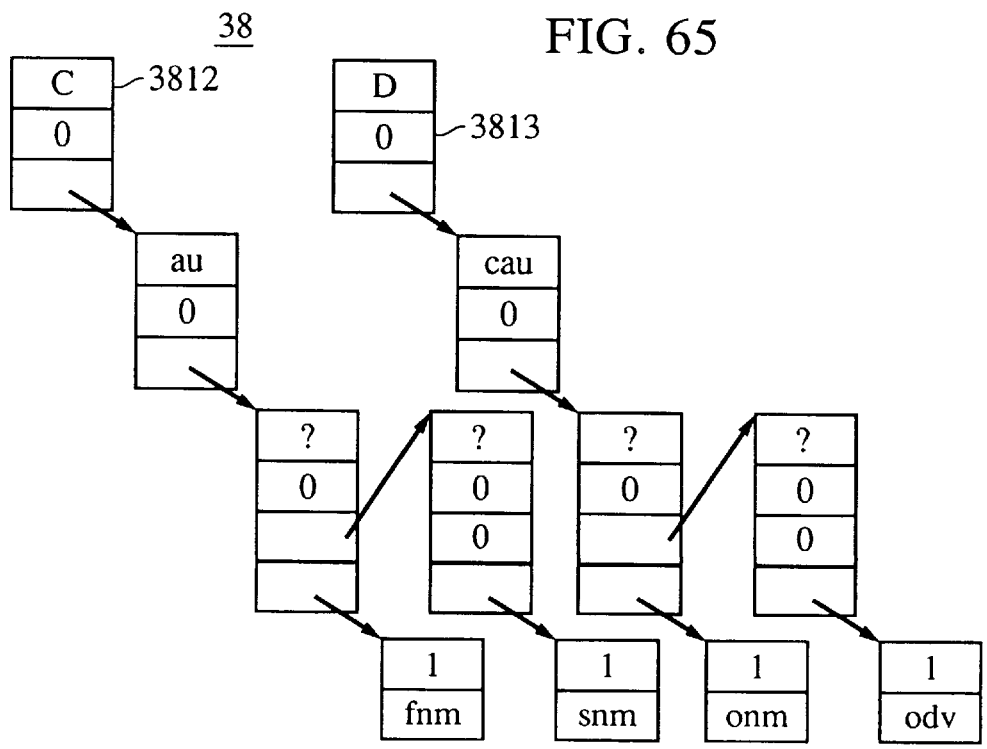
FIG. 65 illustrates the structure of a development information set in the document editing apparatus according to the present invention.

FIG. 65 illustrates the structure of the development information set 38 of the document editing apparatus according to the present invention.

Referring to FIG. 65, reference numerals 3812 and 3813 represents development pattern elements. When only the development pattern C has been registered, the development pattern element 3813 is not, of course, registered.

In step (10) the value of the flag of the alternative document element is set to "1". That is, it is indicated that the foregoing alternative document element is maintains also in the development information set 38. Then, the flow proceeds to step (11).

If a discrimination that the process has been completed in step (12), the flow proceeds to step (13) in which the name of the development pattern is input such that the dialogue window is displayed and the name is input into the dialogue window.

In step (14) the development pattern element is processed with the input development pattern name in such a manner that the content data points the document element 3101. Then, it is substituted with a root 3100 of the document data.

In step (15) the document data 31 is, as it is, registered in the development information set 38, the content of the document data 31 is cleared and thus this process is completed.

The development pattern elements processed during the foregoing process and registered in the development information set 38 will now be described.

Also the foregoing development pattern elements must be developed in accordance with respective development patterns such that the development pattern elements are subjected to the development information processing operation shown in FIG. 58.

Figure 66:
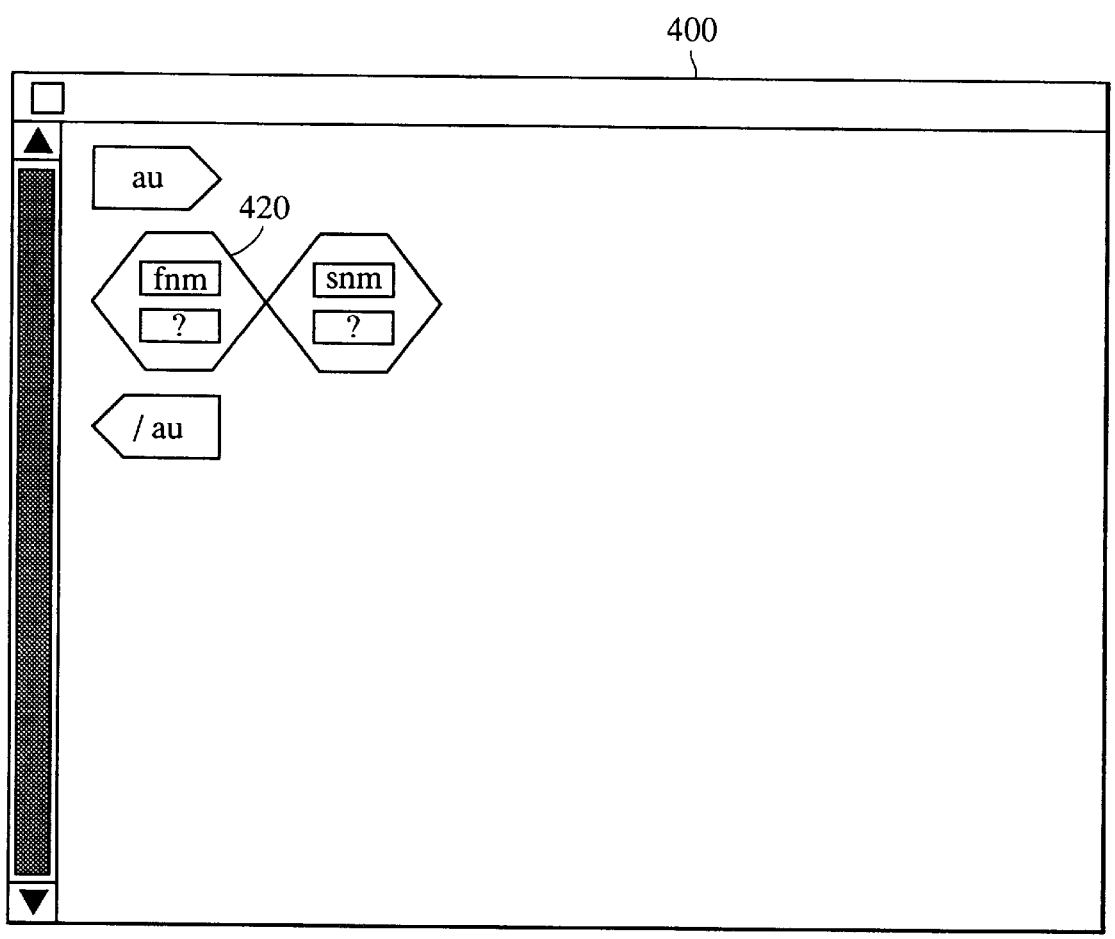
FIG. 66 illustrates a state of display of an alternative document element in the document editing apparatus according to the present invention.

However, in step (1) the development format is not selected but the development pattern name is input and the document element is not detected in the basic development information set 39 but the development pattern element is detected in the development information set 38 in step (2). For example, the development pattern C points to the document element "document element "au". Since the document element "au" points to the alternative document element as shown in FIG. 56, display as shown in FIG. 66 is performed. Then, document element "fnm" is deleted from the display and document element "snm" is selected.

FIG. 66 illustrates a state where the alternative document element is displayed in the document editing apparatus according to the present invention.

As shown in FIG. 66, the document element "fnm" is canceled such that a button displaying the document element name "fnm" of the alternative document element 420 shown in FIG. 66 is depressed by clicking, for example, the right button of the mouse. After it has been canceled, collation with FIG. 67 is performed to examine whether or not the document element can be deleted. If it can be deleted, its alternative document element is deleted from the document data 31 and the value of the link data such as another document element relating to the alternative document element is modified.

If it is the document element that cannot be deleted, this fact is displayed and the document data 31 is not subjected to any operation. Since the document element "sum" contains only the character string, the development with the development pattern C is completed. Further, all development pattern elements registered in the development information set are continued until the processes are completed. Thus, the development information set 38 is processed.

If <! ELEMENT fm (ti, (au|cau)*> is not held but <! ELEMENT fm (ti, (au|cau|X|Y|Z)*> is held in FIG. 67, automatic processing of the development pattern from the state shown in FIG. 67 causes five development patterns to be undesirably processed with respect to the document element "fm". However, the foregoing method enables the development patterns to be decreased to two patterns.

The alternative document element of the development information set to be processed in this modification has a flag as is given to the alternative document element of the basic development information set 39. The other structures are the same as those of the structure shown in FIG. 44.

Since the flag is not required for the alternative document element in the development information set that has been processed, it may be omitted and the same shape as that shown in FIG. 44 may be employed.

The operation of processing a document by using the development information set 38 is arranged to be similar to that according to the third embodiment shown in FIGS. 48 and 51.

In this embodiment, the development information set is processed such that selection is performed from document elements having a correct structure. Therefore, an effect can be obtained in that the correct development pattern can always be constituted.

As described above, according to the present invention, the alternative document element inserted into the portion appointed by the partial appointing means by the alternative document element insertion means for setting an alternative element is substituted with the document element appointed by the alternative document element developing means so that an adequate template is processed.

According to the present invention, the alternative document element processing means processes the alternative document element in accordance with the development format information selected by the selection means that selects the development format information required to process a document, and the alternative element development means substitutes the appointed alternative element or the document element in the processed alternative document element with the selected document element or the alternative document element to be developed into document data. Therefore, the document element or the alternative document element to be inserted into the entry portion can be displayed for the document editor in accordance with the document data structure.

According to the present invention, the alternative document element processing means processes the alternative document element in accordance with the development format information selected by the selection means that selects the development format information required to process a document. When the alternative document element development means substitutes the appointed alternative document element or the document element in the processed alternative document element with the document element or the alternative document element to develop it into document data, the alternative document element development means substitutes the appointed alternative document element or the document element in the alternative document element processed by the alternative document element processing means with the selected document element or the alternative document element in accordance with the development pattern format appointed by the pattern appointing means to develop it into the document data. Therefore, the number of the development patterns for the document elements or the alternative document elements to be developed can be limited. Thus, document data can be edited efficiently.

According to the present invention, the symbol indicating the document element to be developed on the alternative document element is displayed so that the document element is correctly displayed for the editor.

According to the present invention, the selection menu of the document element to be developed on the alternative document element is added so that the document element is selected correctly.

Therefore, an effect can be obtained in that deformed template document data can be processed and edited from the processed template document data.

Although the invention has been described in its preferred form with a certain degree of particularity, it is understood that the present disclosure of the preferred form can be changed in the details of construction and the combination and arrangement of parts may be resorted to without departing from the spirit and the scope of the invention as hereinafter claimed.

What is claimed is:

1. A structured document processing apparatus comprising:

document storing means for storing a document composed of document elements and alternate document elements, each element of said document elements being related to another document element and/or document information, and each element of said alternate document elements not being related to another element and document information;

candidate storing means for storing one or more candidates of document contents which can be substituted for said alternate document elements; and substitution means for substituting the one or more candidates of document contents stored in said candidate storing means for said alternate document elements.

2. A structured document processing apparatus according to claim 1, wherein said candidates are characterized by being based on a definition of said document.

3. A structured document processing apparatus according to claim 1, wherein said candidates are stored corresponding to each of said alternate document elements.

4. A structured document processing apparatus according to claim 1, wherein said candidates are displayed in a form of a menu.

5. A structured document processing apparatus according to claim 4, further comprising:

display means for displaying document elements and alternate document elements, wherein said candidates in a form of a menu are displayed with said alternate document elements on the display means.

6. A structured document processing apparatus according to claim 5, further comprising;

instruction means for instructing a position on said display means, wherein when instructing said alternate document elements by said instruction means, said candidates in a form of a menu are displayed.

7. A structured document processing apparatus according to claim 1, further comprising:

insertion means for inserting said alternate document elements into said document.

8. A structured document processing method comprising:

a document storing step of storing a document composed of document elements and alternate document elements, each element of said document elements being related to another document element and/or document information, and each element of said alternate document elements not being related to another element and document information;

a candidate storing step of storing one or more candidates of document contents which can be substituted for said alternate document elements; and a substitution step of substituting the one or more candidates of document contents stored in said candidate storing step for said alternate document elements.

9. A structured document processing method according to claim 8, wherein said candidates are characterized by being based on a definition of said document.

10. A structured document processing method according to claim 8, wherein said candidates are stored corresponding to each of said alternate document elements.

11. A structured document processing method according to claim 8, wherein said candidates are displayed in a form of a menu.

12. A structured document processing method according to claim 11, further comprising:

a display step of displaying document elements and alternate document elements, wherein said candidates in a form of a menu are displayed with said alternate document elements on a display device.

13. A structured document processing method according to claim 12, further comprising:

an instruction step of instructing a position on said display device, wherein when instructing said alternate document elements by said instruction step, said candidates in a form of a menu are displayed.

14. A structured document processing method according to claim 8, further comprising:

an insertion step of inserting said alternate document elements into said document.

15. A computer usable medium having computer readable program code for causing a computer to perform a structured document processing method comprising:

a document storing step of storing a document composed of document elements and alternative document elements, each element of said document elements being related to another document element and/or document information, and each element of said alternate document elements not being related to another element and document information;

a candidate storing step of storing one or more candidates of document contents which can be substituted for said alternate document elements; and a substitution step of substituting the one or more candidates of document contents stored in said candidate storing step for said alternate document elements.

16. A computer usable medium according to claim 15, wherein said candidates are characterized by being based on a definition of said document.

17. A computer usable medium according to claim 15, wherein said candidates are stored corresponding to each of said alternate document elements.

18. A computer usable medium according to claim 15, wherein said candidates are displayed in a form of a menu.

19. A computer usable medium according to claim 18, further comprising:

a display step of displaying document elements and alternate document elements, wherein said candidates in a form of a menu are displayed with said alternate document elements on a display device.

20. A computer usable medium according to claim 19, further comprising:

an instruction step of instructing a position on said display devices wherein when instructing said alternate document elements by said instruction step, said candidates in a form of a menu are displayed.

21. A computer usable medium according to claim 15, further comprising:

an insertion step of inserting said alternate document elements into said document.

\* \* \* \* \*

UNITED STATES PATENT AND TRADEMARK OFFICE
CERTIFICATE OF CORRECTION

PATENT NO: 5,907,851

DATED    : May 25, 1999

INVENTOR : TADASHI YAMAKAWA ET AL.

It is certified that error appears in the above-identified patent and that said Letters Patent is hereby corrected as shown below:

IN THE DRAWINGS

Sheet 31 of 40    Label of upper Figure should read
         --FIG. 62--.

COLUMN 1 line 19, "(ISO-8879)" should read --(ISO-8879))--.

COLUMN 2 line 39, "points" should read --points to--; and
   line 40, "content" should read --contents--.

COLUMN 3 line 20, "rau"," should read --"au",--.

COLUMN 5 line 39, "according" should read --according to--; and

UNITED STATES PATENT AND TRADEMARK OFFICE
CERTIFICATE OF CORRECTION

PATENT NO. : 5,907,851

DATED : May 25, 1999

INVENTOR(S) : TADASHI YAMAKAWA ET AL.

It is certified that error appears in the above-identified patent and that said Letters Patent is hereby corrected as shown below:

COLUMN 5 line 43, "according" should read --according to--.

COLUMN 11 line 32, "state" should read --state in which--; and
  line 51, "except" should read --except for--.

COLUMN 13 line 20, "treated" should read --is treated--;
  line 30, "another" should read --other--; and
  line 44, "is" should read --are--.

COLUMN 14 line 44, "except the flows" should read --except for the flowcharts--.

UNITED STATES PATENT AND TRADEMARK OFFICE
CERTIFICATE OF CORRECTION

PATENT NO. : 5,907,851

DATED : May 25, 1999

INVENTOR(S) : TADASHI YAMAKAWA ET AL.

Page 3 of 5

It is certified that error appears in the above-identified patent and that said Letters Patent is hereby corrected as shown below:

COLUMN 15 line 26, "process" should read --processed--.

COLUMN 16 line 55, "element" should read --elements--.

COLUMN 17 line 1, "element" should read --elements--; and
line 11, "document element "docu-" should read
--document element--.
line 12, "ment element "fm"." should read --"fm".--.

COLUMN 19 line 13, "Of" should read --of--.

UNITED STATES PATENT AND TRADEMARK OFFICE
CERTIFICATE OF CORRECTION

PATENT NO. : 5,907,851

DATED : May 15, 1999

INVENTOR(S) : TADASHI YAMAKAWA ET AL.

It is certified that error appears in the above-identified patent and that said Letters Patent is hereby corrected as shown below:

COLUMN 21 line 45, "document element" should be deleted.

COLUMN 22 line 9, "been detected and it has" should be deleted.
line 53, "stores" should be deleted.

COLUMN 23 line 55, "comprise" should read --comprises--.

COLUMN 24 line 12, "process" should read --processes--; and
line 50, "order" should read --order is perfomred--.

UNITED STATES PATENT AND TRADEMARK OFFICE
CERTIFICATE OF CORRECTION

PATENT NO. : 5,907,851

DATED : May 25, 1999

INVENTOR(S) : TAKASHI YAMAKAWA ET AL.

It is certified that error appears in the above-identified patent and that said Letters Patent is hereby corrected as shown below:

COLUMN 29 line 58, "represents" should read --represent--.; and
line 63, "maintains also" should read --also maintained--.

COLUMN 30 line 25, ""document element" should be deleted.

Signed and Sealed this

Ninth Day of May, 2000

Attest:

Q. TODD DICKINSON

*Attesting Officer*   *Director of Patents and Trademarks*